(12) United States Patent
Ohta

(10) Patent No.: US 7,980,952 B2
(45) Date of Patent: Jul. 19, 2011

(54) STORAGE MEDIUM HAVING INFORMATION PROCESSING PROGRAM STORED THEREON AND INFORMATION PROCESSING APPARATUS

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1012 days.

(21) Appl. No.: 11/889,246

(22) Filed: Aug. 10, 2007

(65) Prior Publication Data

US 2008/0318677 A1    Dec. 25, 2008

(30) Foreign Application Priority Data

Jun. 20, 2007   (JP) ................ 2007-163022

(51) Int. Cl.
| | |
|---|---|
| A63F 9/24 | (2006.01) |
| G01P 15/00 | (2006.01) |
| G01C 9/00 | (2006.01) |
| G09G 5/00 | (2006.01) |
| G06F 3/033 | (2006.01) |
| G06F 13/36 | (2006.01) |
| H04M 9/00 | (2006.01) |

(52) U.S. Cl. ........... 463/36; 463/37; 702/141; 702/150; 702/152; 345/156; 345/157; 379/433.04; 710/15

(58) Field of Classification Search .......... 345/156–157; 702/141, 150, 152; 463/3, 36–37; 379/433.04; 710/15

See application file for complete search history.

(56) References Cited

U.S. PATENT DOCUMENTS

| | | | | |
|---|---|---|---|---|
| 5,516,105 | A | * | 5/1996 | Eisenbrey et al. ........ 273/148 B |
| 5,574,479 | A | | 11/1996 | Odell |
| 5,615,132 | A | * | 3/1997 | Horton et al. ................ 703/7 |
| 5,616,078 | A | * | 4/1997 | Oh ...................... 463/8 |
| 5,627,565 | A | | 5/1997 | Morishita et al. |
| 6,369,794 | B1 | * | 4/2002 | Sakurai et al. ............ 345/156 |
| 6,375,572 | B1 | * | 4/2002 | Masuyama et al. .......... 463/43 |
| 6,430,997 | B1 | * | 8/2002 | French et al. ........... 73/379.04 |
| 6,545,661 | B1 | * | 4/2003 | Goschy et al. ............ 345/158 |
| 6,749,432 | B2 | * | 6/2004 | French et al. ............ 434/247 |
| 6,876,496 | B2 | * | 4/2005 | French et al. ............ 359/630 |
| 6,982,697 | B2 | * | 1/2006 | Wilson et al. ............. 345/156 |

(Continued)

FOREIGN PATENT DOCUMENTS

JP    6-50758    2/1994

OTHER PUBLICATIONS

ADXL202 Specification Sheet: Low Cost ±2 g Dual Axis i MEMs® Accelerometer with Digital Output; Analog Devices, Inc., 1998.

(Continued)

*Primary Examiner* — Peter DungBa Vo
*Assistant Examiner* — Bach Hoang
(74) *Attorney, Agent, or Firm* — Nixon & Vanderhye, P.C.

(57) ABSTRACT

Acceleration data is repeatedly acquired, and an acceleration vector having a magnitude and a direction of an acceleration represented by the acceleration data is sequentially accumulated so as to calculate an accumulation vector. A following vector which follows, at a predetermined rate, the accumulation vector calculated by the accumulation vector calculation means is calculated by using the acquired acceleration data, and a difference between the accumulation vector and the following vector is calculated as a differential vector. A position in a virtual world displayed by a display device is designated using a value determined in accordance with the differential vector so as to perform a predetermined processing by using the position.

19 Claims, 23 Drawing Sheets

U.S. PATENT DOCUMENTS

| | | | | |
|---|---|---|---|---|
| 6,990,639 | B2* | 1/2006 | Wilson | 715/863 |
| 7,139,983 | B2 | 11/2006 | Kelts | |
| 7,158,118 | B2* | 1/2007 | Liberty | 345/158 |
| 7,173,604 | B2* | 2/2007 | Marvit et al. | 345/156 |
| 7,223,173 | B2* | 5/2007 | Masuyama et al. | 463/36 |
| 7,236,156 | B2* | 6/2007 | Liberty et al. | 345/158 |
| 7,239,301 | B2* | 7/2007 | Liberty et al. | 345/158 |
| 7,262,760 | B2* | 8/2007 | Liberty | 345/158 |
| 7,292,151 | B2 | 11/2007 | Ferguson et al. | |
| 7,359,121 | B2* | 4/2008 | French et al. | 359/630 |
| 7,379,841 | B2* | 5/2008 | Ohta | 702/154 |
| 7,414,611 | B2 | 8/2008 | Liberty | |
| 7,489,298 | B2* | 2/2009 | Liberty et al. | 345/158 |
| 7,489,299 | B2* | 2/2009 | Liberty et al. | 345/163 |
| 7,492,268 | B2* | 2/2009 | Ferguson et al. | 340/573.1 |
| 7,519,537 | B2* | 4/2009 | Rosenberg | 704/275 |
| 7,535,456 | B2* | 5/2009 | Liberty et al. | 345/158 |
| 7,601,066 | B1* | 10/2009 | Masuyama et al. | 463/38 |
| 7,658,676 | B2* | 2/2010 | Ohta | 463/37 |
| 7,688,306 | B2* | 3/2010 | Wehrenberg et al. | 345/158 |
| 7,698,096 | B2* | 4/2010 | Ohta | 702/151 |
| 7,711,505 | B2* | 5/2010 | Ohta | 702/85 |
| 7,716,008 | B2* | 5/2010 | Ohta | 702/152 |
| 7,735,025 | B2* | 6/2010 | Lee et al. | 715/863 |
| 7,774,155 | B2* | 8/2010 | Sato et al. | 702/127 |
| 7,791,808 | B2* | 9/2010 | French et al. | 359/630 |
| 7,833,099 | B2* | 11/2010 | Sato et al. | 463/37 |
| 7,852,315 | B2* | 12/2010 | Ofek et al. | 345/157 |
| 7,854,656 | B2* | 12/2010 | Sato et al. | 463/36 |
| 2002/0072418 | A1* | 6/2002 | Masuyama et al. | 463/43 |
| 2004/0029640 | A1* | 2/2004 | Masuyama et al. | 463/43 |
| 2005/0052414 | A1* | 3/2005 | Park et al. | 345/158 |
| 2005/0076161 | A1* | 4/2005 | Albanna et al. | 710/15 |
| 2005/0174324 | A1* | 8/2005 | Liberty et al. | 345/156 |
| 2005/0212767 | A1* | 9/2005 | Marvit et al. | 345/156 |
| 2005/0243061 | A1* | 11/2005 | Liberty et al. | 345/158 |
| 2005/0253806 | A1* | 11/2005 | Liberty et al. | 345/156 |
| 2006/0022833 | A1* | 2/2006 | Ferguson et al. | 340/573.1 |
| 2006/0028446 | A1* | 2/2006 | Liberty et al. | 345/158 |
| 2006/0159177 | A1* | 7/2006 | Mellot | 375/240.16 |
| 2006/0164393 | A1* | 7/2006 | Wu et al. | 345/163 |
| 2006/0287085 | A1* | 12/2006 | Mao et al. | 463/37 |
| 2007/0062279 | A1* | 3/2007 | Chan et al. | 73/488 |
| 2007/0178974 | A1* | 8/2007 | Masuyama et al. | 463/43 |
| 2007/0243931 | A1* | 10/2007 | Ohta et al. | 463/37 |
| 2008/0158154 | A1* | 7/2008 | Liberty et al. | 345/158 |
| 2008/0204411 | A1* | 8/2008 | Wilson | 345/158 |
| 2008/0215288 | A1* | 9/2008 | Ohta | 702/154 |
| 2008/0248872 | A1* | 10/2008 | Endo | 463/36 |
| 2008/0275667 | A1* | 11/2008 | Ohta | 702/154 |
| 2008/0280660 | A1* | 11/2008 | Ueshima et al. | 463/3 |
| 2008/0289887 | A1* | 11/2008 | Flint et al. | 178/18.03 |
| 2009/0005166 | A1* | 1/2009 | Sato | 463/37 |
| 2009/0036213 | A1* | 2/2009 | Masuyama et al. | 463/37 |
| 2009/0149257 | A1* | 6/2009 | Ferguson et al. | 463/37 |
| 2009/0325698 | A1* | 12/2009 | Masuyama et al. | 463/31 |

OTHER PUBLICATIONS

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

* cited by examiner

F I G. 7
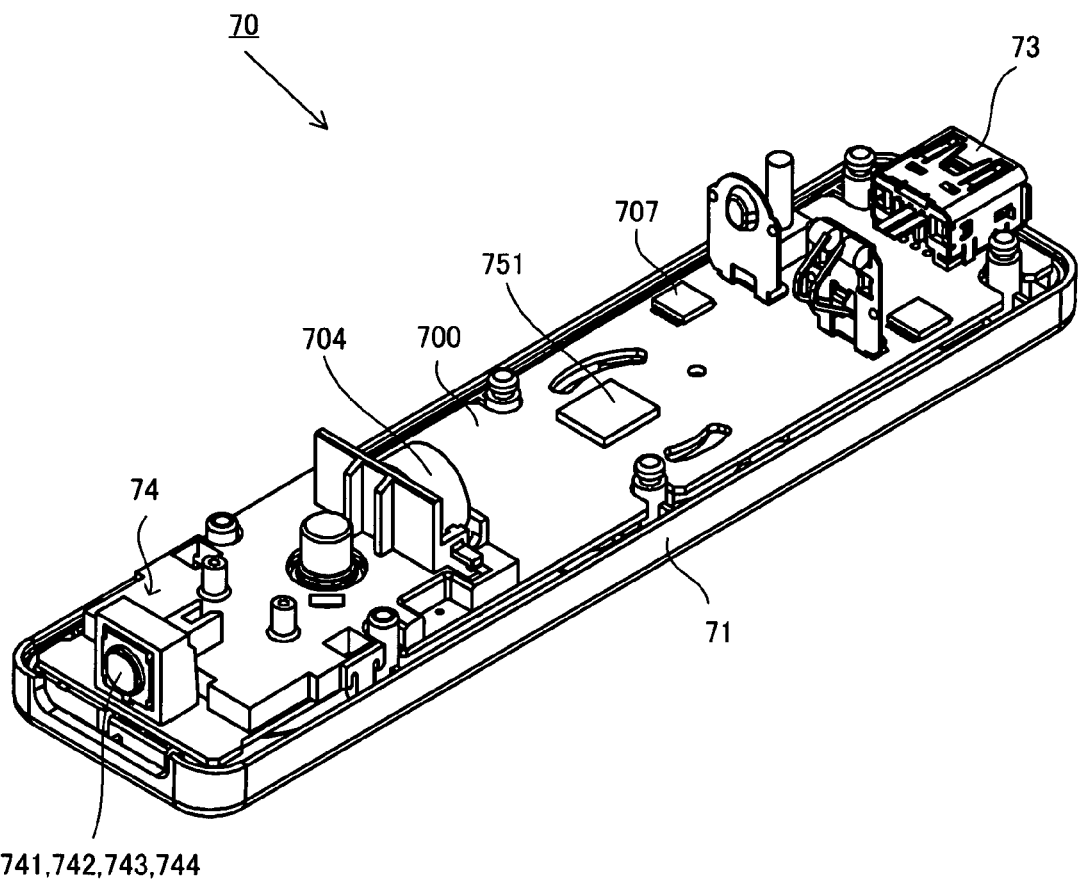

FIG. 11
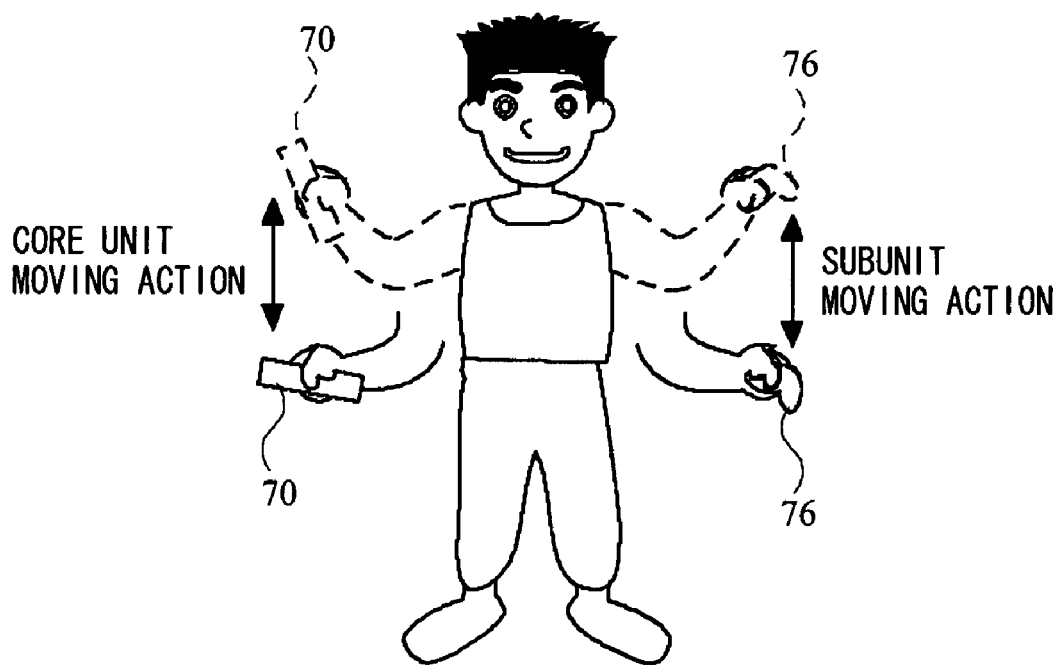
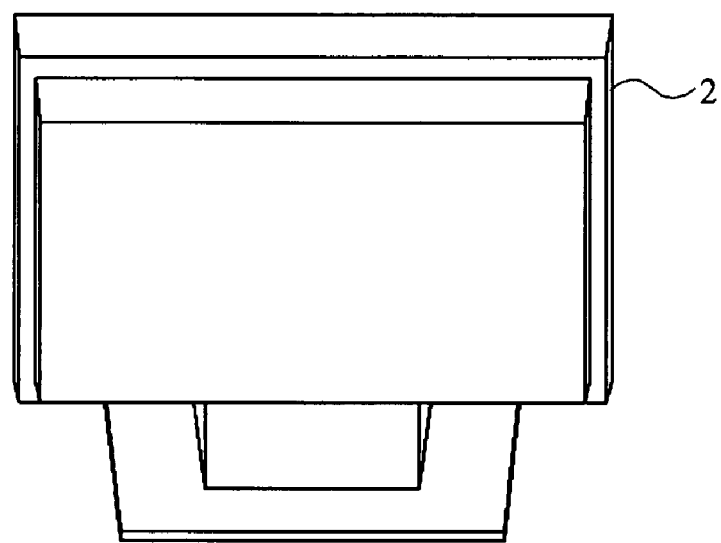

F I G. 1 2
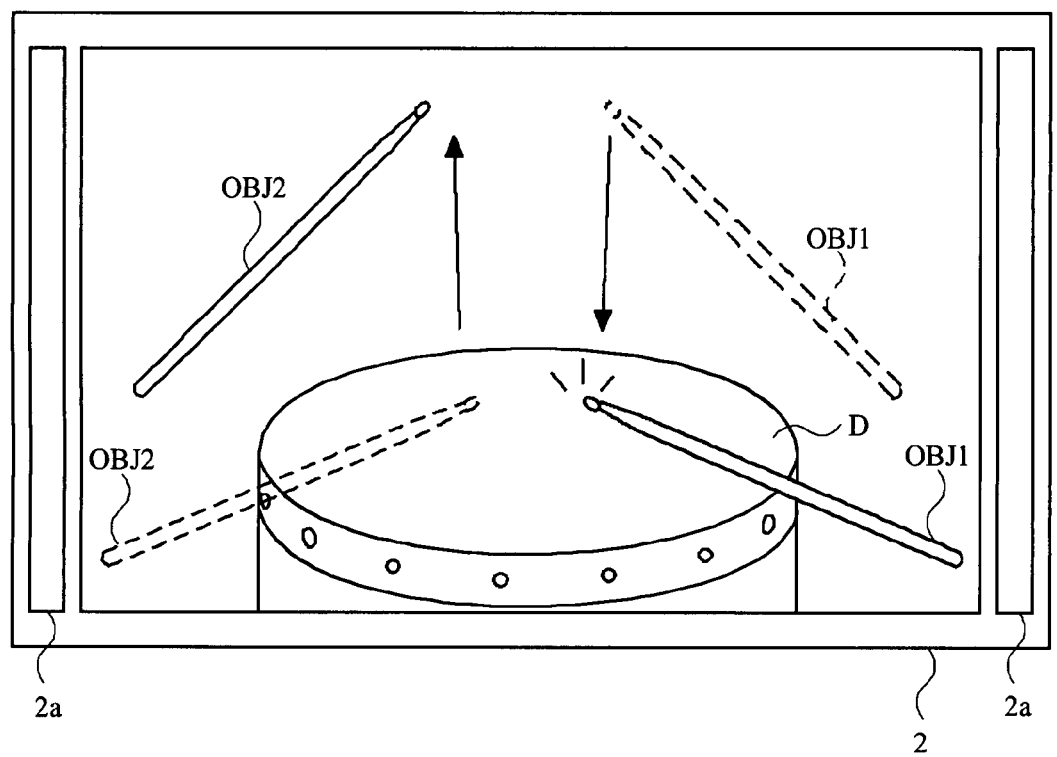
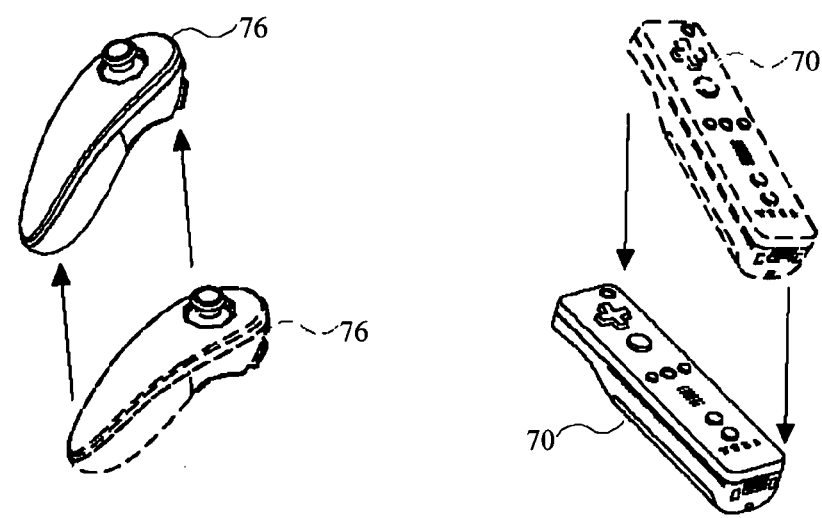

FIG. 13
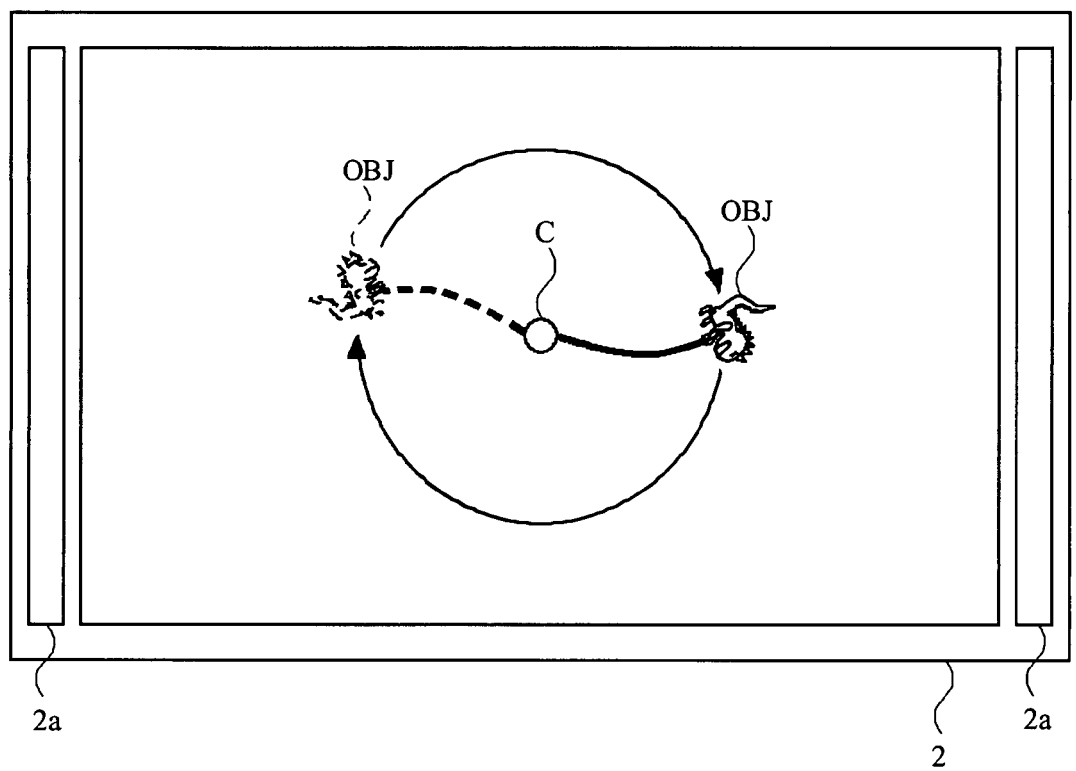
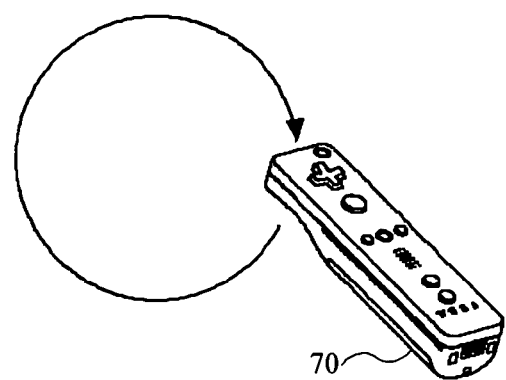

FIG. 14
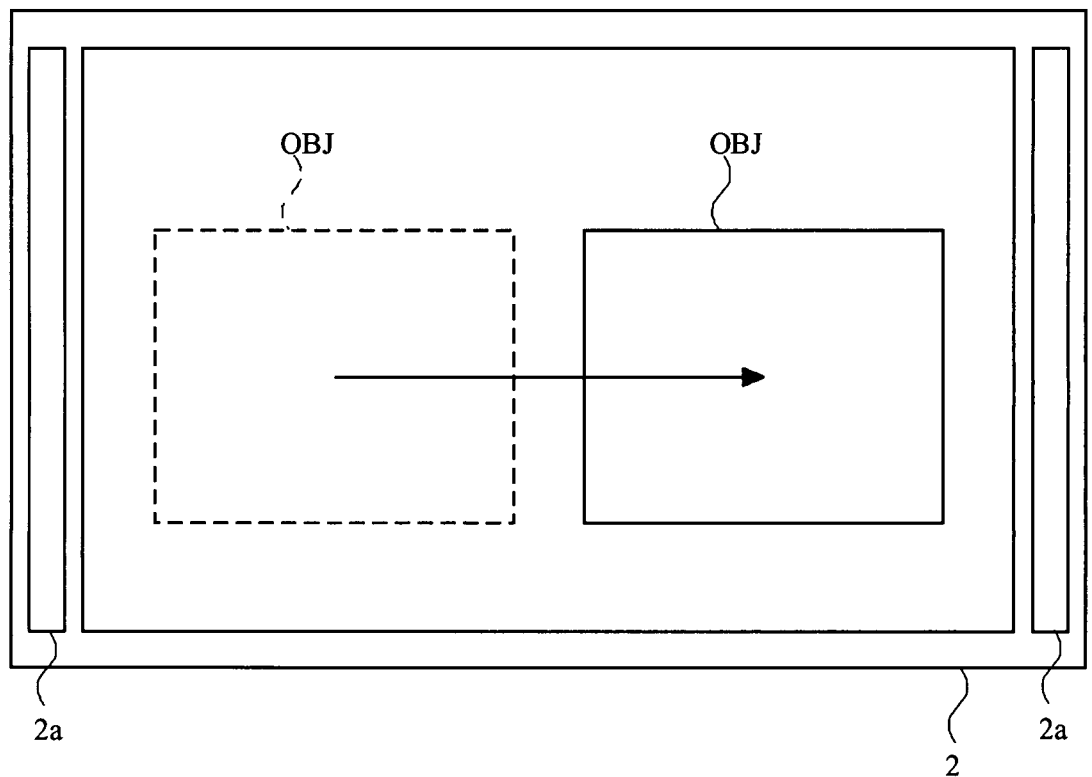
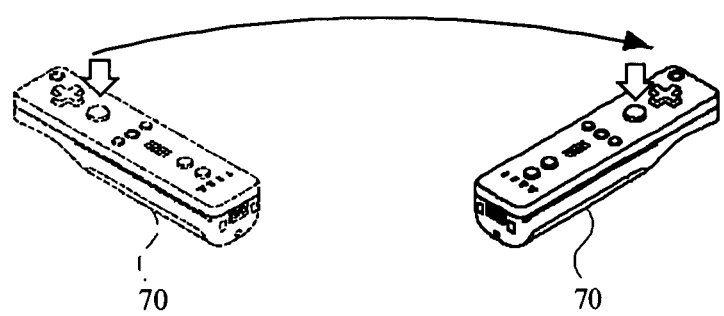

FIG. 19
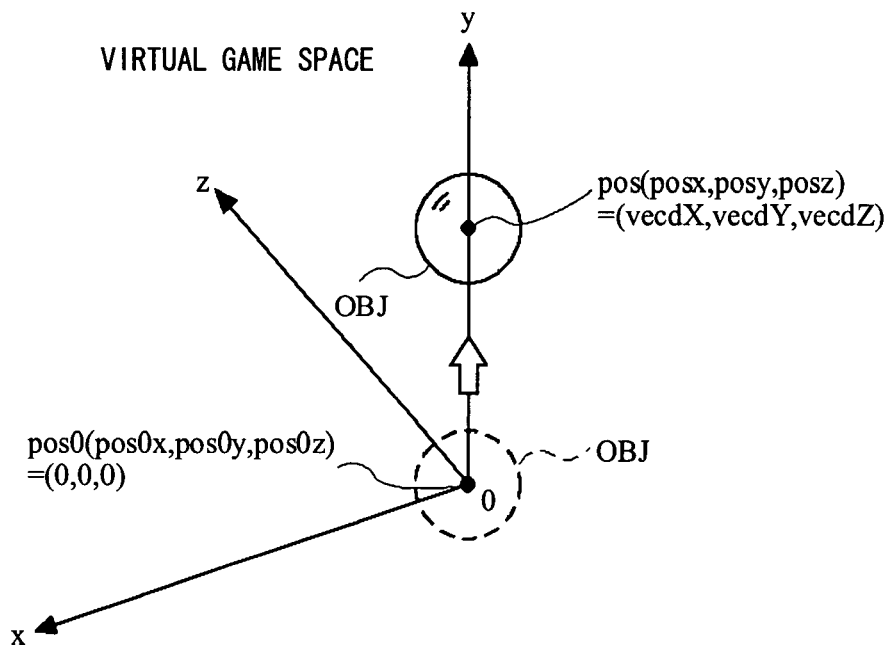
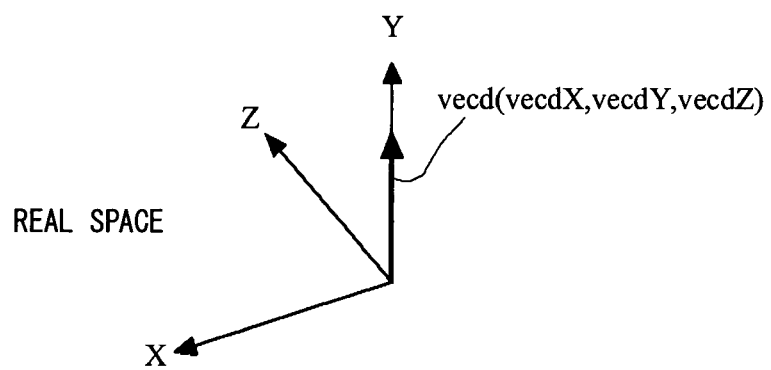
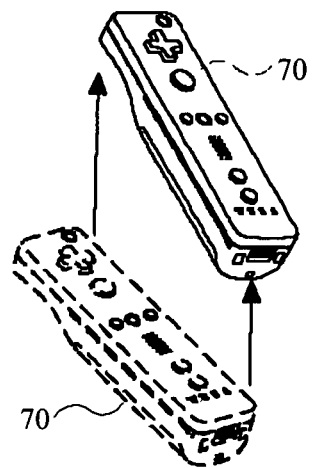

FIG. 23
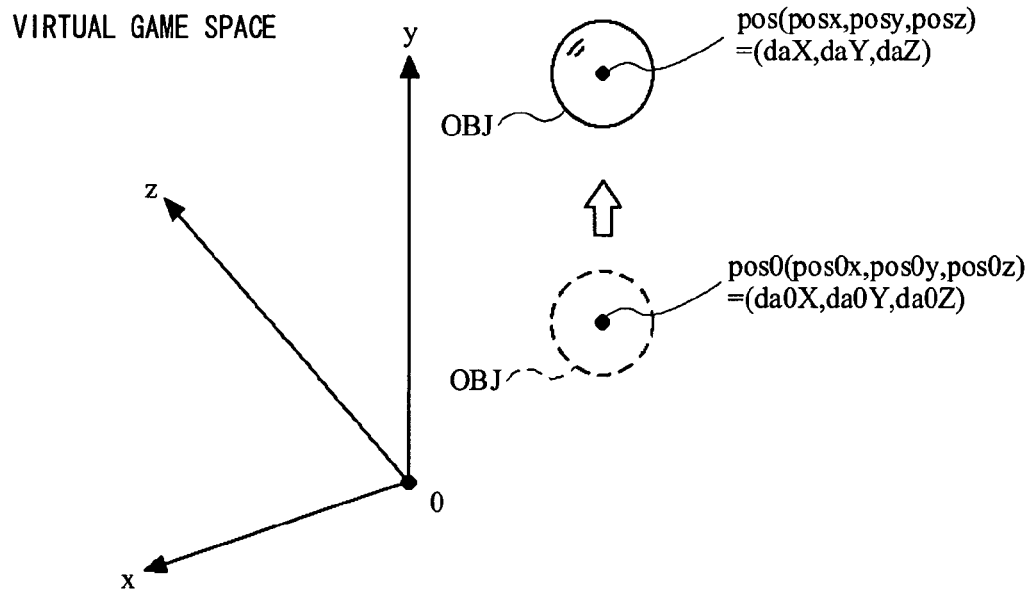
VIRTUAL GAME SPACE
pos(posx,posy,posz)
=(daX,daY,daZ)
OBJ
pos0(pos0x,pos0y,pos0z)
=(da0X,da0Y,da0Z)
OBJ
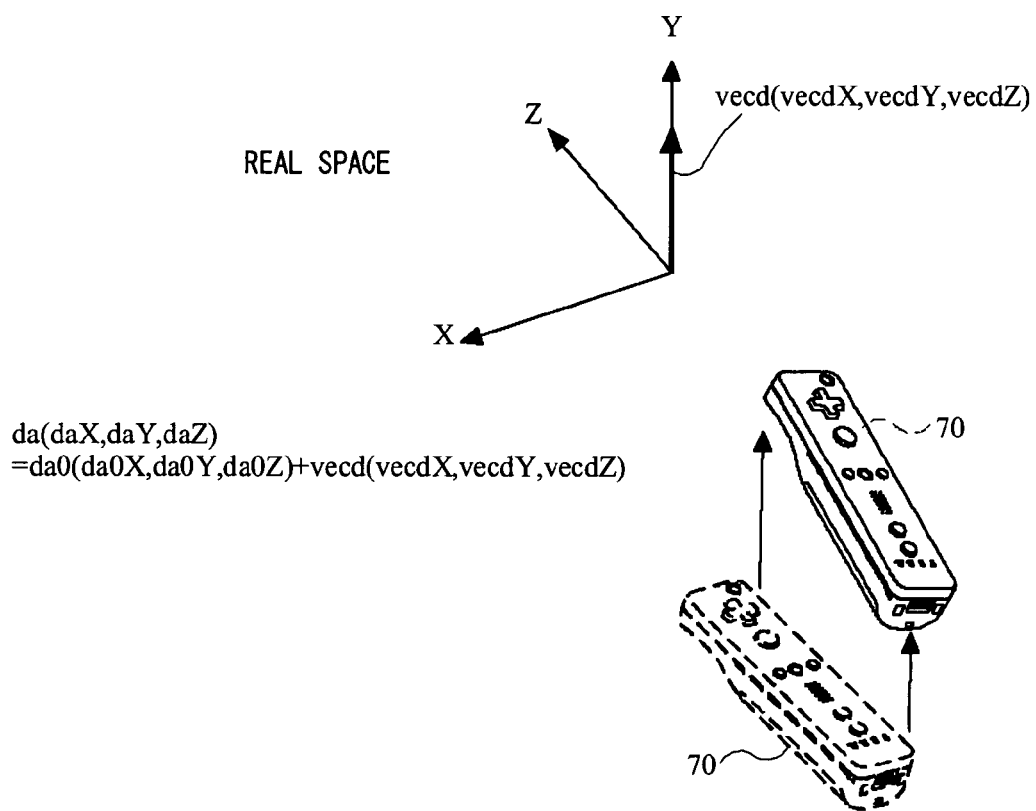
REAL SPACE
vecd(vecdX,vecdY,vecdZ)
da(daX,daY,daZ)
=da0(da0X,da0Y,da0Z)+vecd(vecdX,vecdY,vecdZ)

United States Patent US 7,980,952 B2

STORAGE MEDIUM HAVING INFORMATION PROCESSING PROGRAM STORED THEREON AND INFORMATION PROCESSING APPARATUS

CROSS REFERENCE TO RELATED APPLICATION

The disclosure of Japanese Patent Application No. 2007-163022, filed on Jun. 20, 2007, is incorporated herein by reference.

FIELD

The technology herein relates to a storage medium having an information processing program stored thereon and an information processing apparatus, and more particularly to an information processing apparatus for detecting for an acceleration applied to a housing of a controller so as to perform an operation, and a storage medium having stored thereon an information processing program executed by the apparatus.

BACKGROUND AND SUMMARY

Conventionally, various information processing apparatus each of which allows a user to move or rotate a housing of an input device, and performs a processing in accordance with a movement of the housing, have been developed. For example, Japanese Laid-Open Patent Publication No. 6-50758 (hereinafter, referred to as Patent Document 1) discloses an information processing apparatus which uses a remote commander (input device) having a vibrating gyroscope (an angular velocity sensor) mounted therein so as to perform a processing.

The information processing apparatus disclosed in Patent Document 1 determines a direction in which a user moves the remote commander, based on an angular velocity obtained by the vibrating gyroscope, and executes a command in accordance with the determination result. Specifically, a voltage generated from a driving piezoelectric ceramic included in the vibrating gyroscope rises in accordance with an angular velocity obtained when a user moves the remote commander upward. On the other hand, a voltage generated from the driving piezoelectric ceramic drops in accordance with an angular velocity obtained when a user moves the remote commander downward. By using the remote commander having the vibrating gyroscope mounted therein as described above, the information processing apparatus determines that the remote commander is moved upward when the voltage rises up to a predetermined value, whereas the information processing apparatus determines that the remote commander is moved downward when the voltage drops to a predetermined value. The information processing apparatus moves a cursor in a display screen upward in accordance with a command to be executed in response to the remote commander being moved upward, whereas the information processing apparatus moves the cursor in the display screen downward in accordance with a command to be executed in response to the remote commander being moved downward.

However, the vibrating gyroscope (angular velocity sensor) mounted in the input device disclosed in Patent Document 1 costs more than an acceleration sensor and the like, which leads to increase in cost of the input device itself. On the other hand, when the vibrating gyroscope is simply replaced with an acceleration sensor so as to mount the acceleration sensor in the input device, and a value of data outputted by the acceleration sensor is used as it is, the gravitational acceleration applied to the input device may be included in the value, whereby an accurate determination becomes difficult. Further, when the input device is being moved in a predetermined direction, an acceleration may be applied to the input device in the direction opposite to the predetermined direction, or the acceleration may be variable depending on an operation performed by a user, or an acceleration may be influenced by an accuracy error of the device itself, for example. In these cases, accurate determination may become difficult.

Therefore, certain example embodiments provide a storage medium having stored thereon an information processing program and an information processing apparatus for realizing an accurate operation, in an inexpensive manner, by using data outputted by an acceleration sensor mounted in a predetermined housing.

The reference numerals, step numbers and the like in the parentheses indicate the correspondence with the embodiment described below in order to aid in understanding certain example embodiments and are not intended to limit, in any way, the scope of the present invention.

A first aspect of certain example embodiments is directed to a storage medium having stored thereon an information processing program executed by a computer (10) of an information processing apparatus (5) which performs a processing using acceleration data (accn) outputted by an acceleration sensor (701, 706) for detecting for an acceleration, in at least one axial direction, applied to a predetermined housing (70, 71, 76, 77) thereof. The information processing program causes the computer to function as: acceleration data acquisition means (step 43, the CPU 10 which executes step 103; hereinafter, only step numbers will be represented); accumulation vector calculation means (S48, S108); following vector calculation means (S49, S109); differential vector calculation means (S50, S110); and processing means (S51, S113). The acceleration data acquisition means repeatedly acquires the acceleration data. The accumulation vector calculation means calculates an accumulation vector (veca) by sequentially accumulating an acceleration vector having a magnitude and a direction of the acceleration represented by the acceleration data acquired by the acceleration data acquisition means. The following vector calculation means calculates a following vector (vecg) which follows, at a predetermined rate (K), the accumulation vector calculated by the accumulation vector calculation means, by using the acceleration data acquired by the acceleration data acquisition means. The differential vector calculation means calculates, as a differential vector (vecd), a difference between the accumulation vector and the following vector. The processing means designates a position (pos) in a virtual world displayed by a display device (2) using a value (vecdX, vecdY, vecdZ, daX, daY, daZ) determined in accordance with the differential vector, and performs a predetermined processing by using the position.

In a second aspect based on the first aspect, the processing means designates the position, in the virtual world, corresponding to axial component values (vecdX, vecdY, vecdZ) of the differential vector, and performs the predetermined processing using the position.

In a third aspect based on the second aspect, the accumulation vector calculation means includes attenuation processing means (S47, S107). The attenuation processing means sequentially attenuates the accumulation vector before or after the acceleration vector is added to the accumulation vector.

In a fourth aspect based on the second aspect, when a magnitude of the differential vector calculated by the differential vector calculation means is larger than a predetermined threshold value, the processing means designates the position, in the virtual world, corresponding to the axial component values of the differential vector, and performs the predetermined processing by using the position.

In a fifth aspect based on the second aspect, the acceleration sensor is capable of detecting for the acceleration having the magnitude within a predetermined measurable range. The information processing program causes the computer to further function as change amount vector calculation means (S82, S86, S90) and estimated acceleration vector calculation means (S83, S84, S87, S88, S91, S92). The change amount vector calculation means calculates, by using the acceleration data acquired by the acceleration data acquisition means, a change amount vector (accv) representing a change amount of the acceleration, when the magnitude of the acceleration represented by the acceleration data acquired by the acceleration data acquisition means has a value within the predetermined measurable range (Yes in S81, S85, S89). The estimated acceleration vector calculation means calculates, when the magnitude of the acceleration represented by the acceleration data acquired by the acceleration data acquisition means has a value outside the predetermined measurable range (No in S81, s85, S89), an estimated acceleration vector (accn) by attenuating, by a predetermined amount, the change amount vector immediately preceding the change amount vector being currently calculated so as to update the change amount vector, and adding the updated change amount vector to the acceleration vector having been most recently used by the accumulation vector calculation means. The accumulation vector calculation means updates, when the magnitude of the acceleration vector having the magnitude and the direction of the acceleration represented by the acceleration data acquired by the acceleration data acquisition means has a value outside the predetermined measurable range, the accumulation vector by adding the estimated acceleration vector to the accumulation vector.

In a sixth aspect based on the second aspect, the predetermined processing performed by the processing means is a process of positioning a predetermined object (OBJ) at the position having been designated in the virtual world, and moving the predetermined object in the virtual world in accordance with the position being moved.

In a seventh aspect based on the second aspect, the processing means designates the position by associating the axial component values of the differential vector with coordinate values of a coordinate system (xyz) defined in the virtual world, respectively. The processing means moves, in the virtual world, an originating point (reference position) of the coordinate system defined in the virtual world when a predetermined condition is satisfied.

In an eighth aspect based on the second aspect, the acceleration data acquisition means repeatedly acquires, when an input device (7) has a first housing and a second housing (71, 77), first acceleration data outputted by a first acceleration sensor mounted in the first housing, and second acceleration data outputted by a second acceleration sensor mounted in the second housing. The accumulation vector calculation means sequentially accumulates a first acceleration vector having a magnitude and a direction of an acceleration represented by the first acceleration data, so as to calculate a first accumulation vector, and sequentially accumulates a second acceleration vector having a magnitude and a direction of an acceleration represented by the second acceleration data, so as to calculate a second accumulation vector. The following vector calculation means calculates a first following vector which follows, at a predetermined rate, the first accumulation vector, by using the first acceleration data, and calculates a second following vector which follows, at a predetermined rate, the second accumulation vector, by using the second acceleration data. The differential vector calculation means calculates, as a first differential vector, a difference between the first accumulation vector and the first following vector, and calculates, as a second differential vector, a difference between the second accumulation vector and the second following vector. The processing means designates a first position by associating axial component values of the first differential vector with coordinate values of a first coordinate system defined in the virtual world, respectively, and designates a second position by associating axial component values of the second differential vector with coordinate values of a second coordinate system, respectively, which is different from the first coordinate system and defined in the virtual world. The predetermined processing performed by the processing means is a process of positioning a first object (OBJ1) at the first position and a second object (OBJ2) at the second position, and moving the first object and the second object in the virtual world in accordance with the first position and the second position being moved, respectively.

In a ninth aspect based on the first aspect, the information processing program causes the computer to further function as accumulation differential value calculation means (S112). The accumulation differential value calculation means calculates an accumulation differential value (da) by sequentially accumulating the differential vector calculated by the differential vector calculation means, in units of axial component values thereof. The processing means designates the position, in the virtual world, corresponding to the accumulation differential value (daX, daY, daZ) calculated by the accumulation differential value calculation means, and performs the predetermined processing using the position.

In a tenth aspect based on the ninth aspect, the accumulation vector calculation means includes attenuation processing means. The attenuation processing means sequentially attenuates the accumulation vector before or after the acceleration vector is added to the accumulation vector.

In an eleventh aspect based on the ninth aspect, the accumulation differential value calculation means calculates the accumulation differential value by sequentially accumulating the differential vector in units of the axial component values thereof when a magnitude of the differential vector calculated by the differential vector calculation means is larger than a predetermined threshold value.

In a twelfth aspect based on the ninth aspect, the acceleration sensor is capable of detecting for the acceleration having the magnitude within a predetermined measurable range. The information processing program causes the computer to further function as change amount vector calculation means and estimated acceleration vector calculation means. The change amount vector calculation means calculates, by using the acceleration data acquired by the acceleration data acquisition means, a change amount vector representing a change amount of the acceleration, when the magnitude of the acceleration represented by the acceleration data acquired by the acceleration data acquisition means has a value within the predetermined measurable range. The estimated acceleration vector calculation means calculates, when the magnitude of the acceleration represented by the acceleration data acquired by the acceleration data acquisition means has a value outside the predetermined measurable range, an estimated acceleration vector by attenuating, by a predetermined amount, the change amount vector immediately preceding the change amount vector being currently calculated so as to update the change amount vector, and adding the updated change amount vector to the acceleration vector having been most recently used by the accumulation vector calculation means. The accumulation vector calculation means updates, when the magnitude of the acceleration vector having the magnitude and the direction of the acceleration represented by the acceleration data acquired by the acceleration data acquisition means has a value outside the predetermined measurable range, the accumulation vector by adding the estimated acceleration vector to the accumulation vector.

In a thirteenth aspect based on the ninth aspect, the predetermined processing performed by the processing means is a process of positioning a predetermined object at the position having been designated in the virtual world, and moving the predetermined object in the virtual world in accordance with the position being moved.

In a fourteenth aspect based on the ninth aspect, the predetermined housing includes at least one operation button (72) for outputting predetermined operation data in accordance with a user pressing the at least one operation button. The information processing program causes the computer to further function as operation data acquisition means (S111). The operation data acquisition means repeatedly acquires the operation data. The accumulation differential value calculation means sequentially accumulates the differential vector in units of the axial component values thereof only when the operation data indicating that a predetermined operation button among the at least one operation button is pressed is acquired.

A fifteenth aspect of certain example embodiments is directed to an information processing apparatus for performing a processing using acceleration data outputted by an acceleration sensor for detecting for an acceleration, in at least one axial direction, applied to a predetermined housing thereof. The information processing apparatus comprises: acceleration data acquisition means; accumulation vector calculation means; following vector calculation means; differential vector calculation means; and processing means. The acceleration data acquisition means repeatedly acquires the acceleration data. The accumulation vector calculation means calculates an accumulation vector by sequentially accumulating an acceleration vector having a magnitude and a direction of the acceleration represented by the acceleration data acquired by the acceleration data acquisition means. The following vector calculation means calculates a following vector which follows, at a predetermined rate, the accumulation vector calculated by the accumulation vector calculation means, by using the acceleration data acquired by the acceleration data acquisition means. The differential vector calculation means calculates, as a differential vector, a difference between the accumulation vector and the following vector. The processing means designates a position in a virtual world displayed by a display device using a value determined in accordance with the differential vector, and performs a predetermined processing by using the position.

According to the first aspect, a value (for example, the respective axial component values of the differential vector or a value obtained by accumulating the differential vector in units of axial component values thereof) determined in accordance with the differential vector is used as a three-dimensional position in the real space relative to a position at which the housing has started to be moved, so as to designate a position in the virtual world. Therefore, it is possible to accurately designate the position by using an output value from an inexpensive acceleration sensor.

According to the second aspect, the respective axial component values of the differential vector are used as the three-dimensional position in the real space relative to a position at which the housing has started to be moved, so as to designate a position in the virtual world. Therefore, it is possible to accurately designate the position by using an output value from an inexpensive acceleration sensor. For example, when a user moves the housing, which has been at rest, in a certain direction and then stops the housing, the differential vector represents this movement and eventually has a value of zero. Therefore, a position obtained by, for example, scaling the respective axial component values of the differential vector in the virtual world so as to designate a coordinate point corresponding to the respective axial component values is moved from the reference position toward the direction in which the housing is moved, and eventually returns to the reference position. In certain example embodiments it is greatly useful for coordinate designation in which a position is moved in the virtual world in accordance with the housing being moved, and returns to the reference position eventually or at certain intervals. Further, a movement of the position designated in the virtual world may be adjusted in accordance with a degree to which the following vector follows the accumulation vector. For example, when the degree to which the following vector follows the accumulation vector is high, the following vector includes a dynamic acceleration component obtained by moving the housing. Therefore, it is difficult to maintain, in the virtual world, the position designated by moving the housing, and a time at which the position returns to the reference position is advanced. On the other hand, when the degree to which the following vector follows the accumulation vector is low, the dynamic acceleration component continues to be included in the accumulation vector for a certain time period after the housing stops. Therefore, the position designated by moving the housing tends to be maintained in the virtual world, and a time at which the position returns to the reference position is delayed.

According to the third and the tenth aspects, when the differential vector is attenuated, an accuracy error of a device such as the acceleration sensor can be alleviated, and when the housing is at rest, the magnitude of the differential vector can securely become almost zero, and the magnitude does not change. Further, when the attenuation of the differential vector is increased, a position is designated in response to a large movement of the housing. On the other hand, when the attenuation of the differential vector is reduced, a position is designated in response to a small movement of the housing. That is, the attenuation rate of the differential vector is adjusted so as to adjust responsiveness to the operation.

According to the fourth aspect, when the magnitude of the differential vector is larger than a predetermined threshold value, the differential vector is used for the predetermined processing performed by the processing means. Therefore, a subtle movement applied to the housing is cancelled, thereby preventing an erroneous determination of the movement of the housing.

According to the fifth and the twelfth aspects, even when the acceleration has a value outside the measurable range of the acceleration sensor, the acceleration can be estimated so as to accurately designate a position.

According to the sixth and the thirteenth aspects, an object is positioned at a position, in the virtual world, designated so as to represent the respective axial component values of the differential vector or a value obtained by accumulating the differential vector in units of the axial component values thereof, and it is possible to realize a game or an information processing for allowing the object to be moved in accordance with the position being moved.

According to the seventh aspect, a position can be designated in the virtual world without limit, thereby realizing an operation with enhanced flexibility.

According to the eighth aspect, when an input device including a plurality of housings is used so as to perform an operation by moving the plurality of housings, it is possible to designate different positions in accordance with each housing being moved, thereby enabling an operation of moving different objects in the virtual world.

According to the ninth aspect, a value obtained by accumulating the differential vector in units of the axial component values thereof is used as a three-dimensional position in the real space relative to a position at which the housing has started to be moved, so as to designate a position in the virtual world. Therefore, it is possible to accurately designate the position by using an output value from an inexpensive acceleration sensor. For example, the value obtained by accumulating the differential vector in units of the axial component values thereof can be also used as a parameter emulating a relative position, in the real space, to which a user moves the housing, thereby allowing designation of a position in the virtual world based on the relative position of the housing.

According to the eleventh aspect, when the magnitude of the differential vector is larger than a predetermined threshold value, the accumulation processing is performed by the accumulation differential value calculation means. Therefore, in the predetermined processing performed by the processing means, a subtle movement applied to the housing is cancelled, thereby preventing an erroneous determination of a movement of the housing.

According to the fourteenth aspect, only while a user presses a predetermined operation button of the housing, the operation is enabled. Even after the user stops pressing the predetermined operation button, the position which has been most recently designated is maintained, and therefore it is easy to designate any position as intended by the user.

Further, the information processing apparatus of certain example embodiments can produce the same effect as that obtained by the storage medium having stored thereon the information processing program described above.

These and other objects, features, aspects and advantages certain example embodiments will become more apparent from the following detailed description when taken in conjunction with the accompanying drawings.

BRIEF DESCRIPTION OF THE DRAWINGS

FIG. 7 is a perspective view illustrating a state where a lower casing of the core unit 70 shown in FIG. 5 is removed;

FIG. 11 is a diagram illustrating in general a state where a game operation is performed using the controller 7 shown in FIG. 3;

FIG. 12 is a diagram illustrating a first example of a process performed in accordance with the controller 7 being moved;

FIG. 13 is a diagram illustrating a second example of a process performed in accordance with the controller 7 being moved;

FIG. 14 is a diagram illustrating a third example of a process performed in accordance with the controller 7 being moved;

FIG. 19 is a diagram illustrating an exemplary relationship between the real space in which a player moves the core unit 70 and a virtual game space displayed on a monitor 2;

FIG. 23 is a diagram illustrating another exemplary relationship between the real space in which a player moves the core unit 70 and a virtual game space displayed on a monitor 2.

DETAILED DESCRIPTION

Figure 1:
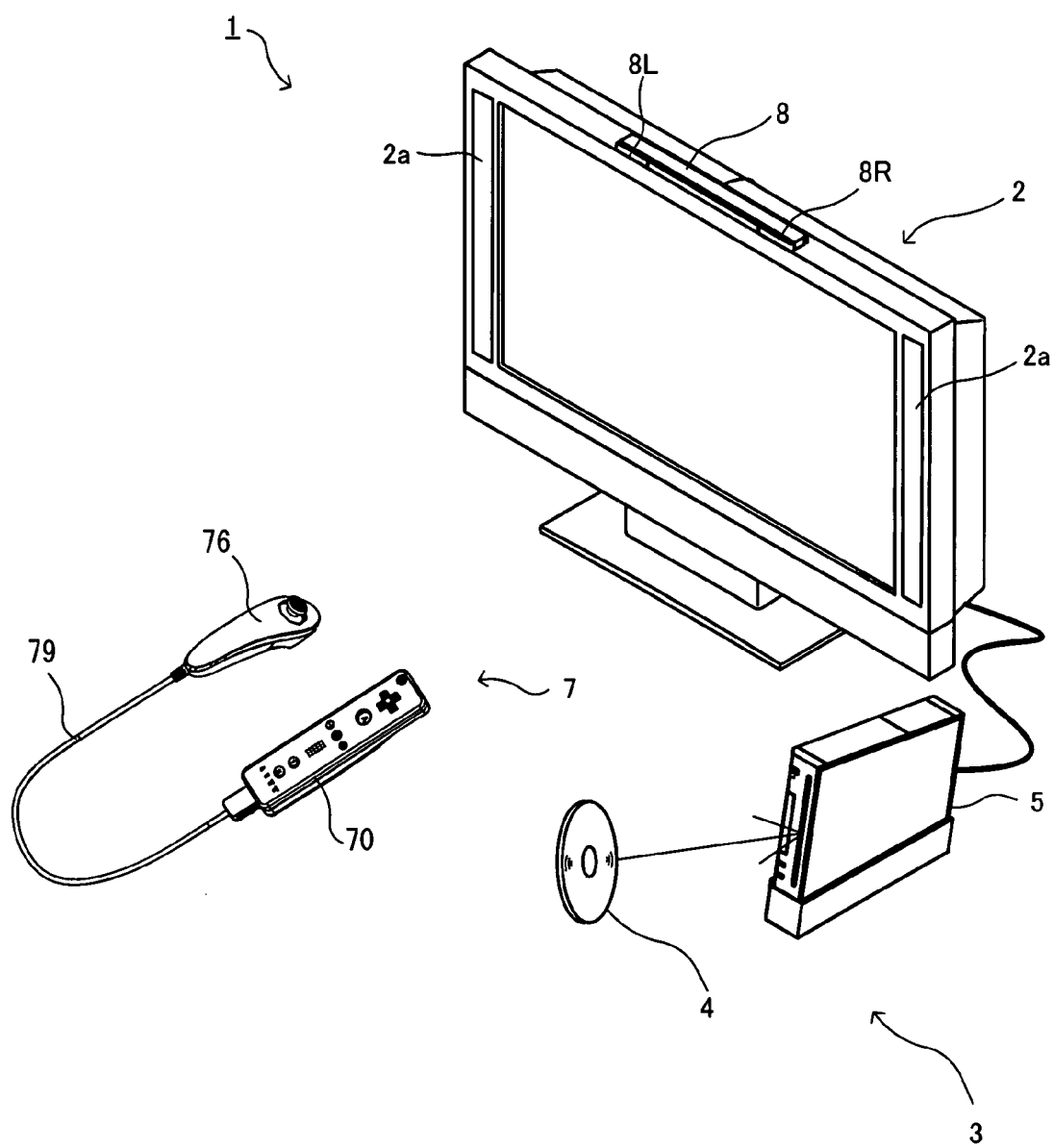
FIG. 1 is an external view illustrating a game system 1 according to an embodiment.
Figure 2:
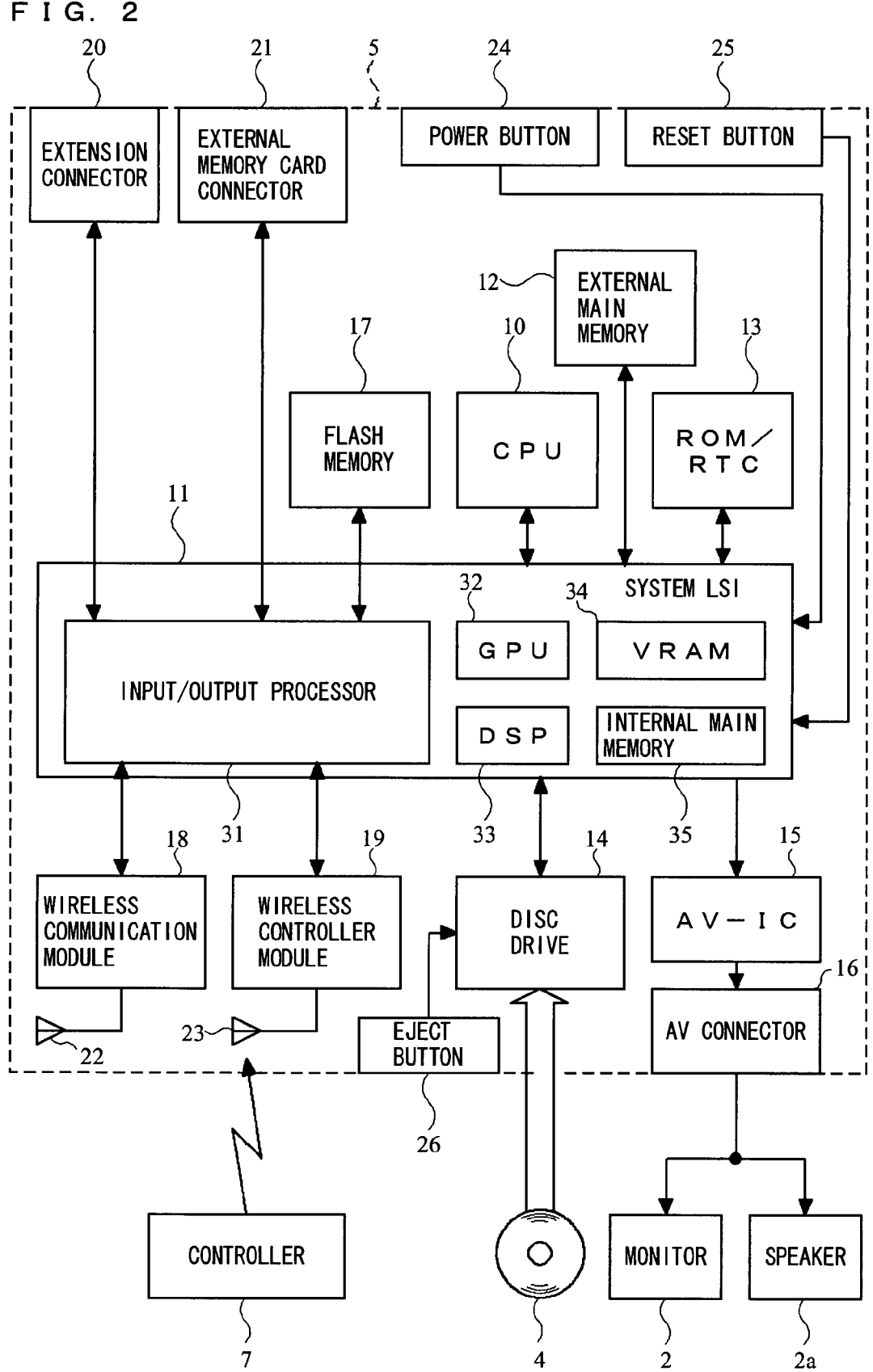
FIG. 2 is a functional block diagram of a game apparatus body 5 shown in FIG. 1.

With reference to FIGS. 1 and 2, an apparatus for executing an information processing program according to an embodiment will be described. Hereinafter, in order to give specific description, a game system including a stationary game apparatus body 5 will be described. FIG. 1 is an external view illustrating a game system 1 including a stationary game apparatus 3, and FIG. 2 is a block diagram illustrating the game apparatus body 5. Hereinafter, the game system 1 will be described.

As shown in FIG. 1, the game system 1 includes a home-use television receiver (hereinafter, referred to as a monitor) 2 typifying display means, and the stationary game apparatus 3 connected to the monitor 2 via a connection cord. The monitor 2 includes a speaker 2a for outputting as a sound an audio signal outputted by the game apparatus body 5. On the other hand, the game apparatus 3 includes the game apparatus body 5 and a controller 7. The game apparatus body 5 has detachably mounted thereon an optical disc 4 on which a game is stored, and has a computer for executing the game program stored in the optical disc 4 so as to display a game screen on the monitor 2. The controller 7 is used to supply, to the game apparatus body 5, operation information necessary for a game in which a character and the like displayed on the game screen are controlled.

Further, the game apparatus body 5 incorporates a wireless controller module 19 (see FIG. 2). The wireless controller module 19 connects between the game apparatus body 5 and the controller 7 by radio communication such that the wireless controller module 19 receives data which is wirelessly transmitted by the controller 7, and the game apparatus body 5 wirelessly transmits data to the controller 7. Moreover, the game apparatus body 5 has detachably mounted thereon the optical disc 4 typifying an exchangeable information storage medium.

Further, the game apparatus body 5 includes a flash memory 17 (see FIG. 2) serving as a backup memory for fixedly storing saved data and the like. The game apparatus body 5 executes the game program or the like stored on the optical disc 4 and displays a resultant game image on the monitor 2. The game program and the like to be executed may be previously stored in the flash memory 17 instead of the optical disc 4. The game apparatus body 5 can also reproduce a state of a game played in the past by using saved data stored in the flash memory 17 and display a game image on the monitor 2. A player playing with the game apparatus body 5 can enjoy the game by operating the controller 7 while watching the game image displayed on the monitor 2.

The controller 7 wirelessly transmits transmission data, such as operation information, to the game apparatus body 5 incorporating the wireless controller module 19, by using the technology of, for example, Bluetooth (registered trademark). The controller 7 includes two control units, a core unit 70 and a subunit 76, connected to each other by a flexible connecting cable 79. The controller 7 is operation means for mainly operating objects and the like displayed on the display screen of the monitor 2. The core unit 70 and the subunit 76 each includes a housing which is small enough to be held by one hand, and a plurality of operation buttons, such as a cross key and a stick, exposed at the surface of the housing. As described below in detail, the core unit 70 includes an imaging information calculation section 74 for taking an image viewed from the core unit 70. As an example of an imaging target of the imaging information calculation section 74, two LED modules (hereinafter, referred to markers) 8L and 8R are provided in the vicinity of the display screen of the monitor 2. The markers 8L and 8R each outputs infrared light or the like forward from the monitor 2. Further, when the controller 7 (for example, the core unit 70) receives, at a communication section 75, transmission data which is wirelessly transmitted from the wireless controller module 19 of the game apparatus body 5, the controller 7 may generate a sound or a vibration based on the transmission data.

Although in the present example the core unit 70 and the subunit 76 are connected to each other by the flexible connection cable 79, the subunit 76 may have a wireless unit, thereby eliminating the connection cable 79. For example, the subunit 76 has a Bluetooth (registered trademark) unit as the wireless unit, whereby the subunit 76 is allowed to transmit operation data to the core unit 70.

Next, with reference to FIG. 2, an internal structure of the game apparatus body 5 will be described. The game apparatus body 5 includes: the CPU (central processing unit) 10; a system LSI (large scale integration) 11; an external main memory 12; a ROM/RTC (read only memory/real time clock) 13; a disc drive 14; an AV-IC (audio video-integrated circuit) 15, and the like.

The CPU 10, serving as a game processor, executes the game program stored in the optical disc 4 so as to perform a game processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal configuration of the system LSI 11 will be described below. The external main memory 12, which is of a volatile type, stores programs, such as a game program loaded from the optical disc 4 or the flash memory 17, and various data, and is used as a work area and a buffer area for the CPU 10. The ROM/RTC 13 includes a ROM (so-called a boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below, or the external main memory 12.

Further, provided in the system LSI 11 are an input/output processor 31, a GPU (graphics processor unit) 32, a DSP (digital signal processor) 33, a VRAM (video RAM) 34, and the internal main memory 35. These component 31 to 35 are connected to each other via an internal bus not shown.

The GPU 32, which is a part of rendering means, generates an image in accordance with a graphics command (draw command) from the CPU 10. The VRAM 34 stores data (such as polygon data and texture data) necessary for the GPU 32 to execute the graphics command. When an image is generated, the GPU 32 generates image data by using the data stored in the VRAM 34.

The DSP 33 functions as an audio processor, and generates audio data by using sound data and sound waveform (tone quality) data stored in the internal main memory 35 and the external main memory 12.

The image data and the audio data generated as described above, are read by the AV-IC 15. The AV-IC 15 outputs the read image data to the monitor 2 via an AV connector 16, and also outputs the read audio data to the speaker 2a of the monitor 2. Accordingly, the image is displayed on the monitor 2, and the sound is outputted from the speaker 2a.

The input/output processor (I/O processor) 31 executes data reception and transmission among the components connected thereto and data downloading from an external apparatus. The input/output processor 31 is connected to the flash memory 17, a wireless communication module 18, the wireless controller module 19, an extension connector 20, and an external memory card connector 21. To the wireless communication module 18, an antenna 22 is connected, and to the wireless controller module 19, an antenna 23 is connected.

The input/output processor 31 is connected to a network via the wireless communication module 18 and the antenna 22 so as to communicate with other game apparatuses or various servers connected to the network. The input/output processor 31 accesses the flash memory 17 at regular intervals so as to detect for data to be transmitted to the network. When the data to be transmitted is detected, the data is transmitted to the network via the wireless communication module 18 and the antenna 22. Further, the input/output processor 31 receives, via the network, the antenna 22 and the wireless communication module 18, data transmitted from the other game apparatuses or data downloaded from a download server, and stores the received data in the flash memory 17. The CPU 10 executes the game program so as to read the data stored in the flash memory 17, thereby using the read data on the game program. The flash memory 17 may store not only the data transmitted and received among the game apparatus body 5, and other game apparatuses or the various servers, but also saved data (result data or intermediate step data of the game) of a game played with the game apparatus body 5.

Further, the input/output processor 31 receives the operation data and the like transmitted from the controller 7 via the antenna 23 and the wireless controller module 19, and (temporarily) stores the operation data and the like in a buffer area of the internal main memory 35 or the external main memory 12. As with the external main memory 12, the internal main memory 35 may store various data and/or programs such as the game program read from the optical disc 4, or the game program read from the flash memory 17, and may be used as the work area or the buffer area of the CPU 10.

Further, the input/output processor 31 is connected to the extension connector 20 and the external memory card connector 21. The extension connector 20, which is an interface connector such as a USB and an SCSI, allows communication with the network, without using the wireless communication module 18, by connecting, to the extension connector 20, media such as an external storage medium, or a peripheral device such as another controller, or a wired communication connector. The external memory card connector 21 is a connector for connecting to the external memory card connector 21 the external storage medium such as a memory card. For example, the input/output processor 31 accesses the external storage medium via the extension connector 20 or the external memory card connector 21, so as to store data or read data.

The game apparatus body 5 has, on the main front surface or the like, a power button 24 of the game apparatus body 5, a reset button 25 for resetting a game process, an opening through which the optical disc 4 is mounted/dismounted, and an eject button 26 for ejecting the optical disc 4 from the game apparatus body 5 through the opening, and the like. The power button 24 and the reset button 25 are connected to the system LSI 11. When the power button 24 is pressed so as to be ON, the power is supplied to the respective components of the game apparatus body 5 via an AC adapter which is not shown. Further, when the reset button 25 is pressed, the system LSI 11 restarts a boot program of the game apparatus body 5. The eject button 26 is connected to the disc drive 14. When the eject button 26 is pressed, the optical disc 4 is ejected from the disc drive 14.

Figure 3:
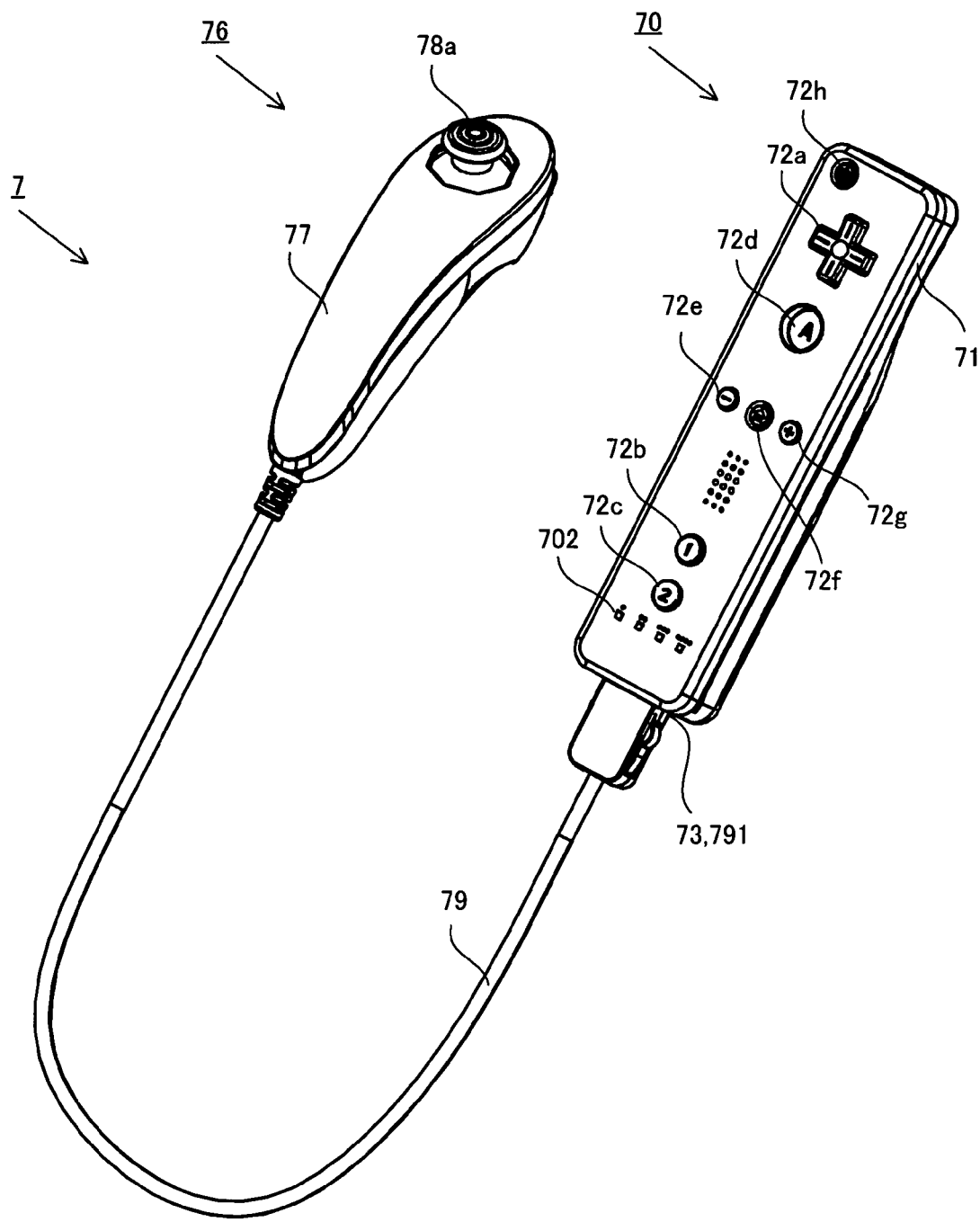
FIG. 3 is a perspective view illustrating an outer appearance of a controller 7 shown in FIG. 1.

Next, with reference to FIG. 3, the controller 7 will be described. FIG. 3 is a perspective view illustrating an outer appearance of the controller 7.

As shown in FIG. 3, the controller 7 includes the core unit 70 and the subunit 76 connected to each other by the connection cable 79. The core unit 70 has a housing 71 including a plurality of operation sections 72. On the other hand, the subunit 76 has a housing 77 including a plurality of operation sections 78.

The connection cable 79 has a connector 791 detachably connected to the connector 73 of the core unit 70 at one end thereof, and the connection cable 79 is fixedly connected to the subunit 76 at the other end thereof. The connector 791 of the connection cable 79 is engaged with the connector 73 provided at the rear surface of the core unit 70 so as to connect between the subunit 76 and the core unit 70 by the connection cable 79.

Figure 4:
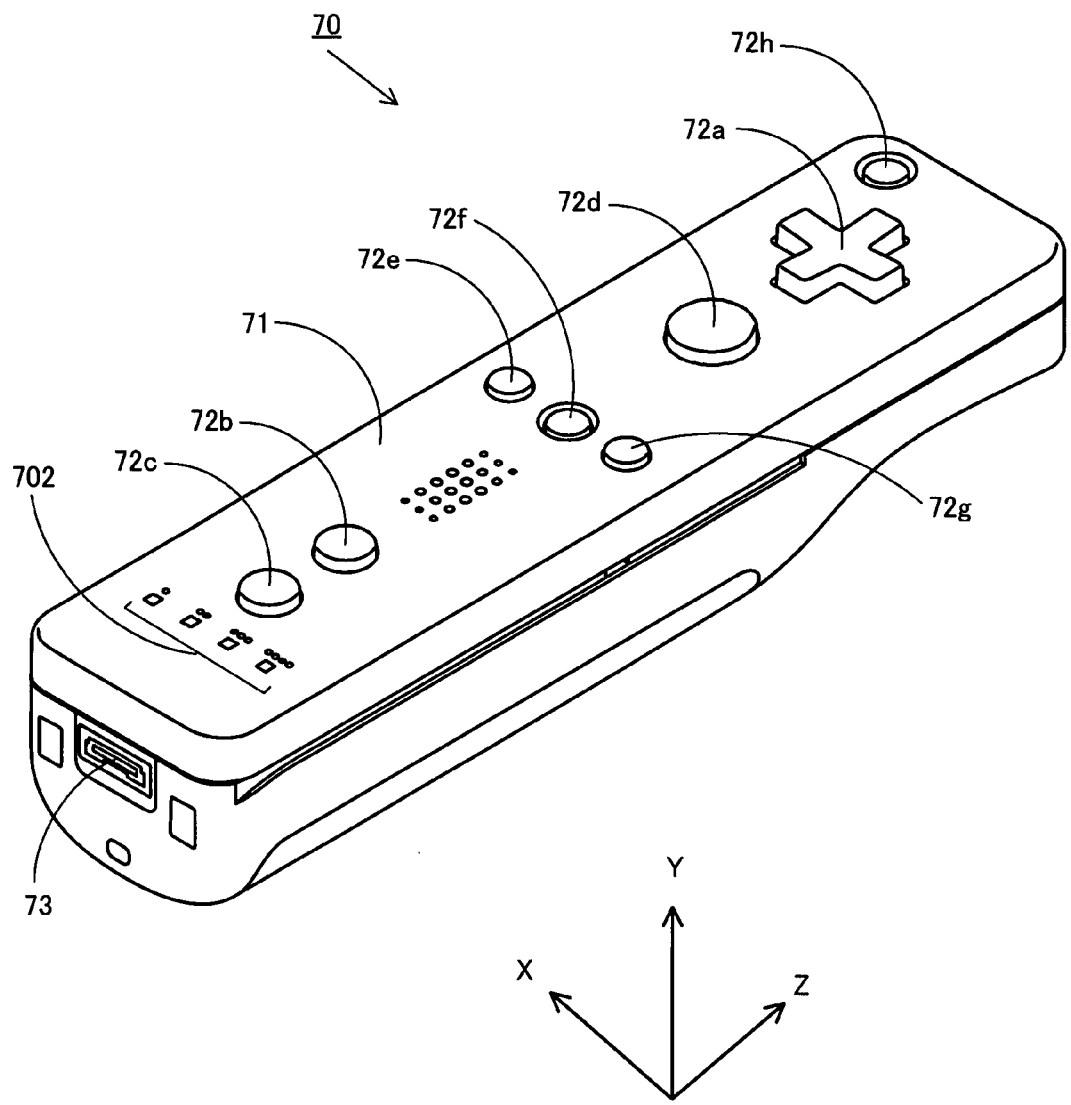
FIG. 4 is a perspective view of a core unit 70 shown in FIG. 3 as viewed from the top rear side thereof.
Figure 5:
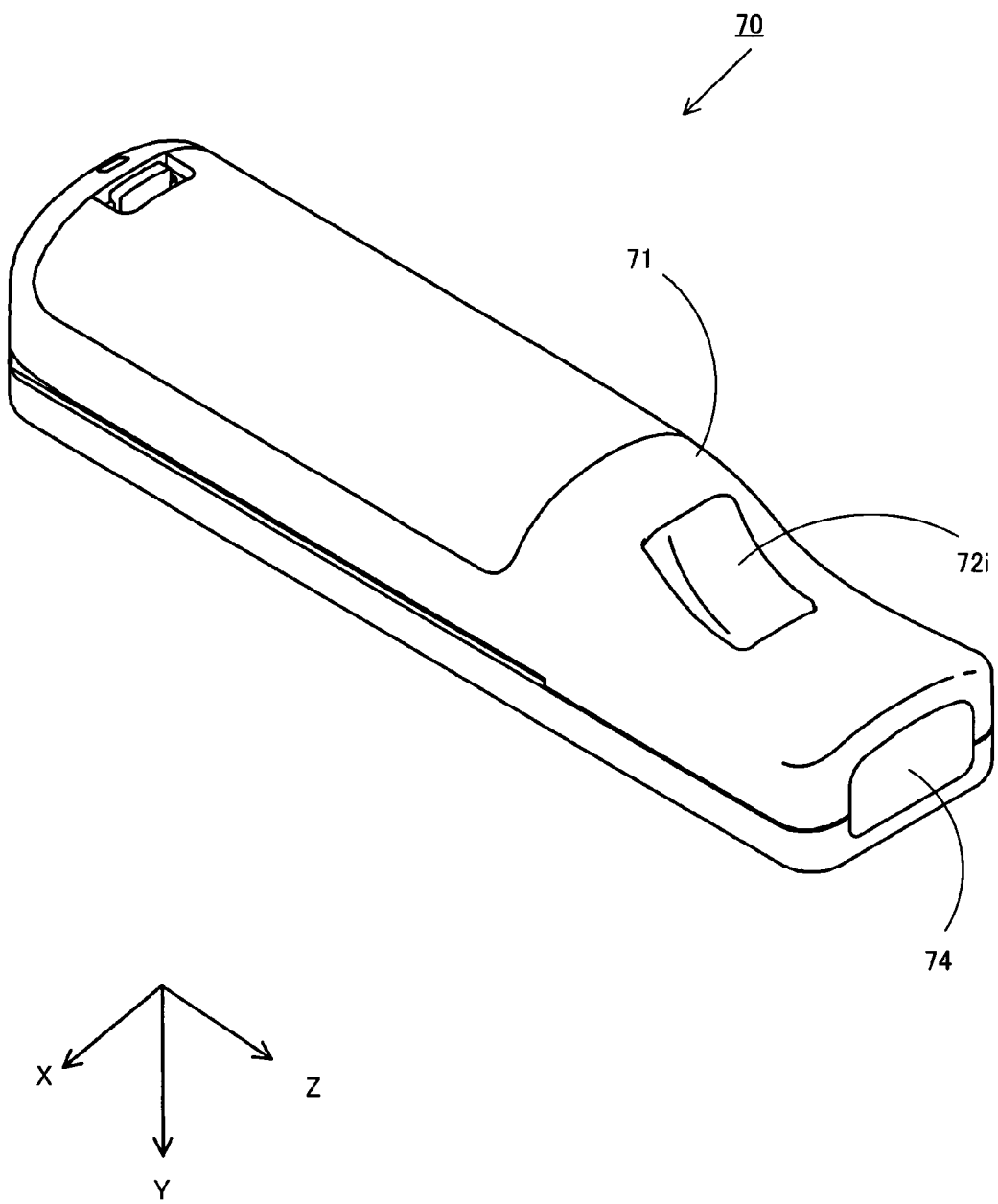
FIG. 5 is a perspective view of the core unit 70 shown in FIG. 4 as viewed from the bottom front side thereof.

With reference to FIGS. 4 and 5, the core unit 70 will be described. FIG. 4 is a perspective view of the core unit 70 as viewed from the top rear side thereof. FIG. 5 is a perspective view of the core unit 70 as viewed from the bottom front side thereof.

As shown in FIGS. 4 and 5, the core unit 70 includes the housing 71 formed by plastic molding or the like. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions (front, rear, right and left) represented by arrows, which are respectively located on cross-shaped projecting portions arranged at intervals of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

Although the cross key 72a is an operation section for outputting an operation signal in accordance with the aforementioned direction input operation performed by the player, such an operation section may be provided in another form. For example, the cross key 72a may be replaced with a composite switch including a push switch including a ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when the player presses a head thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72b, 72c, 72d, 72e, 72f and 72g are assigned with various functions in accordance with the game program executed by the game apparatus 3. In an exemplary arrangement shown in FIG. 4, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he or she is using. Specifically, the wireless controller module 19 transmits, to the controller 7, a signal for lighting one of the plurality of LEDs 702 corresponding to the controller type.

On the top surface of the housing 71, formed is a sound hole for outputting a sound from a speaker (speaker 706 shown in FIG. 6) between the operation button 72b and the operation buttons 72e, 72f, and 72g.

On a bottom surface of the housing 71, a recessed portion is formed. The recessed portion is formed at a position at which an index finger or middle finger of the player is located when the player holds the core unit 70. On a slope surface of the recessed portion, an operation button 72i is provided. The operation button 72i is an operation section acting as, for example, a B button.

On a front surface of the housing 71, an image pickup element 743 included in the imaging information calculation section 74 is provided. The imaging information calculation section 74 is a system for analyzing image data taken by the core unit 70 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the core unit 70. The imaging information calculation section 74 will be described below in detail. On a rear surface of the housing 71, the connector 73 is provided. The connector 73 is, for example, an edge connector, and is used for engaging and connecting the core unit 70 with, for example, the connection cable.

Here, for giving specific description, a coordinate system is defined for the core unit 70. As shown in FIGS. 4 and 5, XYZ-axes orthogonal to each other are defined for the core unit 70. Specifically, the Z-axis is defined along the longitudinal direction of the housing 71 corresponding to the front-rear direction of the core unit 70, and the direction toward the front surface (the surface on which the imaging information calculation section 74 is provided) of the core unit 70 is defined as the Z-axis positive direction. The Y-axis is defined along the top-bottom direction of the core unit 70, and the direction toward the top surface (the surface on which the operation button 72a is provided) of the housing 71 is defined as the Y-axis positive direction. The X-axis is defined along the right-left direction of the core unit 70, and the direction toward the left side surface (the side surface shown in FIG. 5 but not shown in FIG. 4) of the housing 71 is defined as the X-axis positive direction.

Figure 6:
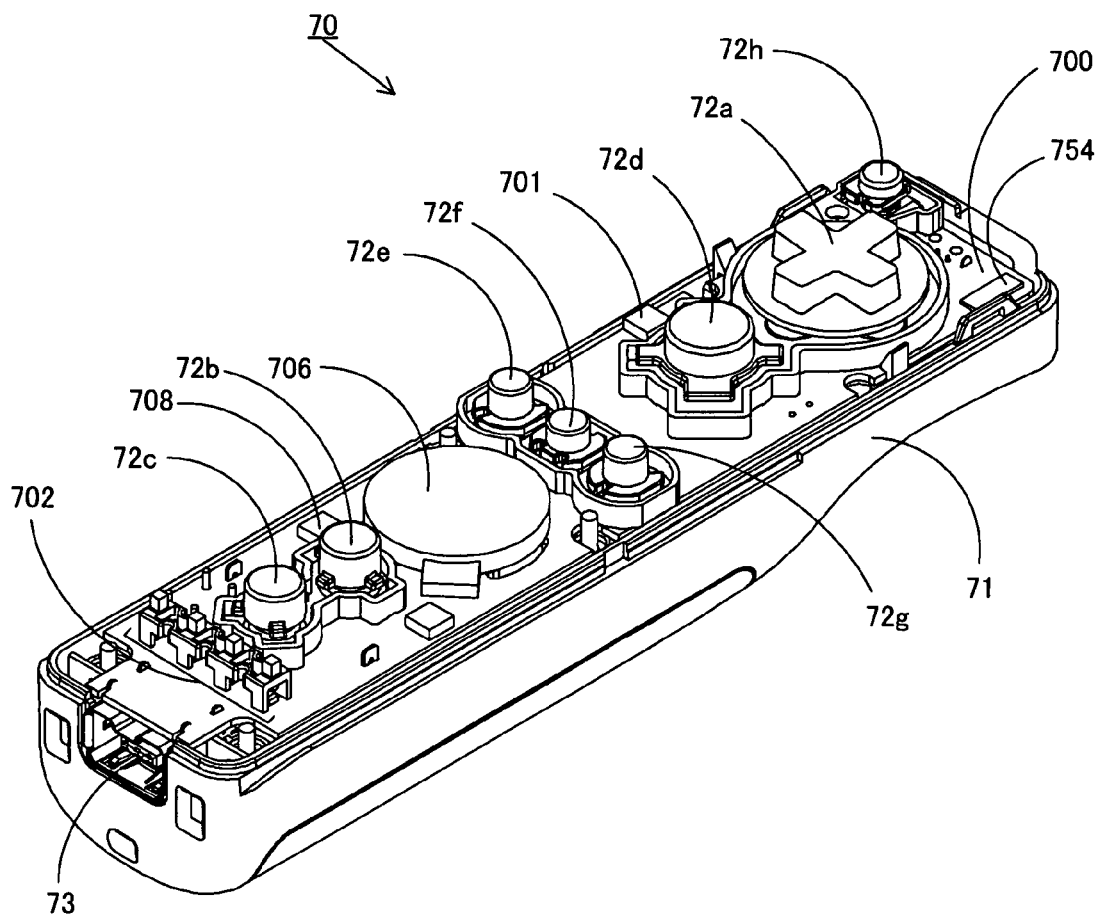
FIG. 6 is a perspective view illustrating a state where an upper casing of the core unit 70 shown in FIG. 3 is removed.

With reference to FIGS. 6 and 7, an internal structure of the core unit 70 will be described. FIG. 6 is a perspective view illustrating a state where an upper casing (a part of the housing 71) of the core unit 70 is removed, as viewed from the rear surface side of the core unit 70. FIG. 7 is a perspective view illustrating a state where a lower casing (a part of the housing 71) of the core unit 70 is removed, as viewed from the front surface side of the core unit 70. FIG. 7 is a perspective view illustrating a reverse side of a substrate 700 shown in FIG. 6.

As shown in FIG. 6, the substrate 700 is fixed inside the housing 71. On a top main surface of the substrate 700, the operation buttons 72a, 72b, 72c, 72d, 72e, 72f, 72g and 72h, an acceleration sensor 701, the LEDs 702, an antenna 754 and the like are provided. These elements are connected to a microcomputer 751 (see FIGS. 7 and 10) and the like via lines (not shown) formed on the substrate 700 and the like. The wireless module 753 (see FIG. 10) and the antenna 754 allow the core unit 70 to act as a wireless controller. A quartz oscillator (not shown), provided in the housing 71, generates a reference clock of the microcomputer 751 described below. On a top main surface of the substrate 700, the speaker 706 and an amplifier 708 are provided. The acceleration sensor 701 is provided not at the center portion of the substrate 700 but near the periphery of the substrate 700. Accordingly, the acceleration sensor 701 is allowed to detect for both a direction change of the gravitational acceleration and an acceleration containing a component generated due to centrifugal force, in accordance with the core unit 70 rotating about the longitudinal direction thereof. Therefore, by performing a predetermined calculation, it is possible to determine a movement of the core unit 70, with preferable accuracy, based on the acceleration data having been detected.

As shown in FIG. 7, at a front edge of a bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the core unit 70 on the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via a wiring formed on the substrate 700 and the like, and outputs an audio signal to the speaker 706 via the amplifier 708 in accordance with sound data transmitted from the game apparatus body 5. On the bottom main surface of the substrate 700, a vibrator 704 is provided. The vibrator 704 may be, for example, a vibration motor or a solenoid. The core unit 70 is vibrated by an actuation of the vibrator 704, and the vibration is conveyed to the player's hand holding the core unit 70. Thus, a so-called vibration-feedback game is realized. The vibrator 704 is positioned slightly in front of the longitudinal center of the housing 71, and therefore a vibration of the housing 71 is enhanced so as to allow a player holding the core unit 70 to easily feel the core unit 70 vibrating.

Figure 8:
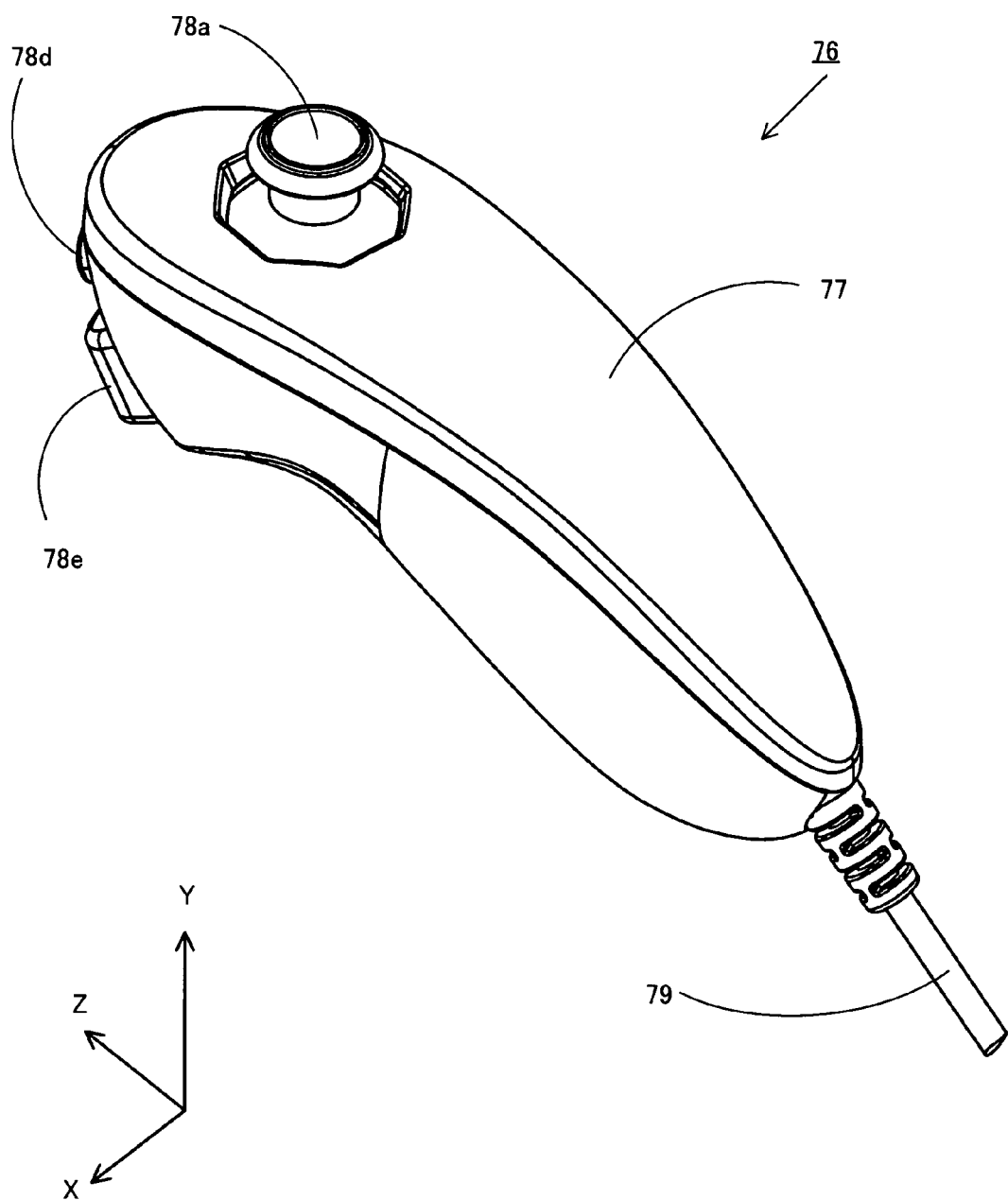
FIG. 8 is a perspective view of an example of a subunit 76.
Figure 9:
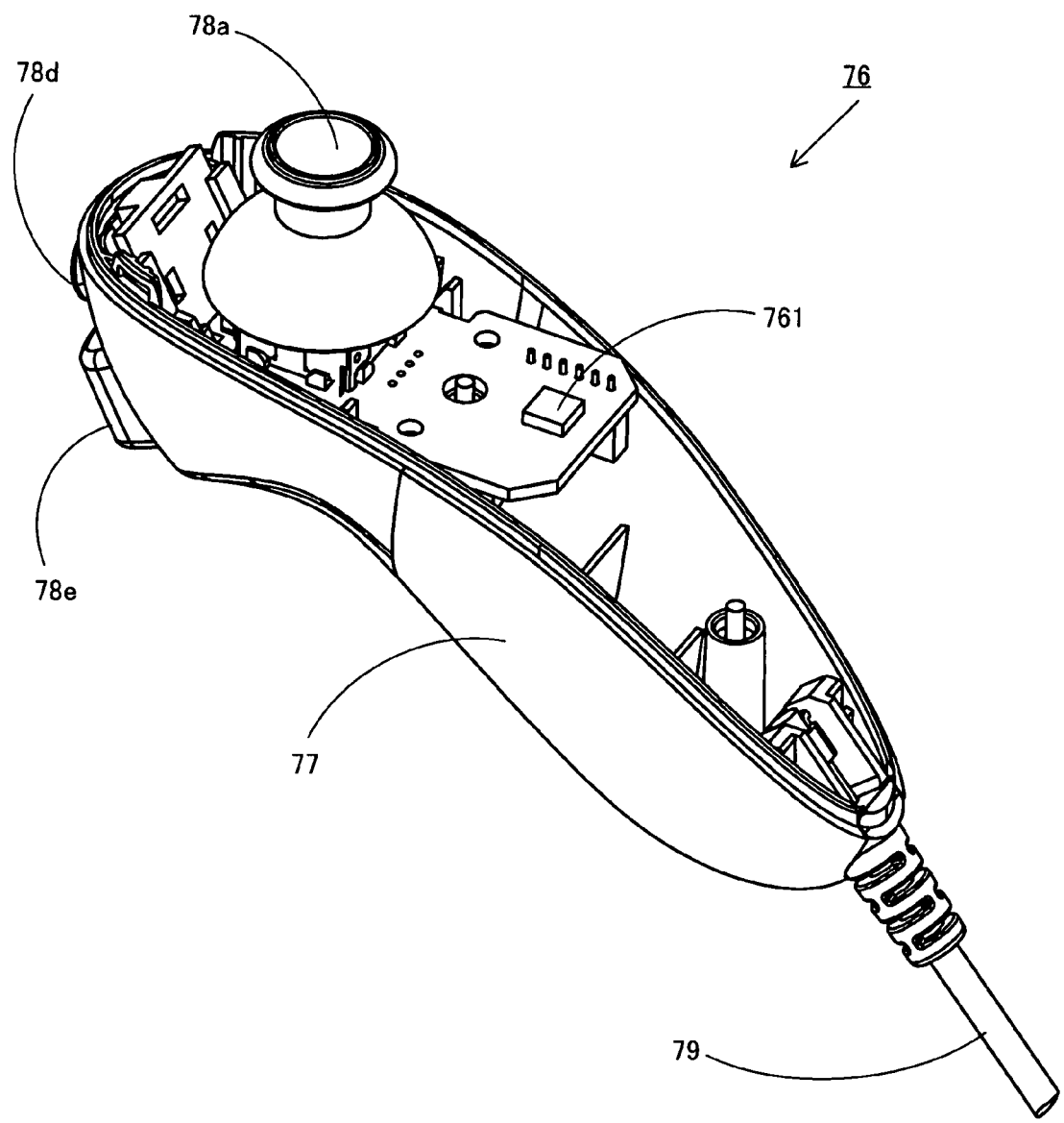
FIG. 9 is a perspective view illustrating a state where an upper casing of the subunit 76 shown in FIG. 8 is removed.

With reference to FIGS. 8 and 9, the subunit 76 will be described. FIG. 8 is a perspective view of an example of the subunit 76. FIG. 9 is a perspective view illustrating a state where an upper casing (a part of the housing 77) of the subunit 76 shown in FIG. 8 is removed.

As shown in FIG. 8, the subunit 76 includes the housing 77 formed by, for example, plastic molding. The housing 77 extends in a longitudinal direction from front to rear, and has a streamline solid shape including a head which is a widest portion in the subunit 76. The overall size of the subunit 76 is small enough to be held by one hand of an adult or even a child.

In the vicinity of the widest portion on the top surface of the housing 77, a stick 78a is provided. The stick 78a is an operation section which includes an inclinable stick projecting from the top surface of the housing 77 and outputs an operation signal in accordance with the inclining direction and/or inclination amount of the stick. For example, a player can optionally designate any direction or any position by inclining a stick tip in any direction of 360 degrees, whereby the player can instruct a direction in which a player character or the like appearing in a virtual game world is to move. Further, the player can instruct an amount of movement of the player character or the like by using the amount of inclination of the stick 78a.

Although the stick 78a is an operation section for outputting an operation signal in accordance with a direction input operation performed by the player, such an operation section may be provided in another form. For example, the stick 78a may be replaced with a cross key as described above or a composite switch including a push switch having a ring-shaped four-direction operation section and a center switch provided at the center thereof. The stick 78a may be replaced with an operation section which includes a disc-shaped member horizontally slidable and outputs an operation signal in accordance with the sliding direction of the disc-shaped member. The stick 78*a* may be replaced with a touch pad. The stick 78*a* may be replaced with an operation section which has switches representing at least four directions (front, rear, right and left), and outputs an operation signal in accordance with the switch pressed by a player On the front surface of the housing 77 of the subunit 76, a plurality of operation buttons 78*d* and 78*e* are provided. The operation buttons 78*d* and 78*e* are each an operation section for outputting a respective operation signal assigned to the operation buttons 72*d* and 78*e* when the player presses a head thereof. For example, the operation buttons 78*d* and 78*e* are assigned with functions of an X button and a Y button, for example. The operation buttons 78*d* and 78*e* are assigned with various functions in accordance with the game program executed by the game apparatus 3. In the exemplary arrangement shown in FIG. 8, the operation buttons 78*d* and 78*e* are arranged in a line in the top-bottom direction on the front surface of the housing 77.

As shown in FIG. 9, a substrate is fixedly provided in the housing 77. On the top main surface of the substrate, the stick 78*a*, the acceleration sensor 761 and the like are provided so as to be connected to the connection cable 79 via a wiring (not shown) formed on the substrate or the like. Preferably, the acceleration sensor 761 is positioned at the intersection of the longitudinal center and transverse center of the housing 77.

Here, for giving specific description, a coordinate system is defined for the subunit 76. As shown in FIG. 8, XYZ-axes orthogonal to each other are defined for the subunit 76. Specifically, the Z-axis is defined along the longitudinal direction of the housing 77 corresponding to the front-rear direction of the subunit 76, and the direction toward the front surface (the surface on which the operation buttons 78*d* and 78*e* are provided) of the subunit 76 is defined as the Z-axis positive direction. The Y-axis is defined along the top-bottom direction of the subunit 76, and the direction (the direction in which the stick 78*a* projects) toward the top surface of the housing 77 is defined as the Y-axis positive direction. The X-axis is defined along the right-left direction of the subunit 76, and the direction toward the left side surface (the side surface shown in FIG. 8) of the housing 77 is defined as the X-axis positive direction.

Figure 10:
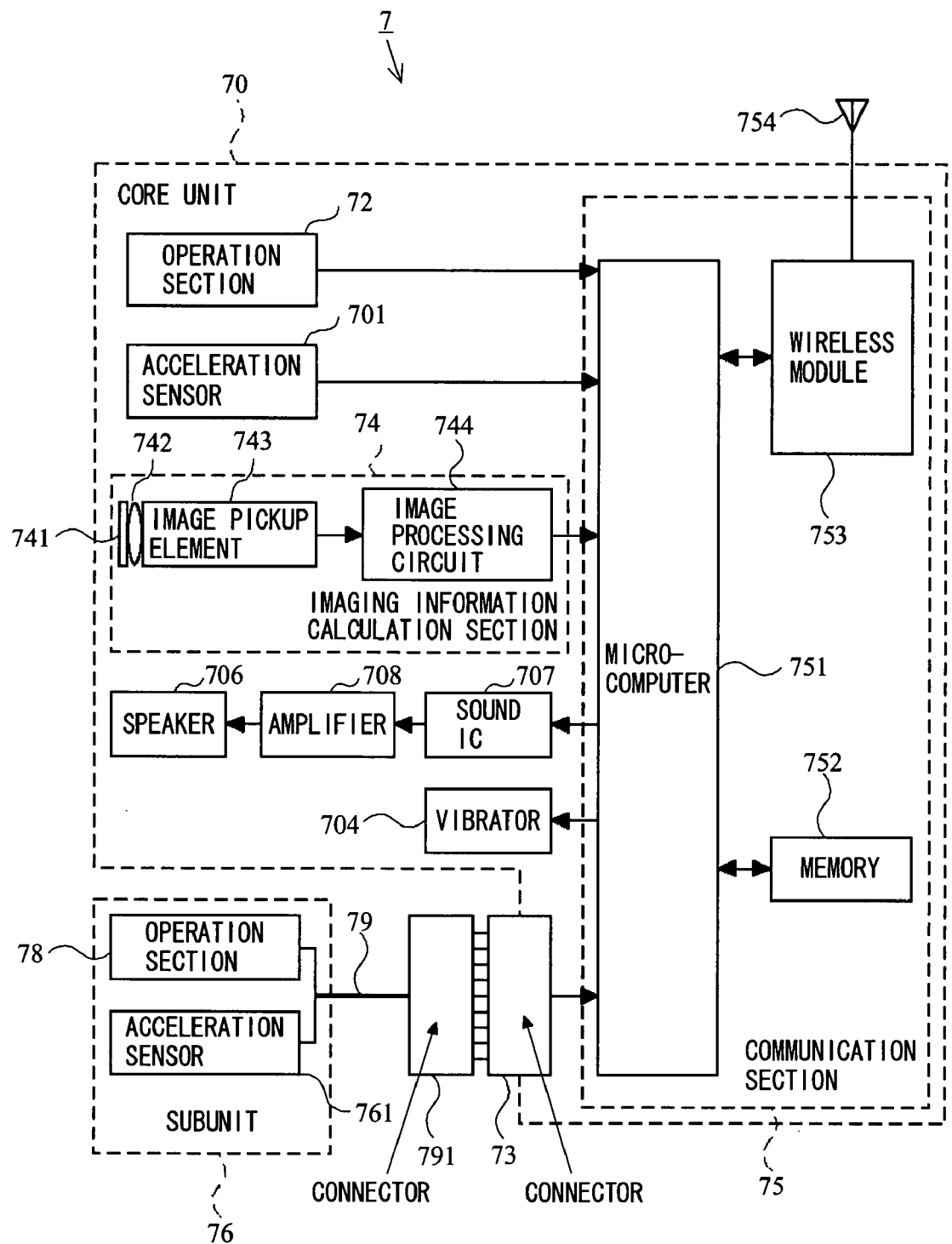
FIG. 10 is a block diagram illustrating a structure of the controller 7 shown in FIG. 3.

Next, with reference to FIG. 10, an internal structure of the controller 7 will be described. FIG. 10 is a block diagram illustrating a structure of the controller 7.

As shown in FIG. 10, the core unit 70 includes the communication section 75 in addition to the operation section 72, the imaging information calculation section 74, the acceleration sensor 701, the vibrator 704, the speaker 706, the sound IC 707, and the amplifier 708, which are described above. The subunit 76 includes the operation section 78 and the acceleration sensor 761 as described above, and is connected to the microcomputer 751 via the connection cable 79, and the connectors 791 and 73.

The imaging information calculation section 74 includes the infrared filter 741, the lens 742, the image pickup element 743 and the image processing circuit 744. The infrared filter 741 allows only infrared light to pass therethrough, among light incident on the front surface of the core unit 70. The lens 742 collects the infrared light which has passed through the infrared filter 741 and outputs the infrared light to the image pickup element 743. The image pickup element 743 is a solid-state image pick-up device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs process result data representing the identified position coordinate point and size of the area to the communication section 75. The imaging information calculation section 74 is fixed to the housing 71 of the core unit 70. The imaging direction of the imaging information calculation section 74 can be changed by changing the direction of the housing 71.

The core unit 70 preferably includes a three-axis (X-axis, Y-axis, and Z-axis) acceleration sensor 701. The subunit 76 preferably includes a three-axis (X-axis, Y-axis, and Z-axis) acceleration sensor 761. The three axis acceleration sensors 701 and 761 each detects a linear acceleration in three directions, that is, the up/down direction, the left/right direction, and the forward/backward direction (the XYZ-axial directions as described above). Further, in another embodiment, two-axis acceleration detection means for detecting only a linear acceleration along the up/down direction and the left/right direction (or any other paired directions) may be used, or one-axis acceleration detection means for detecting only a linear acceleration along any one of the three axes may be used, depending on a type of a control signal used for a game process. For example, the one to three axis acceleration sensors 701 and 761 may be of the type available from Analog Devices, Inc. or STMicroelectronics N.V. Preferably, each of the acceleration sensors 701 and 761 is of electrostatic capacitance (capacitance-coupling) type that is based on silicon micro-machined MEMS (Micro Electro Mechanical Systems) technology. However, any other suitable technology of acceleration detection means (for example, piezoelectric type or piezoresistance type) now existing or later developed may be used to provide the one to three axis acceleration sensors 701 and 761.

As one skilled in the art understand, acceleration detection means, as used in the acceleration sensors 701 and 761, is only capable of detecting an acceleration (linear acceleration) along a straight line corresponding to each axis of the acceleration sensor. In other words, the direct output of each of the acceleration sensors 701 and 761 is limited to signals indicative of the linear acceleration (static or dynamic) along each of the one, two or three axes thereof. As a result, each of the acceleration sensors 701 and 761 cannot directly detect movement along a non-linear (e.g. arcuate) path, rotation, rotational movement, angular displacement, tilt, position, attitude, or any other physical characteristic.

However, when a computer such as a processor (for example, the CPU 10) of the game apparatus or a processor (for example, the microcomputer 751) of the core unit 70 or the subunit 76 processes acceleration signals outputted from each of the acceleration sensors 701 and 761, additional information relating to the core unit 70 and the subunit 76 can be inferred or calculated (determined), as one skilled in the art will readily understand from the description herein.

For example, a case where it is anticipated that the computer will process the acceleration signals outputted from the acceleration sensor 701 of the core unit 70 and the acceleration sensor 761 of the subunit 76 each of which is in a static state (that is, a case where it is anticipated that an acceleration detected by each of the acceleration sensors 701 and 761 will include only a gravitational acceleration) will be described. When each of the core unit 70 and the subunit 76 is actually in the static state, it is possible to determine whether or not each of the core unit 70 and the subunit 76 tilts relative to the gravity direction and to also determine a degree of the tilt, based on the acceleration having been detected. Specifically, when a state where 1G (gravitational acceleration) is applied to a detection axis of each of the acceleration sensors 701 and 761 in the vertically downward direction represents a reference, it is possible to determine whether or not the core unit 70 and the subunit 76 tilt relative to the vertically downward direction, based on only whether or not 1G is applied in the direction of the detection axis of each of the acceleration sensors 701 and 761. Further, it is possible to determine a degree to which the core unit 70 and the subunit 76 tilt relative to the vertically downward direction, based on a magnitude of the acceleration applied in the direction of the detection axis. Further, each of the acceleration sensors 701 and 761 capable of detecting an acceleration in multi-axial directions subjects, to a processing, the acceleration signals having been detected in the respective axes, so as to more specifically determine the degree to which the core unit 70 and the subunit 76 each tilts relative to the gravity direction. In this case, although the processor may calculate, based on the outputs from the acceleration sensors 701 and 761, data representing an angle at which each of the core unit 70 and the subunit 76 tilts, approximate degrees to which the core unit 70 and the subunit 76 tilt may be inferred based on the outputs from the acceleration sensors 701 and 761 without calculating the data representing the angle of the tilt. Thus, when the acceleration sensors 701 and 761 are used in combination with the processor, the tilt, attitude, or position of each of the core unit 70 and the subunit 76 can be determined.

On the other hand, in a case where it is anticipated that each of the acceleration sensors 701 and 761 will be in a dynamic state, the acceleration sensors 701 and 761 detect accelerations based on movements of the acceleration sensors 701 and 761, respectively, in addition to the gravitational acceleration component. Therefore, when the gravitational acceleration components are eliminated through a predetermined process, it is possible to determine, for example, directions in which the core unit 70 and the subunit 76 move. Specifically, when the core unit 70 including the acceleration sensor 701 and the subunit 76 including the acceleration sensor 761 are dynamically accelerated and moved with hands of a player, it is possible to calculate various movements and/or positions of the core unit 70 and the subunit 76 by processing the acceleration signals generated by the acceleration sensors 701 and 761. Further, when it is anticipated that the acceleration sensors 701 and 761 will be in the dynamic state, the accelerations based on the movements of the acceleration sensors 701 and 761 are eliminated through a predetermined process, whereby it is possible to determine the tilts of the core unit 70 and the subunit 76 relative to the gravity direction.

In another embodiment, each of the acceleration sensors 701 and 761 may include an embedded signal processor or another type of dedicated processor for performing any desired processing of the acceleration signals outputted by embedded acceleration detection means prior to outputting signals to the microcomputer 751. For example, when each of the acceleration sensors 701 and 761 is intended to detect a static acceleration (for example, gravitational acceleration), the embedded or dedicated processor could convert the detected acceleration signal to a corresponding tilt angle. Data representing the respective accelerations detected by the acceleration sensors 701 and 761 are outputted to the communication section 75.

When a player moves the core unit 70 and/or the subunit 76 held by the player, the core unit 70 and/or the subunit 76 accelerate at the start of the moving, whereas the core unit 70 and/or the subunit 76 decelerate at the end of the moving. Therefore, at the start of the moving, an acceleration applied to the core unit 70 and/or the subunit 76 has the same direction as the direction in which the player moves the core unit 70 and/or the subunit 76, and thereafter a magnitude of the acceleration is gradually reduced, and, at the end of the moving, the acceleration applied to the core unit 70 and/or the subunit 76 has a direction opposite to the direction in which the player moves the core unit 70 and/or the subunit 76. In general, an acceleration vector outputted by each of the acceleration sensors 701 and 761 has a direction precisely opposite to the direction in which the acceleration is applied to each of the core unit 70 and the subunit 76, or a sign (plus or minus) of an acceleration outputted by each of the acceleration sensors 701 and 761 is different from a sign represented by the direction in which the acceleration is applied to each of the core unit 70 and the subunit 76. Therefore, in the following description, the acceleration sensors 701 and 761 have characteristics that data outputted by the acceleration sensors 701 and 761 represent accelerations having directions precisely opposite to the directions in which the accelerations are applied to the acceleration sensors 701 and 761, respectively. That is, the acceleration sensors 701 and 761 have characteristics that data outputted by the acceleration sensors 701 and 761 represent accelerations having directions precisely opposite to the directions in which the core unit 70 and the subunit 76, respectively, are actually accelerated. Specifically, each of the acceleration sensors 701 and 761 outputs acceleration data based on an inertial force generated by the acceleration. On the other hand, the gravitational acceleration applied to each of the acceleration sensors 701 and 761 of the core unit 70 and the subunit 76, respectively, being in static states is outputted as acceleration data representing the same direction as the gravity direction.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls operations of the sound IC 707 and the vibrator 704 based on the data received from the game apparatus body 5 by the wireless module 753 via the antenna 754. The sound IC 707 processes the sound data and the like transmitted from the game apparatus body 5 via the communication section 75. Further, the microcomputer 751 actuates the vibrator 704 based on, for example, the vibration data (for example, a signal for powering the vibrator 704 ON or OFF) transmitted by the game apparatus body 5 via the communication section 75.

Data from the core unit 70 including an operation signal (core key data) from the operation section 72, an acceleration signal (core acceleration data) from the acceleration sensor 701, and the process result data from the imaging information calculation section 74 are outputted to the microcomputer 751. An operation signal (sub key data) from the operation section 78 of the subunit 76 and an acceleration signal (sub acceleration data) from the acceleration sensor 761 are outputted to the microcomputer 751 via the connection cable 79. The microcomputer 751 temporarily stores the respective input data (core key data, sub key data, core acceleration data, sub acceleration data, and process result data) in the memory 752 as the transmission data which is to be transmitted to the wireless controller module 19. The wireless transmission from the communication section 75 to the wireless controller module 19 is performed periodically at predetermined time intervals. Since game process is generally performed at a cycle of 1/60 sec., data needs to be collected and transmitted at a cycle of a time period shorter than the cycle of the game process. Specifically, the game process unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth (registered trademark) technology to modulate the operation information onto a carrier wave of a predetermined frequency, and radiates the low power radio wave signal from the antenna 754. Thus, the core key data from the operation section 72 included in the core unit 70, the sub key data from the operation section 78 included in the subunit 76, the core acceleration data from the acceleration sensor 701 of the core unit 70, the sub acceleration data from the acceleration sensor 761 of the subunit 76, and the process result data from the imaging information calculation section 74 are modulated onto the low power radio wave signal by the wireless module 753 and radiated from the core unit 70. The wireless controller module 19 of the game apparatus 3 receives the low power radio wave signal, and the game apparatus 3 demodulates or decodes the low power radio wave signal to obtain the series of operation information (the core key data, the sub key data, the core acceleration data, the sub acceleration data, and the process result data). Based on the obtained operation information and the game program, the CPU 10 of the game apparatus 3 performs the game process.

Next, an outline of a game which is played with the game apparatus body 5 will be described, and thereafter a process performed by the game apparatus body 5 will be described in detail. As shown in FIG. 11, the overall size of each of the core unit 70 and the subunit 76 is small enough to be held by one hand of an adult or even a child. In order to play a game using the controller 7 with the game system 1, a player moves the core unit 70 held with one hand (for example, a right hand), and the subunit 76 held with the other hand (for example, a left hand). For example, FIG. 11 shows a state where a player moves upward and downward each of the core unit 70 held with the right hand, and the subunit 76 held with the left hand. When a player moves the core unit 70 and the subunit 76, the game apparatus body 5 determines movements of the core unit 70 and the subunit 76, and determines positions, in a virtual game space, based on the movements of the core unit 70 and the subunit 76, thereby performing a game process. When a player holds only the core unit 70 so as to play the game, the player moves the core unit 70 held with one hand (for example, the right hand). In this case, the game apparatus body 5 determines a movement of the core unit 70 in accordance with the player moving the core unit 70, and determines a position, in the virtual game space, based on the movement of the core unit 70, thereby performing the game process.

For example, when a player tilts the core unit 70 and the subunit 76 in a static manner, operation information (specifically, the X, Y, and Z axial direction acceleration data contained in the core acceleration data and the sub acceleration data) representing attitudes of the core unit 70 and the subunit 76 each of which is in a static state is supplied to the game apparatus body 5. On the other hand, when a player moves each of the core unit 70 and the subunit 76 up and down or leftward and rightward, operation information representing dynamic states based on, for example, centrifugal force and/or accelerations applied in the direction in which the core unit 70 and the subunit 76 are moved, is supplied from the core unit 70 and the subunit 76 to the game apparatus body 5. The changes of accelerations applied to the core unit 70 and the subunit 76 can be detected by the acceleration sensors 701 and 761, respectively, and therefore when the X, Y, and Z axial direction acceleration data outputted by each of the acceleration sensors 701 and 761 is subjected to an additional processing, attitudes of the core unit 70 and the subunit 76 in the static state and actions of the core unit 70 and the subunit 76 in the dynamic state can be calculated. In general, an acceleration vector outputted by each of the acceleration sensors 701 and 761 has a direction precisely opposite to the direction in which each of the core unit 70 and the subunit 76 is accelerated, or a sign (plus or minus) of an acceleration outputted by each of the acceleration sensors 701 and 761 is different from a sign represented by the direction in which each of the core unit 70 and the subunit 76 is accelerated. Therefore, when an acceleration based on an action is detected, it should be understood that it is necessary to calculate a tilt and a movement of each of the core unit 70 and the subunit 76 in consideration of a direction of an acceleration having been detected.

FIGS. 12 to 14 are diagrams each illustrating an example of a game process or an information processing performed in accordance with a movement of the controller 7. Examples of the game process will be described. That is, an object displayed on the monitor 2 is moved in accordance with movements of the core unit 70 and the subunit 76 (for example, a drum is hit with two sticks in the virtual game space displayed on the monitor 2), or an object displayed on the monitor 2 is moved in accordance with a movement of the core unit 70 (for example, a character in the virtual game space displayed on the monitor 2 is rotated or an item positioned in the virtual game space is moved in accordance with a movement of the core unit 70). Further, an example of an information processing other than the game process will be described. That is, a gesture for a browser displayed on a display is made in accordance with the core unit 70 and/or the subunit 76 being moved (for example, move a window, close a window, or turn a page).

For example, in FIG. 12, displayed on the monitor 2 are two stick objects OBJ1 and OBJ2, and a drum object D all of which are positioned in the virtual game space. The stick object OBJ1 is moved downward toward a strike surface of the drum object D in the virtual game space in accordance with the core unit 70 being moved downward (a state represented by a solid line in FIG. 12). When an operation of moving the core unit 70 downward ends and the core unit 70 is returned to a position at which the moving of the core unit 70 has started in this operation, the stick object OBJ1 is returned to a reference position in the virtual game space (a state represented by a dotted line in FIG. 12). On the other hand, the stick object OBJ2 is moved downward toward the strike surface of the drum object D in the virtual game space in accordance with the subunit 76 being moved downward (a state represented by a dotted line in FIG. 12). When an operation of moving the subunit 76 downward ends and the subunit 76 is returned to a position at which the moving of the subunit 76 has started in this operation, the stick object OBJ2 is returned to a reference position in the virtual game space (a state represented by a solid line in FIG. 12).

Further, as shown in FIG. 13, displayed on the monitor 2 is a character object OBJ which is connected to an axis point C and rotates about the axis point C in the virtual game space. The character object OBJ is rotated about the axis point C in the virtual game space in accordance with the core unit 70 being moved so as to form a circle. At this time, an angular velocity at which the character object OBJ is rotated about the axis point C is determined so as to be in synchronization with the movement of the core unit 70 forming the circle. The character object OBJ stops so as to hang on the axis point C when the core unit 70 stops.

Furthermore, as shown in FIG. 14, displayed on the monitor 2 is an item object OBJ positioned in the virtual game space. The item object OBJ is moved on the display screen in accordance with the core unit 70 being moved while a predetermined button is pressed.

In these exemplary games, the CPU 10 calculates parameters indicating positions to which the core unit 70 and the subunit 76 are moved from positions at which the movements of the core unit 70 and the subunit 76 have been started. The CPU 10 scales each of the parameters in the virtual game space so as to designate a coordinate point corresponding to each of the parameters, and each of the stick objects OBJ1 and OBJ2, the character object OBJ, and the item object OBJ is moved to a position represented by the coordinate point. Therefore, the stick objects OBJ1 and OBJ2, the character object OBJ, and the item object OBJ are, for example, moved downward, rotated, or moved in the same manners as a player moves the core unit 70 and/or the subunit 76, so that the player is allowed to feel as if the player is playing the drum, rotating the character, and moving the item. As is apparent from the below description, depending on a type of the calculated parameter, an object in the virtual game space may be returned to the reference position (for example, an exemplary game as shown in FIG. 12 or FIG. 13) each time the core unit 70 and/or the subunit 76 stops, or an object may stop at a position at which the movement of the object has stopped (for example, an exemplary game as shown in FIG. 14) when the core unit 70 and/or the subunit 76 stops.

Next, the game process performed by the game system 1 will be described in detail. In the game process described below, when both the core unit 70 and the subunit 76 are operated, a process based on the core acceleration data obtained by the core unit 70 and a process based on the sub acceleration data obtained by the subunit 76 are performed in the same manner except that objects to be operated are different. The process based on the core acceleration data is individually performed concurrently with the process based on the sub acceleration data. Therefore, in the following description, the process based on the core acceleration data obtained by the core unit 70 will be mainly described.

Figure 15:
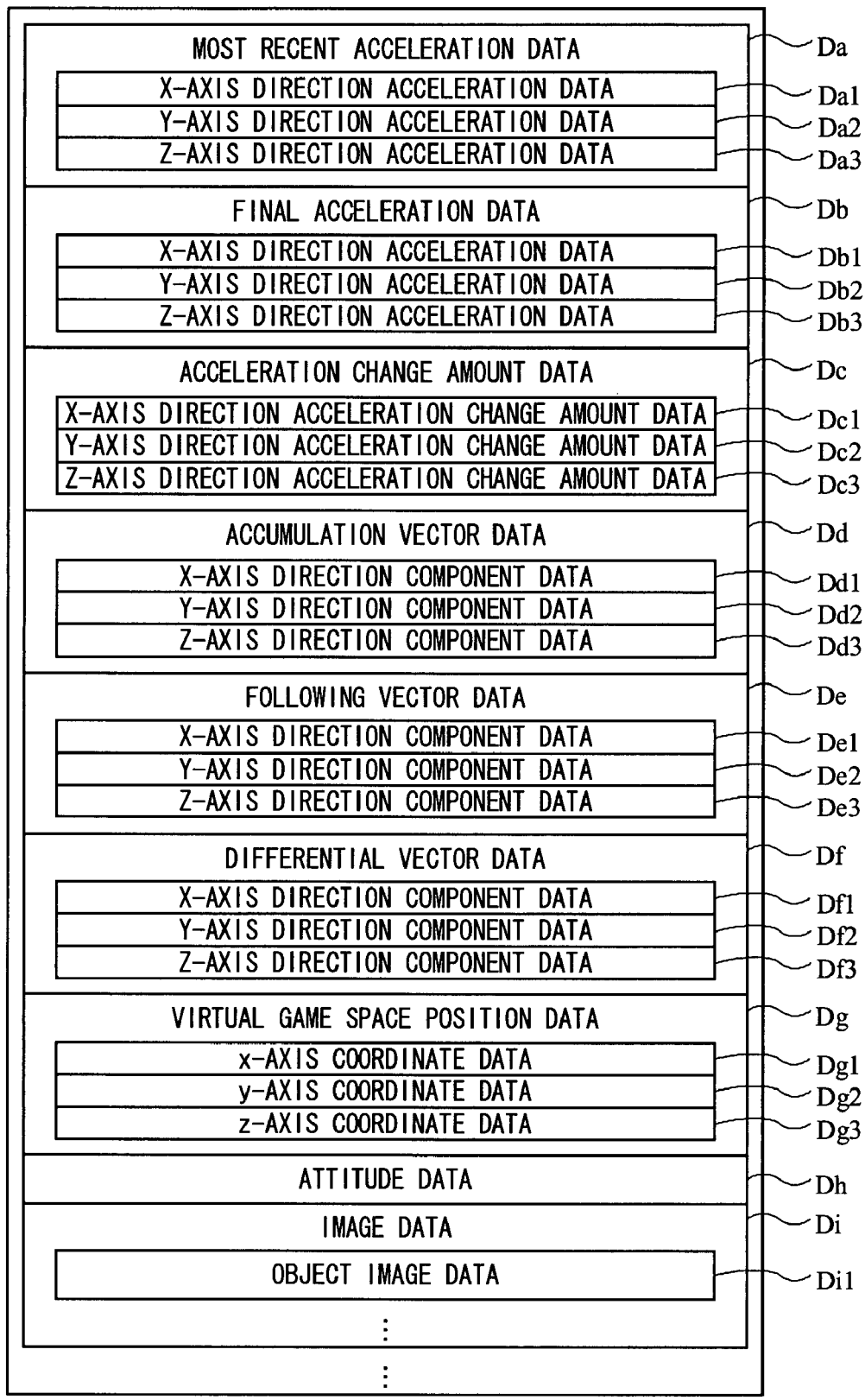
FIG. 15 is a diagram illustrating main data stored in a main memory of the game apparatus body 5.

Initially, with reference to FIG. 15, main data to be used for the game process will be described. FIG. 15 is a diagram illustrating main data to be stored in the external main memory 12 and/or in the internal main memory 35 (hereinafter, two main memories are collectively referred to simply as a main memory) of the game apparatus body 5.

As shown in FIG. 15, the main memory stores most recent acceleration data Da, final acceleration data Db, acceleration change amount data Dc, accumulation vector data Dd, following vector data De, differential vector data Df, virtual game space position data Dg, attitude data Dh, image data Di, and the like. The main memory also stores data necessary for the game process, such as data relating to, for example, object OBJ and other objects appearing in the game, and data (e.g., background data) relating to the virtual game space, in addition to the data contained in the information shown in FIG. 15.

The most recent acceleration data Da represents a most recent acceleration accn generated in the core unit 70, and has its data updated to most recent core acceleration data contained in a series of operation information transmitted as the transmission data from the core unit 70. The most recent acceleration data Da includes: X-axis direction acceleration data Da1 representing an acceleration accnX detected in an X-axial component by the acceleration sensor 701; Y-axis direction acceleration data Da2 representing an acceleration accnY detected in a Y-axial component by the acceleration sensor 701; and Z-axis direction acceleration data Da3 representing an acceleration accnZ detected in a Z-axial component by the acceleration sensor 701. The wireless controller module 19 included in the game apparatus body 5 receives core acceleration data contained in the operation information transmitted from the core unit 70 at predetermined intervals (for example, every 1/200 seconds), and stores the core acceleration data in a buffer (not shown) of the wireless controller module 19. Thereafter, the most recent core acceleration data in the buffer is read for each frame (for example, every 1/60 seconds) corresponding to a game process cycle, so as to update the most recent acceleration data Da stored in the main memory.

In a process flow described below, the most recent acceleration data Da has its data updated for each frame corresponding to the game process cycle. However, the most recent acceleration data Da may have its data updated in another process cycle. For example, the most recent acceleration data Da has its data updated at every transmission cycle of the core unit 70, and the updated core acceleration data may be used at every game process cycle. In this case, a cycle in which the most recent acceleration data Da representing the acceleration data Da1, Da2 and Da3 has its data updated is different from the game process cycle.

The final acceleration data Db represents a final acceleration accl which corresponds to the most recent acceleration accn used for calculating an acceleration change amount accv. Specifically, the final acceleration data Db includes: X-axis direction acceleration data Db1 representing a final acceleration acclX relating to the X-axial component; Y-axis direction acceleration data Db2 representing a final acceleration acclY relating to the Y-axial component; and Z-axis direction acceleration data Db3 representing a final acceleration acclZ relating to the Z-axial component, as with the most recent acceleration data Da.

The acceleration change amount data Dc represents an acceleration change amount accv which corresponds to an amount of change between the most recent acceleration accn and the final acceleration accl. The acceleration change amount data Dc includes: X-axis direction acceleration change amount data Dc1 representing an acceleration change amount accvX relating to the X-axial component; Y-axis direction acceleration change amount data Dc2 representing an acceleration change amount accvY relating to the Y-axial component; and Z-axis direction acceleration change amount data Dc3 representing an acceleration change amount accvZ relating to the Z-axial component. That is, the acceleration change amount accv contains the acceleration change amount for each axis, that is, the acceleration change amount accvX, the acceleration change amount accvY, and the acceleration change amount accvZ, and also represents a change amount vector representing an amount of change between the most recent acceleration accn and the final acceleration accl.

The accumulation vector data Dd represents an accumulation vector veca obtained by accumulating the most recent acceleration accn. Specifically, the accumulation vector data Dd includes: X-axis direction component data Dd1 representing an X-axial component vecaX of the accumulation vector veca; Y-axis direction component data Dd2 representing a Y-axial component vecaY of the accumulation vector veca; and Z-axis direction component data Dd3 representing a Z-axial component vecaZ of the accumulation vector veca.

The following vector data De represents a following vector vecg which follows the accumulation vector veca (in the present example, the most recent accumulation vector veca)

at a predetermined rate. Specifically, the following vector data De includes: X-axis direction component data De1 representing an X-axial component vecgX of the following vector vecg; Y-axis direction component data De2 representing a Y-axial component vecgY of the following vector vecg; and Z-axis direction component data De3 representing a Z-axial component vecgZ of the following vector vecg.

The differential vector data Df represents a differential vector vecd between the accumulation vector veca and the following vector vecg. Specifically, the differential vector data Df includes: X-axis direction component data Df1 representing an X-axial component vecdX of the differential vector vecd; Y-axis direction component data Df2 representing a Y-axial component vecdY of the differential vector vecd; and Z-axis direction component data Df3 representing a Z-axial component vecdZ of the differential vector vecd.

The virtual game space position data Dg represents a position pos of an object in the virtual game space, and the position pos is determined based on the differential vector vecd. Specifically, when an xyz-axis coordinate system is defined in the virtual game space, the virtual game space position data Dg includes: x-axis coordinate data Dg1 representing an x-axis coordinate point posx of the position pos of an object; y-axis coordinate data Dg2 representing a y-axis coordinate point posy of the position pos of the object; and z-axis coordinate data Dg3 representing a z-axis coordinate point posz of the position pos of the object.

The attitude data Dh represents an attitude of the core unit 70 in a static state as, for example, a three-dimensional vector representing a direction of the gravitational acceleration applied to the core unit 70.

The image data Di includes object image data Di1 and the like. The object image data Di1 is used for positioning the object OBJ at the position pos in the virtual game space so as to generate a game image.

Figure 16:
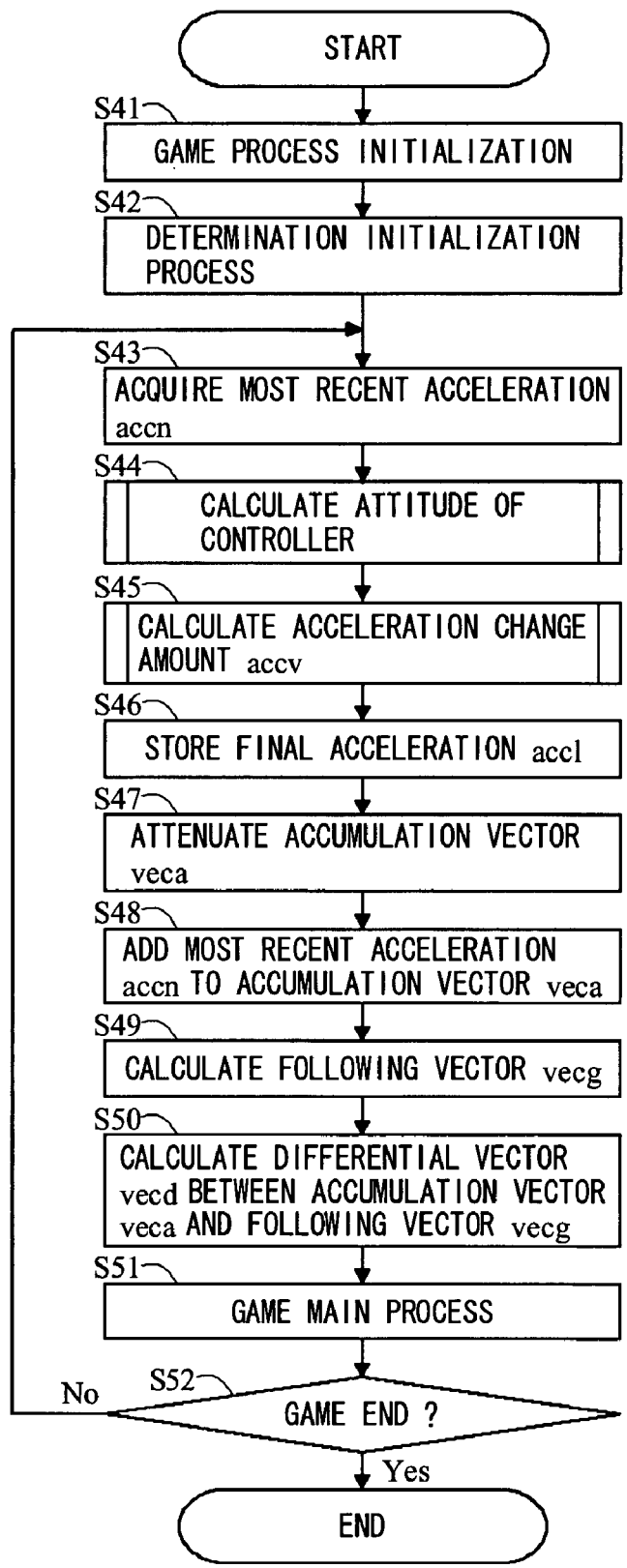
FIG. 16 is a flow chart illustrating a flow of a game process performed by the game apparatus body 5.
Figure 17:
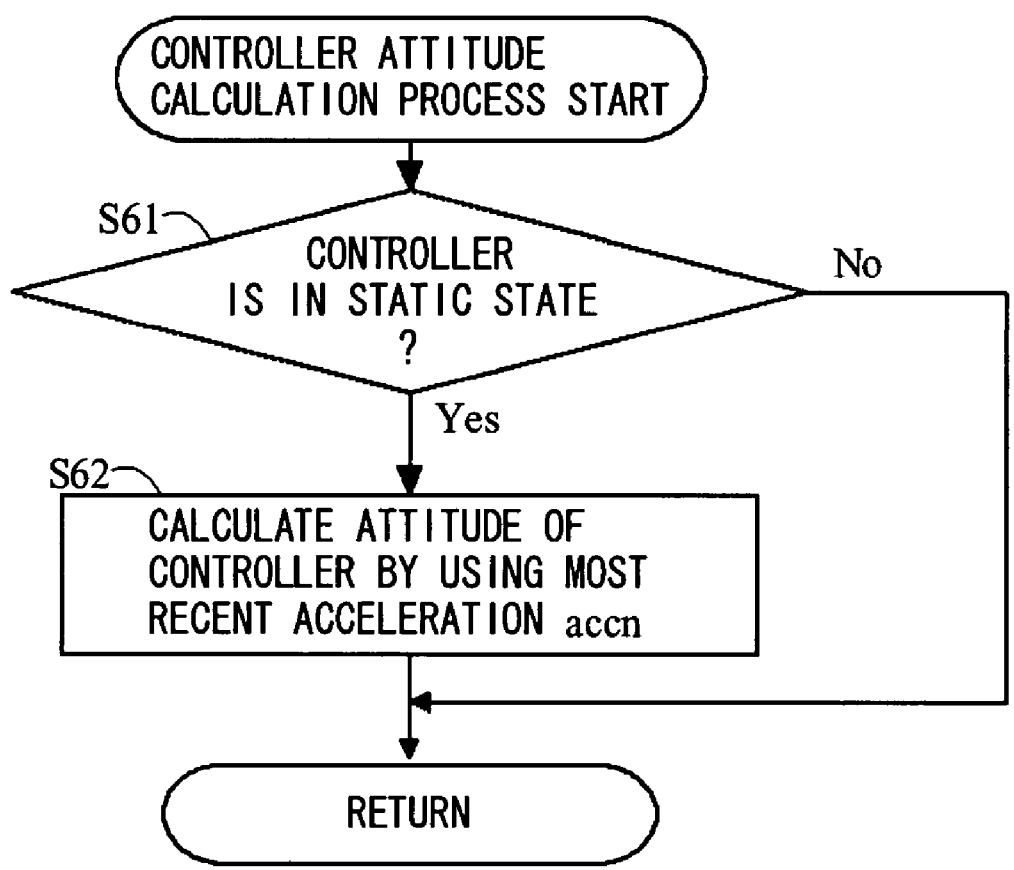
FIG. 17 shows in detail a subroutine of a process of calculating an attitude of the controller in step 44 shown in FIG. 16.
Figure 18:
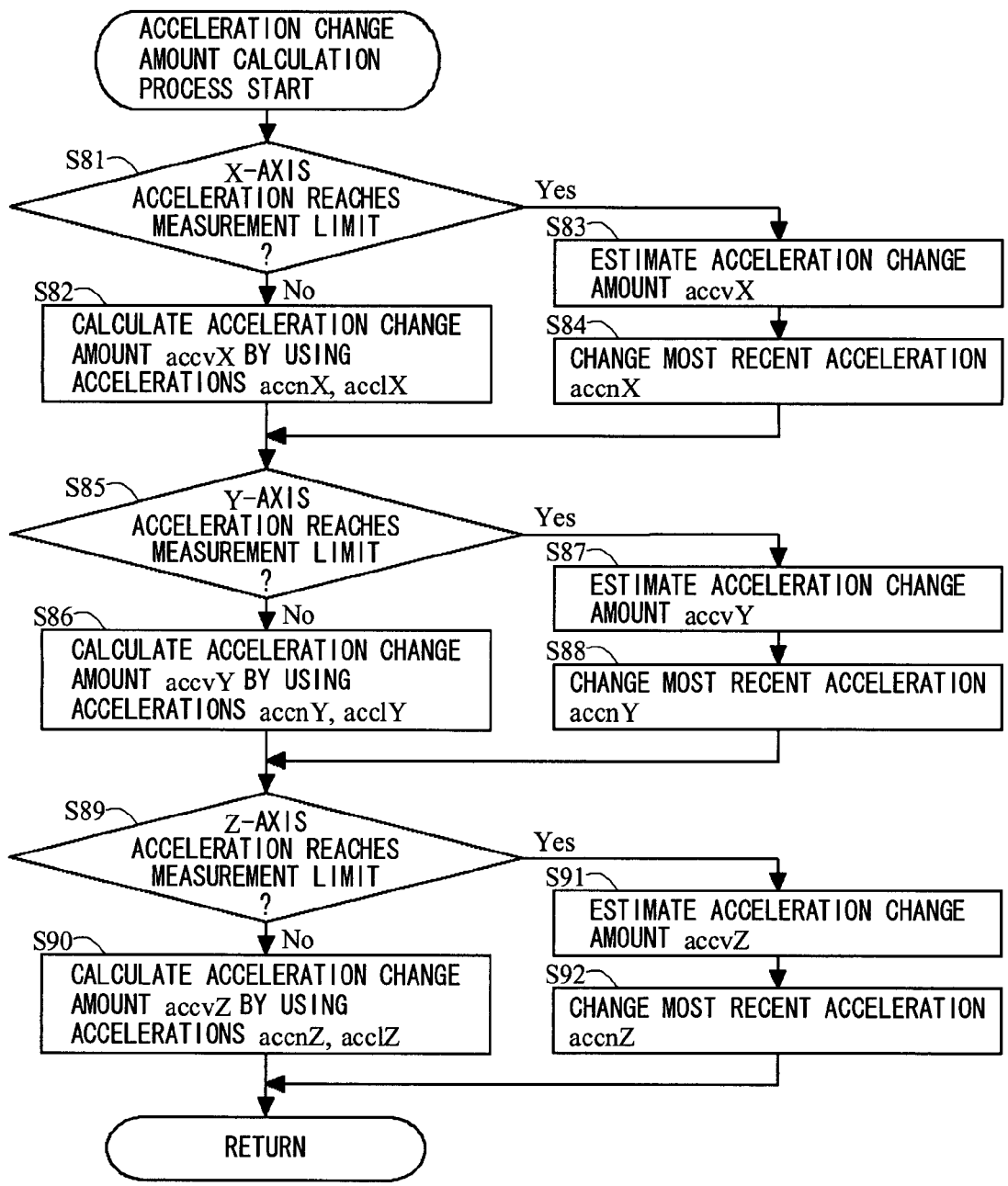
FIG. 18 shows in detail a subroutine of a process of calculating an acceleration change amount in step 45 shown in FIG. 16.

Next, with reference to FIGS. 16 to 18, the game process performed by the game apparatus body 5 will be described in detail. FIG. 16 is a flow chart illustrating a flow of the game process executed by the game apparatus body 5. FIG. 17 shows a sub-routine illustrating in detail a process of calculating an attitude of the controller in step 44 shown in FIG. 16. FIG. 18 shows a sub-routine illustrating in detail a process of calculating the acceleration change amount in step 45 shown in FIG. 16. With reference to the flow charts shown in FIGS. 16 to 18, process steps of moving the object OBJ in accordance with a player moving the core unit 70 will be described among the entire game process, and a detailed description of process steps, among the entire game process, having no direct relation is not described. Further, in FIGS. 16 to 18, each of the steps executed by the CPU 10 is abbreviated as "S".

When the game apparatus body 5 is powered on, the CPU 10 of the game apparatus body 5 executes a boot program stored in the boot ROM not shown so as to initialize each unit such as the main memory. The game program stored in the optical disc 4 is loaded to the main memory and the CPU 10 starts to execute the game program. The flow charts of FIGS. 16 to 18 show a game process performed after these process steps are completed.

As shown in FIG. 16, the CPU 10 performs a game process initialization in step 41, and advances the process to the next step. For example, the game process initialization of step 41 includes initializations, such as setting of the virtual game space and positioning of game objects, in the case of the game process in which two sticks are moved downward so as to play the drum in the virtual game space, a character is rotated, or an item is moved.

Next, the CPU 10 performs determination process initialization in step 42, and advances the process to the next step. In the determination process initialization of step 42, parameters used for calculating a movement of the core unit 70 are initialized. For example, the CPU 10 sets, to zero, each of the final accelerations acclX, acclY, and acclZ which are represented by the final acceleration data Db. The CPU 10 sets, to zero, each of the acceleration change amounts accvX, accvY, and accvZ which are represented by the acceleration change amount data Dc. The CPU 10 sets, to zero, each of the components vecaX, vecaY, and vecaZ which are represented by the accumulation vector data Dd. The CPU 10 sets, to zero, each of the components vecgX, vecgY, and vecgZ which are represented by the following vector data De. The CPU 10 sets, to zero, each of the components vecdX, vecdY, and vecdZ which are represented by the differential vector data Df. The CPU 10 sets, to zero, each of the coordinate points posx, posy, and posz which are represented by the virtual game space position data Dg. The CPU 10 sets, as a three-dimensional vector having a length of 1 and a predetermined direction, an attitude of the core unit 70 in the static state represented by the attitude data Dh.

Next, the CPU 10 acquires the most recent acceleration accn in step 43, and advances the process to the next step. For example, the CPU 10 updates the most recent acceleration data Da so as to represent, as the most recent acceleration accn, an acceleration represented by the core acceleration data contained in the operation information having been most recently received from the core unit 70. Specifically, the X-axis direction acceleration data Da1 is updated so as to represent, as the most recent acceleration accnX, an acceleration represented by X-axis direction core acceleration data contained in the operation information having been most recently received from the core unit 70. The Y-axis direction acceleration data Da2 is updated so as to represent, as the most recent acceleration accnY, an acceleration represented by Y-axis direction core acceleration data contained in the operation information having been most recently received from the core unit 70. The Z-axis direction acceleration data Da3 is updated so as to represent, as the most recent acceleration accnZ, an acceleration represented by Z-axis direction core acceleration data contained in the operation information having been most recently received from the core unit 70.

Next, the CPU 10 calculates an attitude of the core unit 70 in step 44, and advances the process to the next step. Hereinafter, with reference to FIG. 17, the process of calculating the attitude of the core unit 70 in step 44 will be described.

As shown in FIG. 17, the CPU 10 determines in step 61 whether or not the core unit 70 is in a static state, based on the most recent acceleration accn represented by the most recent acceleration data Da. For example, the CPU 10 determines that the core unit 70 is not in the static state when a value represented by at least one of the most recent accelerations accnX, accnY or accnZ is greater than or equal to a value corresponding to the gravitational acceleration. As another example, the CPU 10 determines that the core unit 70 is in the static state when each of the change amounts relating to the most recent accelerations accnX, accnY, and accnZ has a value smaller than a predetermined value. Other methods for determining, based on the most recent acceleration accn, whether or not the core unit 70 is in the static state may be suggested, and therefore the state of the core unit 70 may be determined in step 61 in the other methods. When the core unit 70 is in the static state, the CPU 10 advances the process to step 62. On the other hand, when the core unit 70 is not in the static state, the CPU 10 ends the process according to the sub-routine.

In step 62, the CPU 10 calculates the attitude of the core unit 70 using the most recent acceleration accn so as to update the attitude data Dh, and ends the process according to the sub-routine. When the core unit 70 is in the static state, the gravitational acceleration is applied to the core unit 70. The direction in which the gravitational acceleration is applied to the core unit 70 can be calculated based on the most recent accelerations accnX, accnY, and accnZ. The direction in which the gravitational acceleration is applied to the core unit 70 is a vertical downward direction in a real space, and it is possible to acquire the vertical downward direction which is represented by using the XYZ axes defined for the core unit 70. For example, the CPU 10 updates the attitude data Dh so as to represent the attitude of the core unit 70 in the static state as three-dimensional vector data representing the direction of the gravitational acceleration relative to the core unit 70.

Returning to FIG. 16, after the process of calculating the attitude of the core unit 70 in step 44, the CPU 10 calculates the acceleration change amount accv in step 45, and advances the process to the next step. Hereinafter, with reference to FIG. 18, an acceleration change amount calculation process in step 45 will be described.

As shown in FIG. 18, in step 81, the CPU 10 determines whether or not the most recent acceleration accnX represented by the X-axis direction acceleration data Da1 contained in the most recent acceleration data Da reaches a measurement limit of the acceleration sensor 701. In general, the acceleration sensor 701 and the acceleration sensor 761 are each allowed to measure an acceleration within its measurable range. When the acceleration has a value outside the measurable range, each of the acceleration sensor 701 and the acceleration sensor 761 may output an upper limit value (lower limit value) of the measurable range. For example, when the acceleration sensor 701 and the acceleration sensor 761 are each allowed to measure an acceleration within the measurable range from −4G to +4G, and an acceleration of more than 4G is applied to each of the core unit 70 and the subunit 76, the acceleration sensor 701 and the acceleration sensor 761 each outputs the acceleration data representing −4G or +4G. In step 81, whether or not the acceleration applied to the core unit 70 has a value within the acceleration measurable range is determined. For example, values close to the upper and lower limit values of the acceleration measurable range are used as threshold values (for example, −3.39G and +3.39G). In this case, when the most recent acceleration accnX$\leq$−3.39 or the most recent acceleration accnX$\geq$+3.39 is satisfied, the CPU 10 determines that the most recent acceleration accnX reaches the measurement limit of the acceleration sensor 701. When the most recent acceleration accnX does not reach the measurement limit, the CPU 10 advances the process to step 82. On the other hand, when the most recent acceleration accnX reaches the measurement limit, the CPU 10 advances the process to step 83.

In step 82, the CPU 10 calculates the acceleration change amount accvX in the X-axis direction so as to update the X-axis direction acceleration change amount data Dc1, and advances the process to step 85. For example, in step 82, the CPU 10 calculates the acceleration change amount accvX by subtracting, from the most recent acceleration accnX which is currently stored, the final acceleration acclX which is currently stored.

On the other hand, in step 83, the CPU 10 performs a calculation for estimating the acceleration change amount accvX so as to update the X-axis direction acceleration change amount data Dc1, and advances the process to the next step. For example, in step 83, the CPU 10 multiplies, by a predetermined attenuation rate, the acceleration change amount accvX which is currently stored (that is, the acceleration change amount accvX immediately preceding the acceleration change amount accvX which is being currently calculated), so as to update the acceleration change amount accvX, so that the X-axis direction acceleration change amount data Dc1 has its data updated.

The value by which the acceleration change amount accvX is multiplied represents an attenuation rate of the acceleration change amount, which allows the estimation of a value of an acceleration outside the measurable range of the acceleration sensor 701, and the value, i.e., the attenuation rate is a positive value (for example, 0.6) smaller than one.

Next, the CPU 10 changes the most recent acceleration accnX using the acceleration change amount accvX having been calculated in step 83 so as to update the X-axis direction acceleration data Da1 in step 84, and advances the process to step 85. For example, the CPU 10 adds the acceleration change amount accvX having been calculated in step 83 to the most recent acceleration accnX which is currently stored so as to update the most recent acceleration accnX, thereby updating the X-axis direction acceleration data Da1.

In step 85, the CPU 10 determines whether or not the most recent acceleration accnY represented by the Y-axis direction acceleration data Da2 contained in the most recent acceleration data Da reaches a measurement limit of the acceleration sensor 701. For example, values close to the upper and lower limit values of the acceleration measurable range are used as threshold values (for example, −3.39G and +3.39G), as with in step 81. In this case, when the most recent acceleration accnY$\leq$−3.39 or the most recent acceleration accnY$\geq$+3.39 is satisfied, the CPU 10 determines that the most recent acceleration accnY reaches the measurement limit of the acceleration sensor 701. When the most recent acceleration accnY does not reach the measurement limit, the CPU 10 advances the process to step 86. On the other hand, when the most recent acceleration accnY reaches the measurement limit, the CPU 10 advances the process to step 87.

In step 86, the CPU 10 calculates the acceleration change amount accvY in the Y-axis direction so as to update the Y-axis direction acceleration change amount data Dc2, and advances the process to step 89. For example, in step 86, the CPU 10 calculates the acceleration change amount accvY by subtracting, from the most recent acceleration accnY which is currently stored, the final acceleration acclY which is currently stored.

On the other hand, in step 87, the CPU 10 performs a calculation for estimating the acceleration change amount accvY so as to update the Y-axis direction acceleration change amount data Dc2, and advances the process to the next step. For example, in step 87, the CPU 10 multiplies, by the predetermined attenuation rate, the acceleration change amount accvY which is currently stored (that is, the acceleration change amount accvY immediately preceding the acceleration change amount accvY which is being currently calculated), so as to update the acceleration change amount accvY, so that the Y-axis direction acceleration change amount data Dc2 has its data updated.

Next, the CPU 10 changes the most recent acceleration accnY using the acceleration change amount accvY having been calculated in step 87 so as to update the Y-axis direction acceleration data Da2 in step 88, and advances the process to step 89. For example, the CPU 10 adds the acceleration change amount accvY having been calculated in step 87 to the most recent acceleration accnY which is currently stored so as to update the most recent acceleration accnY, thereby updating the Y-axis direction acceleration data Da2.

In step 89, the CPU 10 determines whether or not the most recent acceleration accnZ represented by the Z-axis direction acceleration data Da3 contained in the most recent acceleration data Da reaches a measurement limit of the acceleration sensor 701. For example, values close to the upper and lower limit values of the acceleration measurable range are used as threshold values (for example, −3.39G and +3.39G), as with in step 81. In this case, when the most recent acceleration accnZ≦−3.39 or the most recent acceleration accnZ≧+3.39 is satisfied, the CPU 10 determines that the most recent acceleration accnZ reaches the measurement limit of the acceleration sensor 701. When the most recent acceleration accnZ does not reach the measurement limit, the CPU 10 advances the process to step 90. On the other hand, when the most recent acceleration accnZ reaches the measurement limit, the CPU 10 advances the process to step 91.

In step 90, the CPU 10 calculates the acceleration change amount accvZ in the Z-axis direction so as to update the Z-axis direction acceleration change amount data Dc3, and ends the process according to the sub-routine. For example, in step 90, the CPU 10 calculates the acceleration change amount accvZ by subtracting, from the most recent acceleration accnZ which is currently stored, the final acceleration acclZ which is currently stored.

On the other hand, in step 91, the CPU 10 performs a calculation for estimating the acceleration change amount accvZ so as to update the Z-axis direction acceleration change amount data Dc3, and advances the process to the next step. For example, in step 91, the CPU 10 multiplies, by the predetermined attenuation rate, the acceleration change amount accvZ which is currently stored (that is, the acceleration change amount accvZ immediately preceding the acceleration change amount accvZ which is being currently calculated), so as to update the acceleration change amount accvZ, so that the Z-axis direction acceleration change amount data Dc3 has its data updated.

Next, the CPU 10 changes the most recent acceleration accnZ using the acceleration change amount accvZ having been calculated in step 91 so as to update the Z-axis direction acceleration data Da3 in step 92, and ends the process according to the sub-routine. For example, the CPU 10 adds the acceleration change amount accvZ having been calculated in step 91 to the most recent acceleration accnZ which is currently stored so as to update the most recent acceleration accnZ, thereby updating the Z-axis direction acceleration data Da3.

As described above, the acceleration change amount accv calculated in step 45 includes the acceleration change amounts accvX, accvY, and accvZ which are calculated for each axis, and also represents a change amount vector.

Returning to FIG. 16, after the acceleration change amount accv is calculated in step 45, the CPU 10 updates the final acceleration accl so as to represent the most recent acceleration accn, so that the final acceleration data Db has its data updated to the most recent acceleration accn in step 46, and advances the process to the next step. For example, the CPU 10 updates the final accelerations acclX, acclY, and acclZ so as to represent the most recent accelerations accnX, accnY, and accnZ, respectively, which are currently represented by the most recent acceleration data Da, so that the final acceleration data Db has its data updated.

Next, the CPU 10 attenuates the accumulation vector veca by a predetermined amount so as to update the accumulation vector data Dd in step 47, and advances the process to the next step. For example, the CPU 10 multiplies, by a predetermined attenuation rate (which is a positive value smaller than one, such as 0.89), the X-axial component vecaX of the accumulation vector veca which is currently stored so as to update the X-axial component vecaX, thereby updating the X-axis direction component data Dd1. The CPU 10 multiplies, by the predetermined attenuation rate, the Y-axial component vecaY of the accumulation vector veca which is currently stored so as to update the Y-axial component vecaY, thereby updating the Y-axis direction component data Dd2. The CPU 10 multiplies, by the predetermined attenuation rate, the Z-axial component vecaZ of the accumulation vector veca which is currently stored so as to update the Z-axial component vecaZ, thereby updating the Z-axis direction component data Dd3.

In step 47, although each component of the accumulation vector veca is multiplied by the predetermined attenuation rate so as to attenuate the accumulation vector veca, the accumulation vector veca may be attenuated in another method. For example, a predetermined amount may be added to or subtracted from each component of the accumulation vector veca in such a direction as a value of each component becomes zero, thereby attenuating the accumulation vector veca.

Next, the CPU 10 adds the most recent acceleration accn to the accumulation vector veca so as to update the accumulation vector data Dd in step 48, and advances the process to the next step. For example, the CPU 10 adds the most recent acceleration accnX to the X-axial component vecaX of the accumulation vector veca which is currently stored so as to update the X-axial component vecaX, thereby updating the X-axis direction component data Dd1. The CPU 10 adds the most recent acceleration accnY to the Y-axial component vecaY of the accumulation vector veca which is currently stored so as to update the Y-axial component vecaY, thereby updating the Y-axis direction component data Dd2. The CPU 10 adds the most recent acceleration accnZ to the Z-axial component vecaZ of the accumulation vector veca which is currently stored so as to update the Z-axial component vecaZ, thereby updating the Z-axis direction component data Dd3. Step 47 and step 48 may be simultaneously executed or step 47 and step 48 may be executed in reverse order of that described above.

Next, the CPU 10 calculates the following vector vecg in step 49, and advances the process to the next step. For example, the CPU 10 uses the X-axial component vecaX, the Y-axial component vecaY, and the Z-axial component vecaZ which are represented by the accumulation vector data Dd, and the X-axial component vecgX, the Y-axial component vecgY, and the Z-axial component vecgZ of the following vector vecg which is represented by the following vector data De so as to update the X-axial component vecgX, the Y-axial component vecgY, and the Z-axial component vecgZ in accordance with the following expression.

$$vecgX \leftarrow vecgX + (vecaX - vecgX) * K$$

$$vecgY \leftarrow vecgY + (vecaY - vecgY) * K$$

$$vecgZ \leftarrow vecgZ + (vecaZ - vecgZ) * K$$

Thus, the CPU 10 updates the following vector data De. K represents a following coefficient, and is set as, for example, K=0.006. Thus, the following vector vecg has the axial component values (vecgX, vecgY, vecgZ) which follow, at a predetermined rate, the axial components values (vecaX, vecaY, vecaZ), respectively, of the accumulation vector veca having been most recently obtained. That is, the following vector vecg is a vector which sequentially follows, at a predetermined rate, the accumulation vector veca having been most recently obtained. By using the expression described above, the following vector vecg is calculated as a vector following the accumulation vector veca, and the following coefficient K is a substantially small value, so that the following vector vecg represents a vector obtained by smoothing the accumulation vector veca for each axial component, that is, the X-axial component vecaX, the Y-axial component vecaY, and the Z-axial component vecaZ. Further, the following vector vecg may be used as a parameter indicating an accumulated component of the static acceleration, such as the gravitational acceleration, constantly applied to the core unit 70.

In step 49, although the following vector vecg is obtained by calculating the axial component values which follow, at the predetermined rate, the axial component values (vecaX, vecaY, vecaZ), respectively, of the accumulation vector veca having been most recently obtained, the following vector vecg may be obtained by using the accumulation vector veca having been obtained at other times. For example, the following vector vecg may be obtained by calculating the axial component values which follow, at the predetermined rate, the axial component values (vecaX, vecaY, vecaZ), respectively, of the accumulation vector veca obtained in any one frame among several most recent frames.

Next, the CPU 10 calculates the differential vector vecd in step 50, and advances the process to the next step. For example, the CPU 10 uses the X-axial component vecaX, the Y-axial component vecaY, and the Z-axial component vecaZ which are represented by the accumulation vector data Dd, and the X-axial component vecgX, the Y-axial component vecgY, and the Z-axial component vecgZ of the following vector vecg which is represented by the following vector data De so as to update the X-axial component vecdX, the Y-axial component vecdY, and the Z-axial component vecdZ of the differential vector vecd in accordance with the following equation.

$$vecdX = vecaX - vecgX$$

$$vecdY = vecaY - vecgY$$

$$vecdZ = vecaZ - vecgZ$$

Thus, the CPU 10 updates the differential vector data Df. As is apparent from the equation described above, the differential vector vecd is obtained by eliminating the following vector vecg from the accumulation vector veca.

Figure 20:
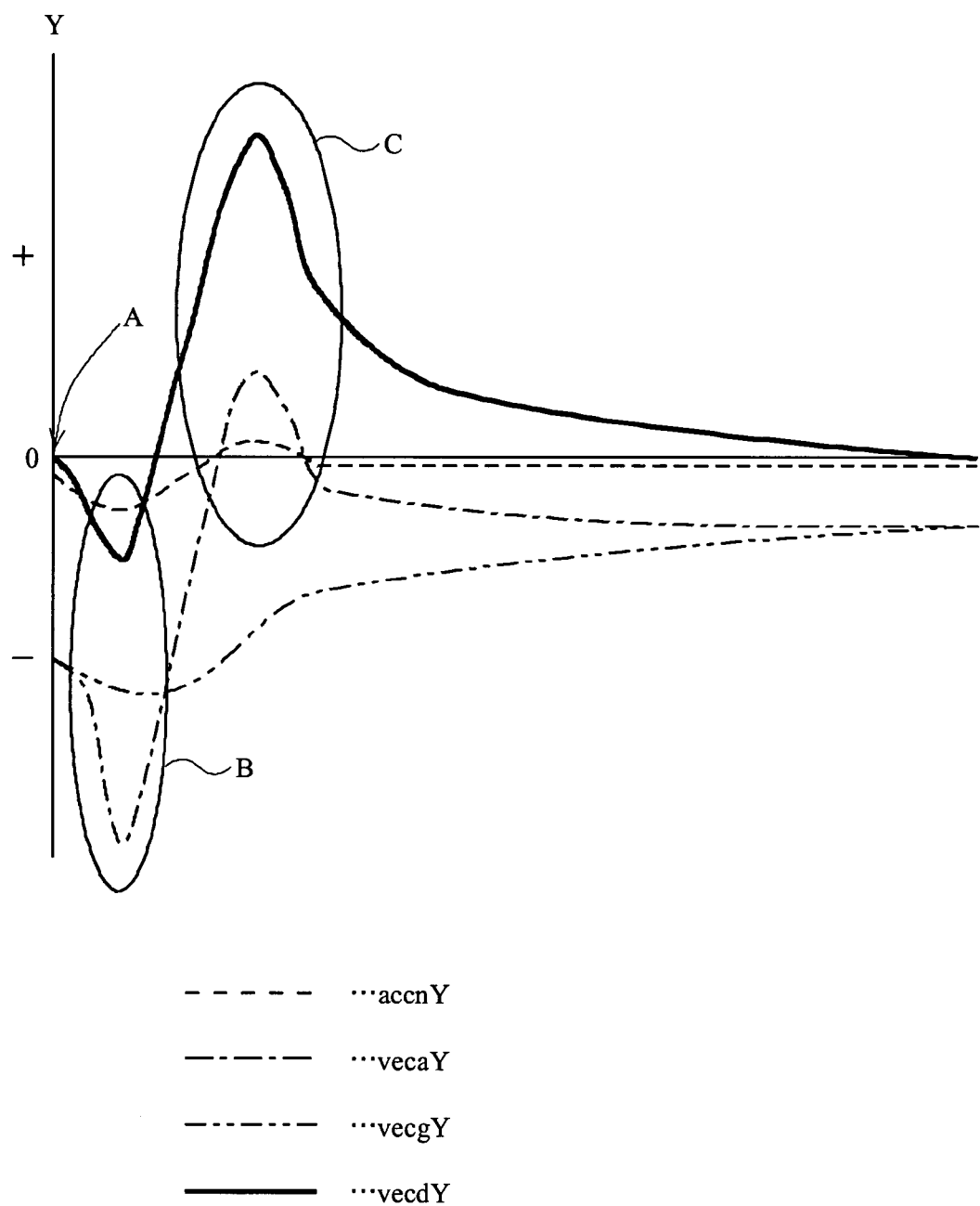
FIG. 20 is a diagram illustrating an example where parameters relating to the Y-axis direction change when a player moves upward the core unit 70 which has been at rest.

Next, the CPU 10 performs a game main process in step 51, and advances the process to the next step. The CPU 10 performs the game main process by using the differential vector vecd having been calculated in step 50. For example, the CPU 10 scales the respective components (X-axial component vecdX, the Y-axial component vecdY, Z-axial component vecdZ) of the differential vector vecd in the virtual game space so as to directly designate coordinate points corresponding to the respective components, and performs the game process by using a value represented by the designated coordinate points. For example, the CPU 10 transforms the respective components of the differential vector vecd to the x-axis coordinate point posx, the y-axis coordinate point posy, and the z-axis coordinate point posz of the position pos of the object OBJ so as to designate a coordinate point corresponding to the respective components of the differential vector vecd, thereby updating the virtual game space position data Dg. The CPU 10 positions the object OBJ at the position pos in the virtual game space so as to display a game image on the monitor 2, thereby executing a series of game process. Hereinafter, an exemplary game process using the differential vector vecd will be described with reference to FIGS. 19 and 20. FIG. 19 is a diagram illustrating an exemplary relationship between the real space in which a player moves the core unit 70 and the virtual game space displayed on the monitor 2. FIG. 20 is a diagram illustrating an example where parameters relating to the Y-axis direction change when a player moves upward the core unit 70 which has been at rest.

In FIG. 19, xyz-axes are orthogonal to each other and are defined in the virtual game space. When the front surface of the core unit 70 having its bottom surface oriented vertically downward is pointed at the front face of the monitor 2, the xyz-axes in the virtual game space displayed on the monitor 2 extend in the same directions as XYZ-axes defined for the core unit 70 as shown in FIG. 19. Specifically, the X-axis positive direction defined for the core unit 70 corresponds to the x-axis positive direction defined in the virtual game space, the Y-axis positive direction defined for the core unit 70 corresponds to the y-axis positive direction defined in the virtual game space, and the Z-axis positive direction defined for the core unit 70 corresponds to the z-axis positive direction defined in the virtual game space.

A position of the object OBJ positioned in the virtual game space is represented as xyz-coordinate values, specifically, represented as the position pos (posx, posy, posz) of the object. The respective components (X-axial component vecdX, Y-axial component vecdY, Z-axial component vecdZ) of the differential vector vecd are scaled in the virtual game space so as to designate coordinate points corresponding to the respective components, thereby setting the position pos (posx, posy, posz). For example, the position pos (posx, posy, posz) is calculated in accordance with the following equation.

$$posx = vecdX$$

$$posy = vecdY$$

$$posz = vecdZ$$

When the core unit 70 (indicated by dotted lines in FIG. 19) is at rest in the real space, the differential vector vecd represents (0, 0, 0) (state A in FIG. 20). In this case, the position pos0 (pos0x, pos0y, pos0z)=(0, 0, 0) is designated as a coordinate point, and therefore the object OBJ (indicated by dotted lines in FIG. 19) is positioned at the originating point (hereinafter, referred to as the reference position) of the xyz-axis coordinate system in the virtual game space.

Thereafter, it is assumed that a player moves the core unit 70 in the direction of the top surface thereof (that is, anti-gravity direction), and then stops the core unit 70. In this case, an acceleration is applied to the core unit 70 in the direction of the top surface thereof, and therefore data outputted by the acceleration sensor 701 represents an acceleration having the direction precisely opposite to the direction in which the acceleration is applied to the core unit 70, that is, the most recent acceleration accn represents a value changing in the Y-axis negative direction (state B in FIG. 20) (the change of the Y-axial component acceleration accnY of the most recent acceleration accn is indicated by a dotted line in FIG. 20). When the core unit 70 being moved in the direction of the top surface thereof is stopped, an acceleration (an acceleration for deceleration) is applied to the core unit 70 in the direction of the bottom surface thereof, and therefore the most recent acceleration accn represented by data outputted by the acceleration sensor 701 represents a value changing in the Y-axis positive direction when the core unit 70 is stopped (state C in FIG. 20).

The most recent acceleration accn changing as describe above is sequentially accumulated for each component value thereof so as to obtain the accumulation vector veca (a change of the Y-axial component vecaY of the accumulation vector veca is indicated by a dashed-dotted line in FIG. 20). The accumulation vector veca, obtained by accumulating the most recent acceleration accn for each component value thereof, changes in such a manner as to enhance the change of the most recent acceleration accn. The accumulation vector veca has its value constantly attenuated (see step 47), and therefore while, for example, the core unit 70 is accelerated (state B), the accumulation and the attenuation are performed in the directions opposite to each other. Thereafter, while, for example, the core unit 70 is decelerated (state C), the accumulation and the attenuation are performed in the same direction therebetween until a sign (plus or minus) of a value represented by the accumulation vector veca is changed. Therefore, the accumulation vector veca greatly changes in the direction in which the core unit 70 is decelerated (that is, in the direction in which the core unit 70 is moved).

The following vector vecg changes so as to follow the accumulation vector veca, which changes as described above, having been most recently calculated (a change of the Y-axial component vecgY of the following vector vecg is indicated by a chain double-dashed line in FIG. 20). That is, the following vector vecg changes so as to smooth the change of the accumulation vector veca as describe above.

A difference between the accumulation vector veca and the following vector vecg, which are changed as described above, is obtained as the differential vector vecd (a change of the Y-axial component vecdY of the differential vector vecd is indicated by a thick line in FIG. 20). That is, the differential vector vecd represents a change of the accumulation vector veca with respect to the following vector vecg obtained by smoothing the change of the accumulation vector veca. Therefore, as shown in FIG. 20, although the differential vector vecd may temporarily have a value representing the direction opposite to the direction in which the core unit 70 is moved (state B shown in FIG. 20) when the movement of the core unit 70 is started, the differential vector vecd eventually has its value increased in the direction in which the core unit 70 is moved (state C shown in FIG. 20), and a period in which the differential vector vecd represents the direction in which the core unit 70 is moved is extended.

Therefore, when a player moves the core unit 70 in the direction of the top surface thereof, and then stops the core unit 70, the differential vector vecd (vecdX, vecdY, vecdZ) represents a vector (for example, the differential vector vecd (0, +a, 0)) having the Y-axis positive direction as shown in FIG. 19. That is, the differential vector vecd having the same direction as the direction in which a player moves the core unit 70 is calculated.

The calculated respective components of the differential vector vecd representing the Y-axis positive direction are scaled in the virtual game space so as to designate an updated coordinate point, thereby changing the position pos from the reference position. For example, the differential vector vecd (0, +a, 0) is directly scaled in the virtual game space so as to designate a coordinate point representing an xyz-axis coordinate value corresponding to the differential vector vecd, thereby changing the position pos from the reference position to the position of (0, +a, 0). The position of the object OBJ is changed in accordance with the position pos, and therefore the object OBJ is moved from the reference position in the y-axis positive direction in the virtual game space, and displayed on the monitor 2. As described above, the Y-axis positive direction defined for the core unit 70 corresponds to the y-axis positive direction defined in the virtual game space, so that the object OBJ is moved in the virtual game space in the direction in which a player moves the core unit 70 in the real space, and displayed on the monitor 2. For example, the stick object OBJ1 is positioned at the position pos, or the character object OBJ is positioned at the position pos, or the item object OBJ is positioned at the position pos, so as to enable an exemplary game described with reference to FIGS. 12 to 14 to be played. Thus, the differential vector vecd is calculated as a position of the core unit 70 relative to a position at which a player has started to move the core unit 70, and the differential vector vecd is scaled in the virtual game space so as to designate a position, in the virtual game space, corresponding to a position of the core unit 70 in the real space.

The relationship among the respective coordinate axes is determined as shown in FIG. 19 on the assumption that data outputted by the acceleration sensor 701 represents an acceleration having the direction precisely opposite to the direction in which an acceleration is applied to the acceleration sensor 701, and the data is directly scaled in the virtual game space. The coordinate axes (XYZ axes) of the core unit 70 extend in the same direction as the coordinate axes (xyz axes) in the virtual game space. Therefore, scaling is performed in the same direction as the direction toward a position to which the core unit 70 is moved, so as to designate a corresponding coordinate point. However, for example, when an acceleration sensor is structured so as to output data representing an acceleration having the same direction as the direction of the acceleration, or when a sign (plus or minus) represented by an acceleration obtained from the data is reversed during the processing, the directions of the coordinate axes defined in the virtual game space or for the core unit 70 may be opposite to those shown in FIG. 19. It is apparent that the coordinate axes of the core unit 70 and/or the coordinate axes of the virtual game space may be appropriately defined, depending on the positive/negative relationship of the data to be processed, such that the coordinate points can be designated so as to represent the same direction as the direction toward a position to which the core unit 70 is moved.

Figure 21:
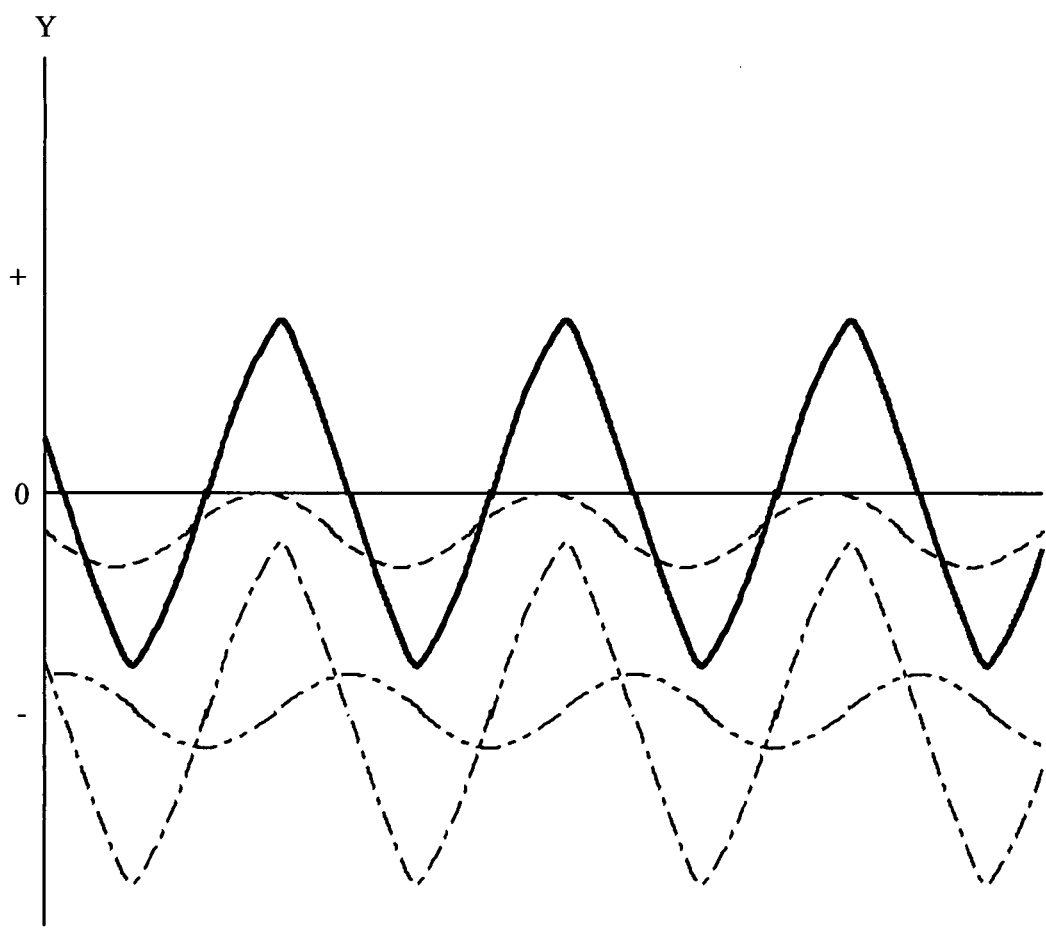
FIG. 21 is a diagram illustrating an example where parameters relating to the Y-axis direction are changed when a player continues to move the core unit 70.

When the core unit 70 continues to be moved, that is, for example, when the core unit 70 continues to be moved so as to form a circle or when the core unit 70 is repeatedly moved upward and downward, the respective parameters relating to the Y-axis direction change as shown in, for example, FIG. 21. In this case, even when the differential vector vecd contains a component representing the direction opposite to the direction in which the core unit 70 is moved, the component is offset by a value obtained from the movement of the core unit 70 immediately preceding the movement of the core unit 70 which has the component representing the opposite direction, thereby preventing an influence from being visually exerted on a movement of the object OBJ.

The game main process of step 51 using the differential vector vecd may be enabled only when the differential vector vecd satisfies a predetermined condition. For example, the CPU 10 performs the game main process by using the differential vector vecd when the differential vector vecd has a magnitude larger than a predetermined threshold value. Specifically, when the differential vector vecd has a magnitude larger than a predetermined threshold value, the CPU 10 scales the respective components (X-axial component vecdX, Y-axial component vecdY, Z-axial component vecdZ) of the differential vector vecd in the virtual game space so as to directly designate coordinate points corresponding to the respective components, thereby performing the game process using the designated coordinate value. On the other hand, when the differential vector vecd has a magnitude which is not larger than the predetermined threshold value, the CPU 10 performs the game process using a predetermined value (for example, a predetermined fixed value or a designated coordinate value having been calculated for the immediately preceding time) as the designated coordinate value. Thus, when the accumulation vector veca has a magnitude larger than a predetermined threshold value, a designated coordinate value determined in accordance with the accumulation vector veca is enabled, so that a subtle movement applied to the core unit 70 is cancelled, thereby preventing erroneous determination of the movement of the core unit 70.

Returning to FIG. 16, following the game main process of step 51, the CPU 10 determines whether or not the game is to be ended in step 52. For example, it is determined that the game is to be ended when a condition for game over is satisfied, or when a player performs an operation for ending the game. When the game is not to be ended, the CPU 10 returns the process to step 43 and repeats the aforementioned process steps. When the game is to be ended, the CPU 10 ends the process according to the flow chart.

A fundamental principle of the aforementioned acceleration data process will be described. For example, when a value acquired from the acceleration sensor 701 is directly scaled in the virtual game space so as to designate a coordinate point corresponding to the value, the position pos may be set at a position in the direction which is different from the direction in which the core unit 70 is moved. For example, since the gravitational acceleration is constantly applied to the core unit 70 regardless of whether the core unit 70 is moved or at rest, a coordinate point corresponding to a value influenced by the gravitational acceleration is always designated in the virtual game space, so that the position pos which never depend on the movement of the core unit 70 is likely to be calculated. Further, when the core unit 70 is moved in a predetermined direction and then is stopped, an acceleration is applied to the core unit 70 in the predetermined direction and thereafter an application is applied to the core unit 70 in the direction opposite to the predetermined direction. Accordingly, in a period in which an acceleration is applied in the opposite direction, the position pos is calculated in the direction opposite to the direction in which the core unit 70 is moved. Further, since an accuracy error of a device such as the acceleration sensor 701 directly exerts an influence, it is difficult to calculate the position pos, as intended by the player, based on the movement of the core unit 70.

On the other hand, in the process operation according to certain example embodiments, the differential vector vecd is used so as to calculate the position pos. The differential vector vecd is obtained by, for example, integrating the acceleration vectors based on the movement of the core unit 70 as described above, and represents a parameter which changes so as to emulate a speed at which the core unit 70 is moved in the real space. Therefore, when a player moves, in a certain direction, the core unit 70 which has been at rest, and then stops the core unit 70, the movement represented as a vector eventually becomes zero. Accordingly, when the position pos is obtained by scaling the respective components of the differential vector vecd in the virtual game space so as to designate a coordinate point corresponding to the respective components, the position pos is moved from the reference position in the direction in which a player moves the core unit 70, and eventually returns to the reference position. As described above, when the position pos is obtained by scaling the differential vector vecd in the virtual game space so as to designate a coordinate point corresponding to the differential vector vecd, the position pos is returned to the reference position when the core unit 70 stops. Accordingly, certain example embodiments may be greatly useful for designating a coordinate point corresponding to the position pos which is moved in the virtual game space in accordance with the core unit 70 being moved and is returned to the reference position eventually or at certain intervals.

Further, a vector obtained by eliminating a static component, such as the gravitational acceleration, from a value acquired by the acceleration sensor 701 and accumulating a resultant value becomes zero in theory when the core unit 70 stops. However, the vector does not necessarily become zero in practice due to, for example, an accuracy error of a device such as the acceleration sensor 701 and/or unstable operation performed by a player. On the other hand, the differential vector vecd (accumulation vector veca) is a three-dimensional vector which continues to be attenuated (see step 47). When the differential vector vecd continues to be attenuated as described above, the accuracy error of the device such as the acceleration sensor 701 can be alleviated, and therefore the differential vector vecd can securely become almost zero when the core unit 70 is at rest. Further, when the attenuation rate by which the differential vector vecd (accumulation vector veca) is multiplied is reduced (that is, when the attenuation is increased), a coordinate point corresponding to the position pos obtained in response to a large movement of the core unit 70 is designated. On the other hand, when the attenuation rate by which the differential vector vecd (accumulation vector veca) is multiplied is increased (that is, the attenuation is reduced), a coordinate point corresponding to the position pos obtained in response to even a small movement of the core unit 70 is designated. That is, the attenuation rate by which the accumulation vector veca is multiplied may be adjusted so as to adjust a responsiveness to an operation.

Further, the following vector vecg is calculated in step 49 by setting the following coefficient K as a substantially small value (for example, K=0.006). However, a value of the following coefficient K may be adjusted so as to be used as a parameter for adjusting a degree to which the detected acceleration component of the core unit 70 in the dynamic state is influenced. For example, when the following coefficient K used in step 49 is increased (that is, the following degree is enhanced), a value obtained by accumulating a dynamic acceleration component of the core unit 70 being moved is eliminated from the accumulation vector veca when the differential vector vecd is calculated in step 50. Therefore, when the following coefficient K is increased, it is difficult to maintain, in the virtual game space, the position pos represented as a coordinate point designated in accordance with the core unit 70 being moved, so that a time at which the position pos is returned to the reference position is advanced. On the other hand, when the following coefficient K is reduced (that is, the following degree is reduced), the dynamic acceleration component of the core unit 70 being moved is maintained as the accumulation vector veca for a certain time period after the core unit 70 has stopped. Therefore, when the following coefficient K is reduced, the position pos represented as a coordinate point designated in accordance with the core unit 70 being moved tends to be maintained in the virtual game space, so that a time at which the position pos is returned to the reference position is delayed.

Further, it is possible to separately obtain, in the virtual game space, the position pos based on the core unit 70 and the position pos based on the subunit 76. For example, a first reference position and first coordinate axes are defined in the virtual game space for the core unit 70, and a second reference position and second coordinate axes, which are different from the first reference position and the first coordinate axes, respectively, are defined in the virtual game space for the subunit 76. Based on the aforementioned process operation, a first differential vector vecd1 is calculated by using the core acceleration data obtained from the core unit 70, and respective component values of the first differential vector vecd1 are scaled using the first coordinate axes so as to designate a coordinate point corresponding to the respective component values. On the other hand, based on the aforementioned process operation, a second differential vector vecd2 is calculated by using the sub acceleration data obtained from the subunit 76, and respective component values of the second differential vector vecd2 are scaled using the second coordinate axes so as to designate a coordinate point corresponding to the respective component values. Thus, the differential vector vecd calculated from the acceleration data outputted from each of the core unit 70 and the subunit 76 is separately scaled using the corresponding coordinate axes so as to designate a coordinate point corresponding to the differential vector vecd, thereby separately obtaining the position pos. Thus, a player can operate the core unit 70 and the subunit 76 so as to independently move the two objects OBJ in a separate manner. For example, the core unit 70 and the subunit 76 are operated such that the drum can be played in such a virtual manner as to move the two stick objects OBJ1 and OBJ2 downward as shown in FIG. 12.

Further, the reference position (the originating point of the xyz coordinate system) of the virtual game space may be moved in accordance with the object OBJ being moved. For example, in the exemplary game as shown in FIG. 13, the reference position may be moved in the direction in which the character object OBJ is moved when a player operates a predetermined button or the like of the operation section 72. Thus, the character object OBJ can be moved in the virtual game space without limit, thereby providing a game of enhanced flexibility.

Further, when an acceleration has a value outside the measurable range of the acceleration sensor 701, the acceleration change amount accv to be updated is estimated using the acceleration change amount accv immediately preceding the acceleration change amount accv being currently calculated, so as to calculate the acceleration change amount accv in step 45. As a method for estimating the acceleration change amount accv, used is a method in which the acceleration change amount accv immediately preceding the acceleration change amount accv being currently calculated is simply multiplied by a predetermined attenuation rate, thereby enhancing a responsiveness. For example, as compared to a method for buffering all the acceleration data acquired by the acceleration sensor 701 so as to perform an interpolation using a spline curve and the like, the responsiveness can be substantially enhanced and a memory for buffering is unnecessary, thereby reducing calculation process load.

Further, in the game main process of step 51, an attitude of the core unit 70 in the static state which is represented by the attitude data Dh can be used so as to estimate the direction in which a player is moving the core unit 70 in the real space in which the player operates the core unit 70. For example, as descried above, the accumulation vector vecd can be used so as to estimate a position of the core unit 70 relative to a position at which a player has started to move the core unit 70, more specifically, so as to estimate a position (for example, a position in the direction of the top surface of the core unit 70, or a position in the direction of the left side surface of the core unit 70) relative to the core unit 70. On the other hand, the attitude of the core unit 70 in the static state which is represented by the attitude data Dh represents the direction of the gravitational acceleration applied to the core unit 70 in, for example, the static state in which the player has not yet started to move the core unit 70, and is used as data representing the vertical direction, in the real space, relative to a body of the core unit 70. Therefore, the differential vector vecd and the attitude of the core unit 70 in the static state which is represented by the attitude data Dh are used so as to estimate a position (for example, a position in the horizontal direction in the real space, or a position in the upward-downward direction in the real space) associated with the direction in which the core unit 70 has been moved in the real space. Further, when a reference attitude at which the core unit 70 is operated and/or a reference direction in which the core unit 70 is operated are set (for example, the front surface of the core unit 70 is oriented toward the monitor 2 such that the core unit 70 points to the monitor 2, the core unit 70 is held such that the longitudinal side surface thereof is pointed to the monitor 2), it is possible to estimate a position associated with a direction (for example, up-down direction, left-right direction, forward-backward direction) in which a player moves the core unit 70, based on the reference attitude and/or direction.

Figure 22:
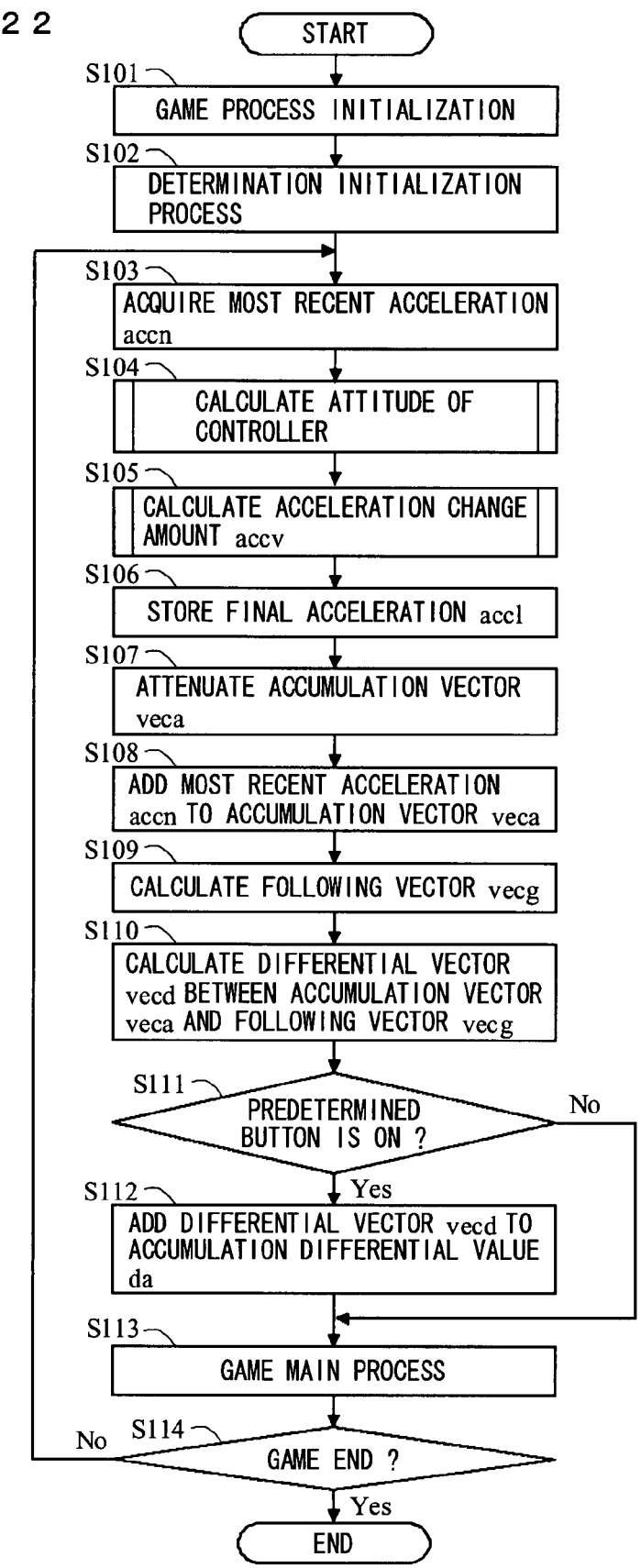
FIG. 22 is a flow chart illustrating another example of a flow of the game process performed by the game apparatus body 5.

Further, when a value obtained by accumulating the differential vector vecd is scaled in the virtual game space so as to designate a coordinate point corresponding to the value, the game main process may be performed in a manner different from that described above. Hereinafter, the game process performed by the game apparatus body 5 when a value obtained by accumulating the differential vector vecd is used to perform the game main process will be described in detail with reference to FIG. 22. FIG. 22 is a flow chart illustrating a flow of the game process executed by the game apparatus body 5. With reference to the flow chart shown in FIG. 22, process steps of moving the object OBJ in accordance with a player moving the core unit 70 will be described among the entire game process, and a detailed description of process steps, among the entire game process, having no direct relation is not described herein. Further, in FIG. 22, each of the steps executed by the CPU 10 is abbreviated as "S".

In FIG. 22, process steps of step 101 to step 110 performed until the differential vector vecd is calculated correspond to the process steps of step 41 to step 50 described with reference to FIG. 16. Therefore, detailed description of step 101 to step 110 is not given. When a value (accumulation differential value da) obtained by accumulating the differential vector vecd is used to perform the game process, data representing the accumulation differential value da is stored in the main memory in addition to the respective main data shown in FIG. 15. The accumulation differential value da includes: an X-axis coordinate point daX of the accumulation differential value da; a Y-axis coordinate point daY of the accumulation differential value da; and Z-axis coordinate point daZ of the accumulation differential value da.

Following step 110 of calculating the differential vector vecd, the CPU 10 determines, in step 111, whether or not a predetermined button is pressed. In the game process of the present example, an operation of moving the object OBJ in the virtual game space in accordance with the core unit 70 being moved is enabled only while the predetermined button (for example, the operation section 72*d* (A button) or the operation section 72*i* (B button)) is pressed. In step 111, the CPU 10 determines whether or not the predetermined button for enabling the operation is pressed, by using the core key data contained in the operation information outputted by the core unit 70. When the CPU 10 determines that the predetermined button is pressed, the CPU 10 advances the process to step 112. On the other hand, when the CPU 10 determines that the predetermined button is not pressed, the CPU 10 advances the process to step 113.

In step 112, the CPU 10 adds the differential vector vecd to the accumulation differential value da for each component value thereof so as to update the accumulation differential value da, and advances the process to step 113. For example, the CPU 10 adds the X-axial component vecdX of the differential vector vecd having been most recently stored in the main memory, to the X-axis coordinate point daX of the accumulation differential value da having been most recently stored in the main memory, so as to update the X-axis coordinate point daX, thereby updating data representing the accumulation differential value da in the main memory. Further, the CPU 10 adds the Y-axial component vecdY of the differential vector vecd having been most recently stored in the main memory, to the Y-axis coordinate point daY of the accumulation differential value da having been most recently stored in the main memory, so as to update the Y-axis coordinate point daY, thereby updating data representing the accumulation differential value da in the main memory. Furthermore, the CPU 10 adds the Z-axial component vecdZ of the differential vector vecd having been most recently stored in the main memory, to the Z-axis coordinate point daZ of the accumulation differential value da having been most recently stored in the main memory, so as to update the Z-axis coordinate point daZ, thereby updating data representing the accumulation differential value da in the main memory.

The process step of step 112 may be performed when the predetermined button is pressed and the differential vector vecd calculated in step 110 satisfies a predetermined condition. For example, the CPU 10 adds the differential vector vecd to the accumulation differential value da so as to update the accumulation differential value da when the predetermined button is pressed and the differential vector vecd has a magnitude larger than a predetermined threshold value. Specifically, the CPU 10 adds the differential vector vecd to the accumulation differential value da for each component (the X-axial component vecdX, the Y-axial component vecdY, the Z-axial component vecdZ) so as to update the accumulation differential value da when the differential vector vecd has a magnitude larger than the predetermined threshold value. Thus, the accumulation vector veca is added to the accumulation differential value da for each component thereof when the accumulation vector veca has a magnitude larger than a predetermined threshold value, and therefore a subtle movement applied to the core unit 70 can be cancelled in the game main process described below, thereby preventing erroneous determination of the movement of the core unit 70.

The CPU 10 performs a game main process in step 113, and advances the process to the next step. The CPU 10 performs the game main process by using the accumulation differential value da having been calculated in step 112. For example, the CPU 10 scales the respective coordinate values (the X-axis coordinate point daX, the Y-axis coordinate point day, the Z-axis coordinate point daZ) of the accumulation differential value da in the virtual game space so as to directly designate a coordinate point corresponding to the respective coordinate values, and performs the game process by using the designated coordinate values. For example, the CPU 10 transforms the respective coordinate values of the accumulation differential value da to the x-axis coordinate point posx, the y-axis coordinate point posy, and the z-axis coordinate point posz of the position pos of the object OBJ so as to designate a coordinate point corresponding to the respective coordinate values, thereby updating the virtual game space position data Dg. The CPU 10 positions the object OBJ at the position pos in the virtual game space so as to display a game image on the monitor 2, thereby executing a series of game process. Hereinafter, an exemplary game process using the accumulation differential value da will be described with reference to FIG. 23. FIG. 23 is a diagram illustrating an exemplary relationship between the real space in which a player moves the core unit 70 and the virtual game space displayed on the monitor 2, as with FIG. 19.

In FIG. 23, xyz-axes orthogonal to each other are defined in the virtual game space, as in FIG. 19. When the front surface of the core unit 70 having its bottom surface oriented vertically downward is pointed to the front face of the monitor 2, the xyz-axes in the virtual game space displayed on the monitor 2 extend in the same directions as XYZ-axes defined for the core unit 70 as shown in FIG. 23.

A position of the object OBJ in the virtual game space is represented as xyz-coordinate values, specifically, represented as the position pos (posx, posy, posz) of the object. The respective coordinate values (the X-axis coordinate point daX, the Y-axis coordinate point daY, the Z-axis coordinate point daZ) of the accumulation differential value da are scaled in the virtual game space so as to designate a coordinate point corresponding to the respective coordinate values, thereby setting the position pos (posx, posy, posz). For example, the position pos (posx, posy, posz) is obtained in accordance with the following equation.

$posx = daX$ $posy = daY$ $posz = daZ$

When the core unit 70 (indicated by a dotted line in FIG. 23) is at rest in the real space, the differential vector vecd represents (0, 0, 0). In this case, the accumulation differential value da represents a value obtained by accumulating the differential vector vecd having been previously obtained, and does not change. For example, the accumulation differential value da0=(da0X, da0Y, da0Z) is satisfied, and does not change. Therefore, the position pos0 (pos0x, pos0y, pos0z)= (da0X, da0Y, da0Z) is satisfied in this state, and therefore the object OBJ (indicated by a dotted line in FIG. 23) may be positioned at rest in the virtual game space at a position other than the reference position corresponding to the originating point of the xyz-axis coordinate system.

It is assumed that a player moves the core unit 70 in the direction (anti-gravity direction) of the top surface thereof while pressing the predetermined button, and then the player stops pressing the predetermined button. As described above, when a player moves the core unit 70 in the direction of the top surface thereof and then stops the core unit 70, the differential vector vecd (vecdX, vecdY, vecdZ) represents a vector (for example, the differential vector vecd (0, +a, 0)) having the Y-axis positive direction as shown in FIG. 23. That is, the differential vector vecd having the same direction as the direction in which a player moves the core unit 70 can be calculated.

The differential vector vecd of the Y-axis positive direction having been calculated is added, for each component thereof, to the accumulation differential value da0 so as to update the accumulation differential value da (daX, daY, daZ). Specifically, the accumulation differential value da is calculated as follows.

$daX = da0X + vecdX$ $daY = da0Y + vecdY$ $daZ = da0Z + vecdZ$

The updated accumulation differential value da (daX, daY, daZ) is scaled in the virtual game space so as to designate a coordinate point corresponding to the accumulation differential value da, so that the position pos is changed from the position pos0. For example, the accumulation differential value da updated by accumulating the differential vector vecd (0, +a, 0) is directly scaled in the virtual game space so as to designate, as an xyz-axis coordinate value, a coordinate point corresponding to the accumulation differential value da, so that the position pos0 (pos0x, pos0y, pos0z)=(da0X, da0Y, da0Z) is changed to the position pos (posx, posy, posz)=(daX, daY, daZ), that is, the position pos is obtained by moving the position pos0 by +a in the y-axis positive direction. The position of the object OBJ is changed in accordance with the position pos being changed, so that the object OBJ is moved from the position pos0 in the y-axis positive direction in the virtual game space, and displayed on the monitor 2. On the other hand, as described above, the Y-axis positive direction defined for the core unit 70 corresponds to the y-axis positive direction defined in the virtual game space, so that the object OBJ is eventually moved in the virtual game space in the direction in which a player moves the core unit 70 in the real space while pressing the predetermined button, and the object OBJ is displayed on the monitor 2. For example, the item object OBJ is positioned at the position pos so as to realize the exemplary game described with reference to FIG. 14. In this case, the operation described above is enabled only while a player presses the predetermined button of the core unit 70, and the item object OBJ stops at a position corresponding to a position at which the player stops pressing the predetermined button. That is, the item object OBJ is readily moved to any position as intended by a player.

In the process operation of the present example according to certain example embodiments, a value (accumulation differential value da) obtained by accumulating the differential vector vecd is used so as to obtain the position pos. The differential vector vecd represents a parameter which changes so as to emulate a speed at which the core unit 70 moves in the real space. The accumulation differential value da is a value obtained by accumulating the differential vector vecd. That is, the accumulation differential value da is a value obtained by integrating the speed at which the core unit 70 is moved, and represents a parameter which changes so as to emulate a relative position to which the core unit 70 moves in the real space. Thus, the differential vector vecd is calculated as a position of the core unit 70 relative to a position at which a player has started to move the core unit 70, and a value obtained by accumulating the differential vector vecd is scaled in the virtual game space so as to designate a coordinate point corresponding to the value, so that it is possible to designate a position, in the virtual game space, corresponding to the relative position of the core unit 70 in the real space.

Although, in the processing described above, the operation described above is enabled only while a player presses a predetermined button of the core unit 70, the operation described above may be constantly enabled regardless of whether or not the predetermined button is pressed. In this case, the accumulation differential value da continues to be updated until a magnitude of the differential vector vecd becomes zero, so that the position pos continues to be moved. Therefore, the item object OBJ, a cursor or the like displayed on the monitor 2 continues to be moved in the virtual game space, thereby enabling an operation of scrolling a screen displayed on the monitor 2, for example. Further, when the accumulation differential value da continues to be updated regardless of whether or not the predetermined button is pressed, the accumulation differential value da may be used as a parameter indicating a position of the core unit 70 or the direction in which the core unit 70 is pointed, in the real space, whereby the core unit 70 may be used so as to assist the imaging information calculation section 74 in determining a position.

Returning to FIG. 22, following the game main process of step 113, the CPU 10 determines whether or not the game is to be ended in step 114. For example, it is determined that the game is to be ended when a condition for game over is satisfied, or when a player performs an operation for ending the game. When the game is not to be ended, the CPU 10 returns the process to step 103 and repeats the aforementioned process steps. When the game is to be ended, the CPU 10 ends the process according to the flow chart.

As described above, a value (for example, the respective axial component values of the differential vector vecd or the accumulation differential value da obtained by accumulating the differential vector vecd for each axial component value thereof) determined in accordance with the differential vector vecd can be used as a three-dimensional position in the real space relative to a position at which a player has started to move the core unit 70 and/or the subunit 76. The value determined in accordance with the differential vector vecd is scaled so as to designate the position pos, in the virtual world, corresponding to the value, and therefore an output value from an inexpensive acceleration sensor is used so as to accurately designate a position.

In the process described above, a movement of each of the core unit 70 and the subunit 76 is represented as a three dimensional vector, and a three-dimensional coordinate value is scaled so as to designate a coordinate point corresponding to the position pos. However, the movement of each of the core unit 70 and the subunit 76 may be processed in a two-dimensional or one-dimensional manner. For example, the virtual game space shown in FIG. 19 or FIG. 23 may be a two-dimensional virtual game world in which coordinates are based on an xy-coordinate system. When the process operation describe above is performed by using only an X component and a Y component, the movement of each of the core unit 70 and the subunit 76 along the XY-plane is represented as a two-dimensional vector, and the two-dimensional vector can be scaled in the xy-coordinate system so as to designate a coordinate point corresponding to the two-dimensional vector. Further, in the virtual game space or the virtual game world as describe above, for example, an x-axis coordinate system is defined in which a coordinate point is designated in only one direction. When the process operation described above is performed by using only the X-component, a movement of each of the core unit 70 and the subunit 76 along the X-axis is represented as a one-dimensional value, so that the one-dimensional value is scaled in the x-axis coordinate system so as to designate a coordinate point corresponding to the one-dimensional value.

An acceleration sensor for detecting for an acceleration in only two-axial directions or only one axial direction can be used in example embodiments. For example, when the core unit 70 and the subunit 76 each includes an acceleration sensor for detecting for an acceleration in the X-axis direction and the Y-axis direction (see FIGS. 4, 5, and 8), and only an X component and a Y component can be used to perform the process operation described above, it is possible to determine a movement of each of the core unit 70 and the subunit 76 along the XY plane. Further, when an acceleration sensor for detecting and outputting only a Y-axial component is used, and only the Y component is used to perform the process operation described above, it is possible to determine a movement of each of the core unit 70 and the subunit 76 in the Y-axis direction.

Further, in the present example, described is an example where a value determined in accordance with the differential vector vecd is directly scaled as a coordinate value in the virtual game space so as to designate a coordinate point corresponding to the value. However, the coordinate point may be designated in the virtual game space by using any appropriate function or the like. For example, a value determined in accordance with the differential vector vecd is subjected to four arithmetic operations (addition, subtraction, multiplication, and division) using a predetermined coefficient so as to be scaled in a coordinate system of the virtual game space, thereby designating a coordinate point corresponding to the position pos.

Although in the above description certain example embodiments are applied to the stationary game apparatus body 5 which performs a processing in accordance with the core unit 70 and the subunit 76 being moved, certain example embodiments may be applied to a hand-held game apparatus. For example, when a body of the hand-held game apparatus having an acceleration sensor mounted thereon is moved in the real space, an output of the acceleration sensor is used to designate a coordinate point in the virtual game space displayed on a display screen of the hand-held game apparatus. When certain example embodiments are applied as described above, a game is preferably played with the hand-held game apparatus or the like.

Although in the above description certain example embodiments are applied to a stationary or a hand-held game apparatus, certain example embodiments may be applied to an information processing apparatus such as a typical personal computer operated by using an input device having the acceleration sensor, or an information processing apparatus having a body in which the acceleration sensor is mounted. For example, the information processing apparatus operated by using an input device having the acceleration sensor is capable of performing, based on an acceleration applied to the input device, various processing such as scrolling a screen, and controlling, in accordance with acceleration data outputted by the acceleration sensor of the input device, a state or a position of an object or a window displayed by the information processing apparatus. On the other hand, the information processing apparatus having a body in which the acceleration sensor is mounted which detects for an acceleration applied to the body can execute a processing in accordance with acceleration data outputted by the acceleration sensor, and may be applied to, for example, a typical personal computer, a mobile telephone, a device such as a PDA (personal digital assistant).

For example, when a mobile telephone, typifying the information processing apparatus having a body in which the acceleration sensor is mounted, includes a communication section for wirelessly communicating with another telephone, a body of the mobile telephone has the acceleration sensor mounted therein. When the body of the mobile telephone is moved in the real space, an output value from the acceleration sensor mounted in the mobile telephone is used to designate a coordinate point in a space or a plane such as a work area, which is displayed on a display screen of the mobile telephone. In certain example embodiments as described above, a game is preferably played with the mobile telephone, or the mobile telephone is preferably operated.

Further, although in the above description the game apparatus body 5 is connected to each of the core unit 70 and the subunit 76 by wireless communication, the game apparatus body 5 may be electrically connected to each of the core unit 70 and the subunit 76 via a cable. In this case, the cable connected to each of the core unit 70 and the subunit 76 is connected to a connection terminal of the game apparatus body 5.

The aforementioned shapes of the core unit 70 and the subunit 76 are merely examples. Further, the shape, the number, the setting position and the like of each of the operation sections 72 and 78 included in the core unit 70 and the subunit 76, respectively, are merely examples. Needless to say, certain example embodiments may be implemented even when the shapes of the core unit 70 and the subunit 76, and the shape, the number, the setting position and the like of each of the operation sections 72 and 78 are different from those described in the example.

Moreover, the information processing program and the game program according to the present invention may be supplied to the game apparatus body 5 via a wired or a wireless communication line in addition to through an external storage medium such as the optical disc 4. Further, the information processing program and the game program may be previously stored in a non-volatile storage unit in the game apparatus body 5. An information storage medium for storing the information processing program and the game program may be a non-volatile semiconductor memory in addition to a CD-ROM, a DVD, or an optical disc type storage medium.

While the embodiments herein have been described in detail, the foregoing description is in all aspects illustrative and not restrictive. It is understood that numerous other modifications and variations can be devised without departing from the scope of the invention.

The information processing program and the information processing apparatus according to certain example embodiments allow a coordinate point to be designated by using acceleration data outputted by an inexpensive acceleration sensor, and are useful as a program and an apparatus for performing a game process, information processing, and the like in accordance with an operation performed on an input device such as a game controller, and as a program and an apparatus for performing a game process, an information processing and the like in accordance with an operation performed on a housing of a body thereof, or the like.

What is claimed is:

1. A non-transitory storage medium having stored thereon an information processing program executed by a computer of an information processing using acceleration data outputted by an acceleration sensor that is configured to detect an acceleration, in at least one axial direction, applied to a predetermined housing thereof, the information processing program causing the computer to function as:

repeatedly acquiring the acceleration data;
calculating an accumulation vector by sequentially accumulating an acceleration vector having a magnitude and a direction of the acceleration represented by the acceleration data, thereby providing a calculated accumulation vector;
calculating a following vector which follows the calculated accumulation vector at a predetermined rate, said following vector calculated using a calculation which includes the calculated accumulation vector;
a differential vector as a difference between the accumulation vector and the calculated following vector; and
designating a position in a virtual world using a value determined in accordance with the differential vector, and performing a predetermined processing by using the position.

2. The storage medium according to claim 1, wherein the position is designated corresponding to axial component values of the differential vector.

3. The storage medium according to claim 2, wherein the information processing program causing the computer to further function as wherein the accumulation sequentially attenuating the calculated accumulation vector before or after the acceleration vector is added to the calculated accumulation vector.

4. The storage medium according to claim 2, wherein the position is designated when a magnitude of the calculated differential vector is larger than a predetermined threshold value.

5. The storage medium according to claim 2, wherein the acceleration sensor is configured to detect the acceleration having the magnitude within a predetermined measurable range,
  the information processing program causes the computer to further function as:
  calculating, by using the acquired acceleration data, a change amount vector representing a change amount of the acceleration, when the magnitude of the acceleration represented by the acquired acceleration data has a value within the predetermined measurable range; and
  calculating, when the magnitude of the acceleration represented by the acquired acceleration data has a value outside the predetermined measurable range, an estimated acceleration vector by attenuating, by a predetermined amount, the change amount vector immediately preceding the change amount vector being currently calculated so as to update the change amount vector, and adding the updated change amount vector to the most recently accumulated acceleration vector, and
  updating, when the magnitude of the acceleration vector having the magnitude and the direction of the acceleration represented by the acquired acceleration data has a value outside the predetermined measurable range, the calculated accumulation vector by adding the estimated acceleration vector to the calculated accumulation vector.

6. The storage medium according to claim 2, wherein the predetermined processing is a process of positioning a predetermined object at the designated position in the virtual world, and moving the predetermined object in the virtual world in accordance with the position being moved.

7. The storage medium according to claim 2, wherein the position is designated by associating the axial component values of the differential vector with coordinate values of a coordinate system defined in the virtual world, respectively, and
  the information processing program causing the computer to further function as moving, in the virtual world, an originating point of the coordinate system defined in the virtual world when a predetermined condition is satisfied.

8. The storage medium according to claim 2, wherein:
  second acceleration data is configured to be outputted by a second acceleration sensor disposed in a second housing,
  the acceleration data is a first acceleration data, the calculated accumulation vector is a first calculated accumulation vector, the following vector is a first following vector, the differential vector is a first differential vector, the position is a first position associated with axial component value of the first differential Vector with coordinate values of a first coordinate system,
  wherein the information processing program causes the computer to further function as:
  acquiring second acceleration data outputted by a second acceleration sensor;
  calculating a second accumulation vector by sequentially accumulating a second acceleration vector having a magnitude and a direction of an acceleration represented by the second acceleration data, thereby providing a second calculated accumulation vector;
  calculating a second following vector which follows the second calculated accumulation vector at a second predetermined rate, said second following vector calculated using a second calculation which includes the second calculated accumulation vector:
  calculating a second differential vector as a difference between the second calculated accumulation vector and the second following vector; and
  designating a second position by associating axial component values of the second differential vector with coordinate values of a second coordinate system, respectively, which is different from the first coordinate system,
  wherein the predetermined processing a process of positioning a first object at the first position and a second object at the second position, and moving the first object and the second object in the virtual world in accordance with the first position and the second position being moved, respectively.

9. The storage medium according to claim 1, wherein the information processing program causes the computer to further function as calculating an accumulation differential value by sequentially accumulating the calculated differential vector, in units of axial component values thereof, and
  the position is designated, in the virtual world, corresponding to the calculated accumulation differential value.

10. The storage medium according to claim 9, wherein the information processing program causes the computer to further function as sequentially attenuating the calculated accumulation vector before or after the acceleration vector is added to the calculated accumulation vector.

11. The storage medium according to claim 9, wherein the accumulation differential value is calculated when a magnitude of the calculated differential vector is larger than a predetermined threshold value.

12. The storage medium according to claim 9, wherein the acceleration sensor is capable of detecting for the acceleration having the magnitude within a predetermined measurable range,
  the information processing program causes the computer to further function as:
  calculating, by using the acquired acceleration data, a change amount vector representing a change amount of the acceleration, when the magnitude of the acceleration represented by the acquired acceleration data has a value within the predetermined measurable range; and
  calculating, when the magnitude of the acceleration represented by the acquired acceleration data has a value outside the predetermined measurable range, an estimated acceleration vector by attenuating, by a predetermined amount, the change amount vector immediately preceding the change amount vector being currently calculated so as to update the change amount vector, and adding the updated change amount vector to the most recently used acceleration, and
  updating the calculated accumulation vector by adding the estimated acceleration vector to the calculated accumulation vector when the magnitude of the acceleration vector having the magnitude and the direction of the acceleration represented by the acquired acceleration data has a value outside the predetermined measurable range.

13. The storage medium according to claim 9, wherein the predetermined processing includes a process of positioning a predetermined object at the position having been designated in the virtual world, and moving the predetermined object in the virtual world in accordance with the position being moved.

14. The storage medium having stored thereon the information processing program according to claim 9, wherein the predetermined housing includes at least one operation button configured to output predetermined operation data in accordance with a user pressing the at least one operation button,
the information processing program causes the computer to further function as repeatedly acquiring the operation data, and
the differential vector is calculated only when the acquired operation data indicates that a predetermined operation button among the at least one operation button is pressed is acquired.

15. An information processing apparatus configured to perform a processing using acceleration data outputted by an acceleration sensor that is configured to detect an acceleration, in at least one axial direction, applied to a predetermined housing thereof, the information processing apparatus comprising:
a processing system configured to cause:
repeatedly acquiring the acceleration data;
calculating an accumulation vector by sequentially accumulating an acceleration vector having a magnitude and a direction of the acceleration represented by the acceleration data, thereby providing a calculated accumulation vector;
calculating a following vector which follows the calculated accumulation vector at a predetermined rate, said following vector calculated using a calculation which includes the calculated accumulation vector;
calculating a differential vector as a difference between the calculated accumulation vector and the following vector; and
designating a position in a virtual world using a value determined in accordance with the differential vector, and performing a predetermined processing by using the position.

16. The medium of claim 1, wherein the information processing program further causes the computer to function as calculating a new following vector which follows, at the predetermined rate, the calculated accumulation vector, the new following vector based on adding a value obtained by multiplying a difference between the calculated accumulation vector and a last calculated following vector by the predetermined rate to the last calculated following vector.

17. An information processing system configured to use acceleration data outputted by an acceleration sensor that is configured to detect an acceleration in at least one axial direction, the acceleration sensor disposed into or on a predetermined housing, the information processing system comprising:
a processing system configured to cause: acquiring the acceleration data; calculating an accumulation vector by sequentially accumulating an acceleration vector having a magnitude and a direction related to the acceleration represented by the acceleration data, thereby providing a calculated accumulation vector;
calculating a following vector which follows the calculated accumulation vector at a predetermined rate, said following vector calculated using a calculation which includes the calculated accumulation vector;
calculating a differential vector, the differential vector being a difference between the calculated accumulation vector and the following vector;
designating a position in a virtual world in accordance with the differential vector; and
performing a process based at least in part on the position.

18. A computer implemented method for use on at least one processor that is configured to use acceleration data that is outputted from an acceleration sensor that is configured to detect an acceleration in at least one axial direction, the acceleration sensor disposed in a housing, the method comprising:
acquiring the acceleration data;
calculating an accumulation vector by accumulating an acceleration vector having a magnitude and a direction of the acceleration represented by the acceleration data, thereby providing a calculated accumulation vector;
calculating a following vector which follows the calculated accumulation vector at a predetermined rate, said following vector calculated using a calculation which includes the calculated accumulation vector;
calculating a differential vector as a difference between the calculated accumulation vector and the following vector;
designating a position in a virtual world in accordance with the differential vector; and
performing a process based at least in part on the position.

19. The medium of claim 1, wherein the information processing program further causes the computer to function as adding to a last calculated following vector a value obtained by multiplying a difference value between the calculated accumulation vector and the last calculated following vector by the predetermined rate to calculate a new following vector which follows, at the predetermined rate, the calculated accumulation vector.

* * * * *